(12) United States Patent
Bretschneider et al.

(10) Patent No.: US 12,267,921 B2
(45) Date of Patent: Apr. 1, 2025

(54) LUMINAIRES FOR SPATIAL DIMMING

(71) Applicant: QUARKSTAR LLC, Las Vegas, NV (US)

(72) Inventors: Eric Bretschneider, Corinth, TX (US); Louis Lerman, Las Vegas, NV (US); Ferdinand Schinagl, North Vancouver (CA); Andrew Stuart Gladwin, Brentwood Bay (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 16/961,616

(22) PCT Filed: Jan. 10, 2019

(86) PCT No.: PCT/US2019/013116
§ 371 (c)(1),
(2) Date: Jul. 10, 2020

(87) PCT Pub. No.: WO2019/140138
PCT Pub. Date: Jul. 18, 2019

(65) Prior Publication Data
US 2020/0374995 A1    Nov. 26, 2020

Related U.S. Application Data

(60) Provisional application No. 62/741,458, filed on Oct. 4, 2018, provisional application No. 62/741,503, filed
(Continued)

(51) Int. Cl.
*H05B 45/10* (2020.01)
*F21V 8/00* (2006.01)
(Continued)

(52) U.S. Cl.
CPC ........... *H05B 45/10* (2020.01); *F21V 23/008* (2013.01); *G02B 6/0045* (2013.01); *H05B 47/11* (2020.01)

(58) Field of Classification Search
CPC ... F21V 7/04–09; F21V 23/008; H05B 45/10; H05B 47/11; G02B 6/0045
See application file for complete search history.

(56) References Cited

U.S. PATENT DOCUMENTS 6,819,505 B1 * 11/2004 Cassarly ............ G02B 19/0052
                                                    359/708
9,366,799 B2 * 6/2016 Wilcox ................ G02B 6/0045
(Continued)

FOREIGN PATENT DOCUMENTS

EP          2392953 A2   12/2011
WO    WO2017181165 A1   10/2017

OTHER PUBLICATIONS

International Application No. PCT/US2019/013116, Notification of Transmittal of the International Search Report and the Written Opinion of the International Searching Authority, dated Jun. 17, 2019, 20 pages.

*Primary Examiner* — Henry Luong
(74) *Attorney, Agent, or Firm* — Fish & Richardson P.C.

(57) ABSTRACT

A luminaire includes a first light source and a second light source, the first and second light source operatively configured to provide amounts of light independently controllable during operation; and an optical system having an input aperture system and an output aperture system. The output aperture system is displaced by a predetermined distance along a forward direction from the input aperture system. The optical system is operatively coupled with the first and second light source and configured to direct light received at the input aperture system to the output aperture system. The output aperture system is configured to output light from the
(Continued)

first light source in first directions and light from the second light source in second directions at least in part different from the first directions.

20 Claims, 65 Drawing Sheets

Related U.S. Application Data on Oct. 4, 2018, provisional application No. 62/687,055, filed on Jun. 19, 2018, provisional application No. 62/686,630, filed on Jun. 18, 2018, provisional application No. 62/668,180, filed on May 7, 2018, provisional application No. 62/615,468, filed on Jan. 10, 2018.

(51) Int. Cl.
  *F21V 23/00* (2015.01)
  *H05B 47/11* (2020.01)

(56) References Cited

U.S. PATENT DOCUMENTS

| | | | | |
|---|---|---|---|---|
| 2013/0208495 A1* | 8/2013 | Dau | ................... | G02B 6/0078 |
| | | | | 362/551 |
| 2014/0043856 A1* | 2/2014 | Thompson | ............. | G02B 6/005 |
| | | | | 977/932 |
| 2014/0092580 A1* | 4/2014 | McCollum | ........... | G02B 6/0086 |
| | | | | 362/282 |
| 2017/0090102 A1* | 3/2017 | Holman | ............... | G02B 6/0046 |

\* cited by examiner

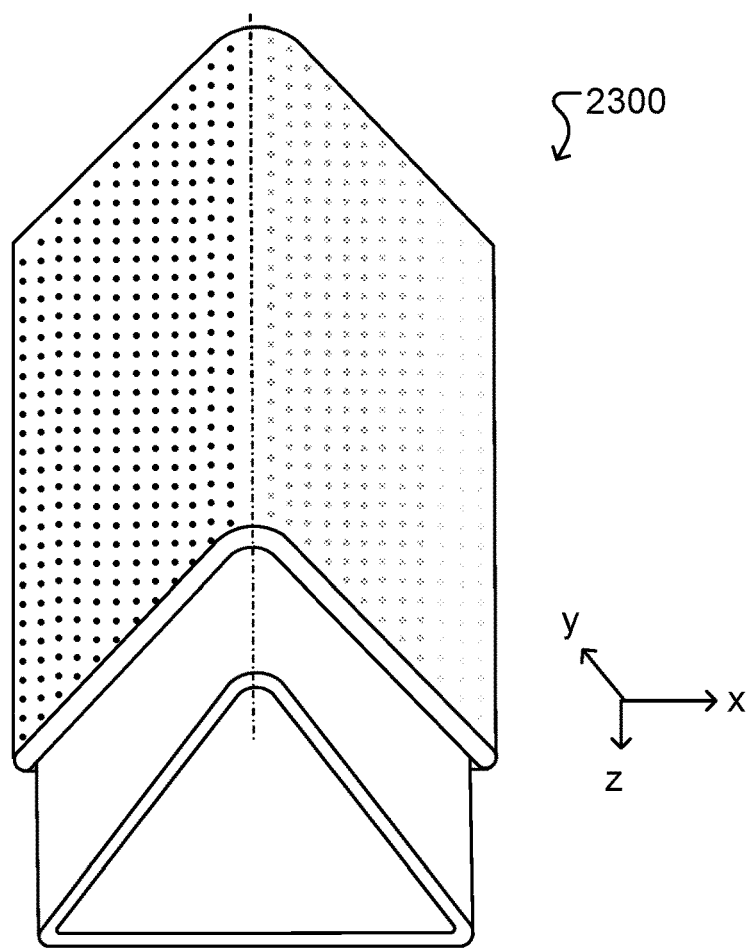
FIG. 23
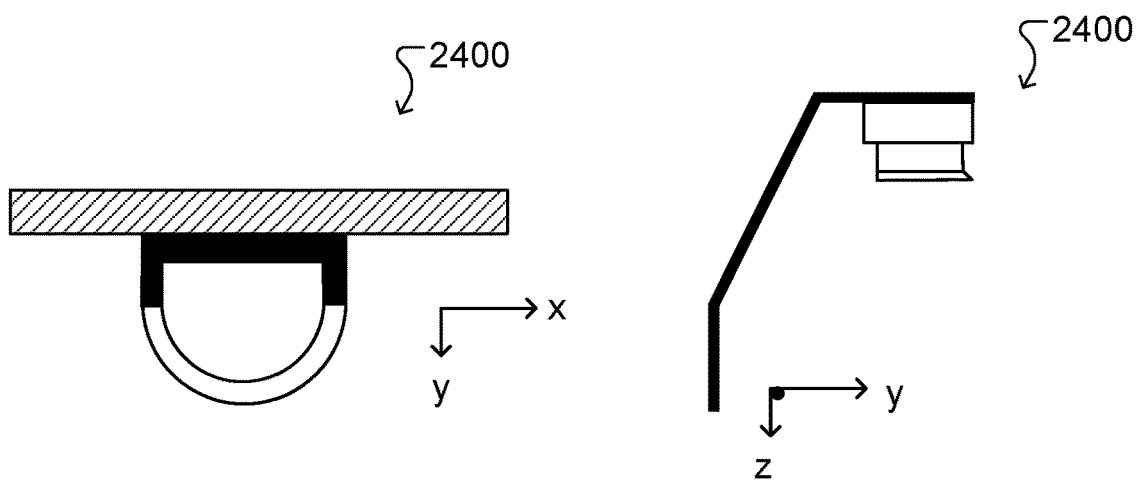
FIG. 24A
FIG. 24B

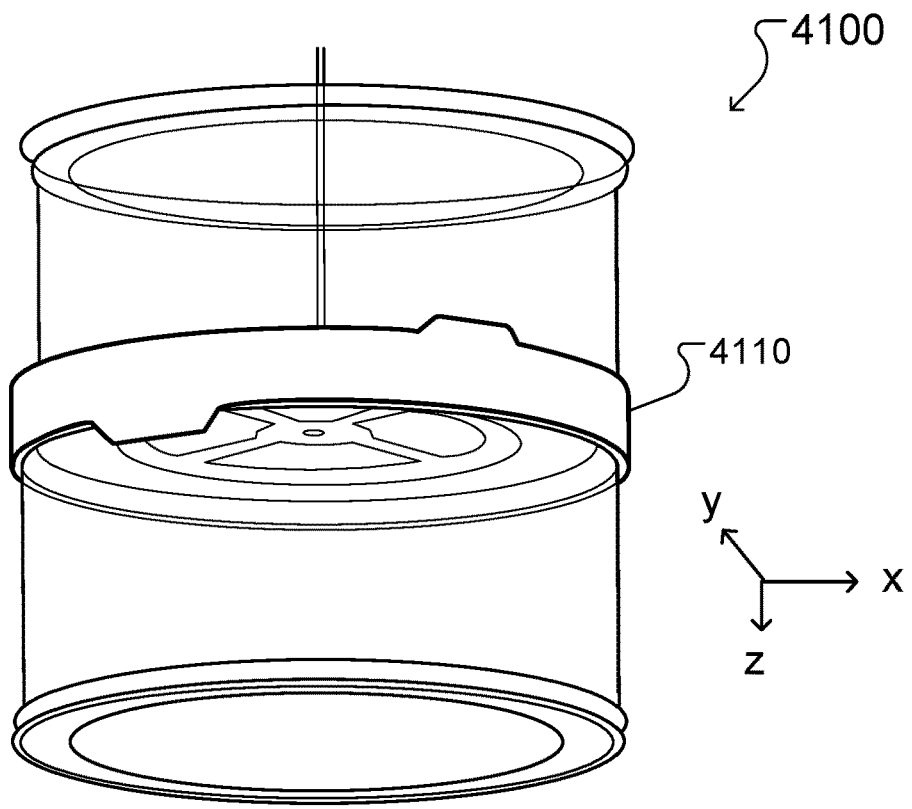
FIG. 41A
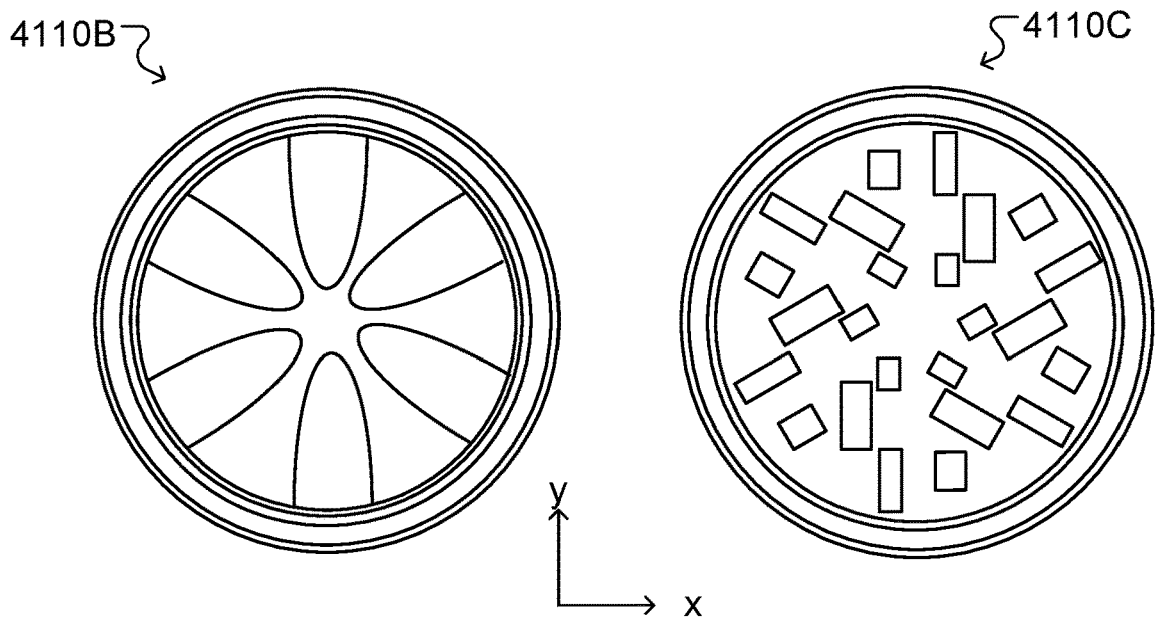
FIG. 41B
FIG. 41C

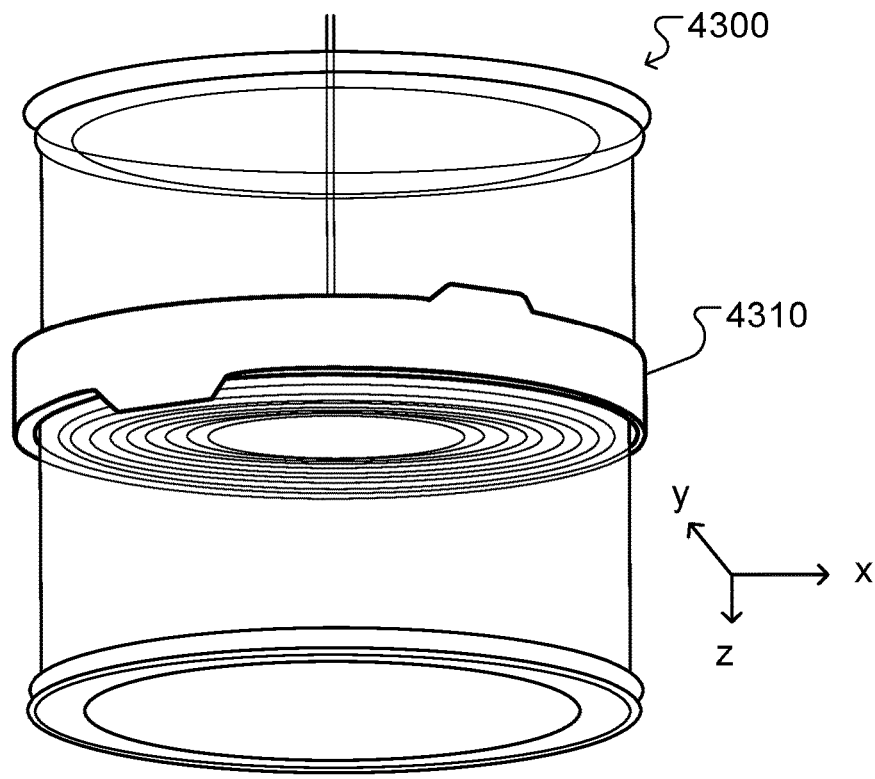
FIG. 43A
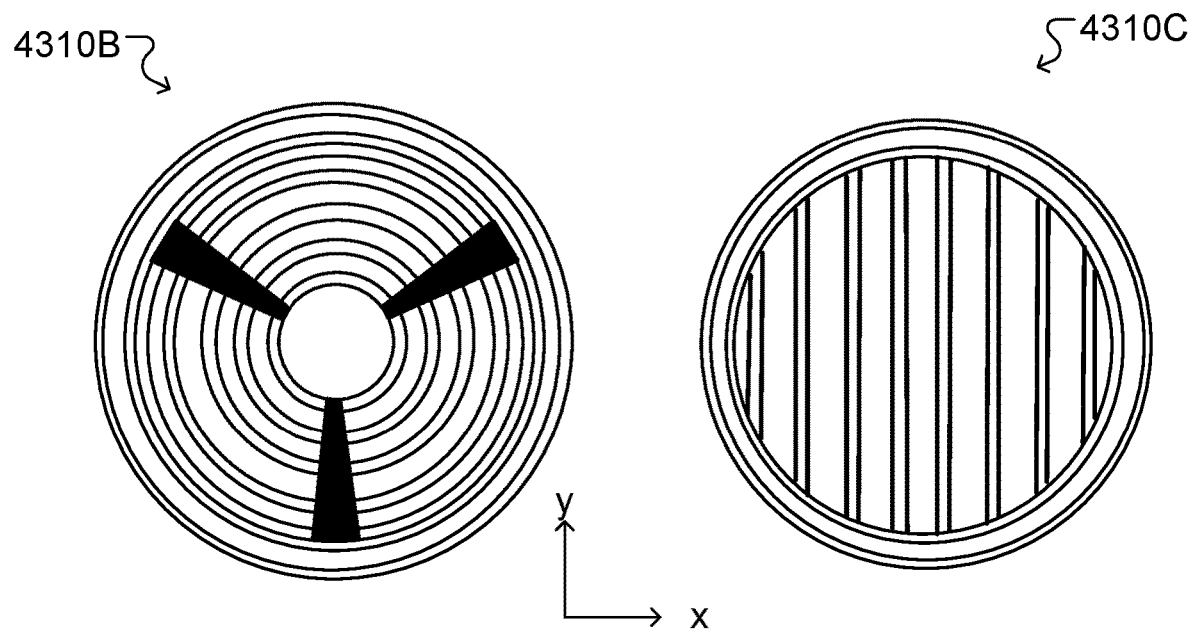
FIG. 43B
FIG. 43C optional: 145 and/or 142b;
when 142b is absent, output light beams 152b, 152a', 152b", 152a''', etc., also are absent.

optional: 145 and/or one or more of 142b-i, where i = 1-N.
when 142b-i is absent, corresponding output light beam 152b-i also is absent.

LUMINAIRES FOR SPATIAL DIMMING

CROSS-REFERENCE TO RELATED APPLICATIONS

This application is a U.S. national phase application of International Application No. PCT/US2019/013116, filed Jan. 10, 2019, which claims benefit under 35 U.S.C. § 119(e)(1) of U.S. Provisional Application No. 62/615,468, filed on Jan. 10, 2018, of U.S. Provisional Application No. 62/668,180, filed on May 7, 2018, of U.S. Provisional Application No. 62/686,630, filed on Jun. 18, 2018, of U.S. Provisional Application No. 62/687,055, filed on Jun. 19, 2018, of U.S. Provisional Application No. 62/741,458, filed on Oct. 4, 2018, and of U.S. Provisional Application No. 62/741,503, filed on Oct. 4, 2018, all of which being incorporated by reference herein.

FIELD OF TECHNOLOGY

The present technology relates to luminaires, optical systems and other lighting devices configured to allow control of amounts of light output in different directions.

BACKGROUND

Spatial dimming, also referred to as spatial tuning or dynamic beam shaping, refers to control of the amounts of light output by a luminaire during operation into the ambient environment in different directions and traditionally requires moving parts, multiple luminaires or complex luminaire architectures. There has been a long-felt need to mitigate this situation.

SUMMARY

In one innovative aspect, a luminaire includes a first light source and a second light source, the first and second light source operatively configured to provide amounts of light independently controllable during operation; and an optical system having an input aperture system and an output aperture system, the output aperture system displaced by a predetermined distance along a forward direction from the input aperture system, the optical system operatively coupled with the first and second light source and configured to direct light received at the input aperture system to the output aperture system, the output aperture system configured to output light from the first light source in first directions and light from the second light source in second directions at least in part different from the first directions.

The foregoing and other implementations can each optionally include one or more of the following features, alone or in combination. In some implementations, the optical system can have an elongate extension along a path that is other than straight and extends sideways relative to the forward direction. Here, the path can extend in a plane perpendicular to the forward direction.

In some cases, different portions of the output aperture system can receive and output different amounts of light from the first and second light sources. Further, the luminaire can include a light guide following the path and optically coupling the input aperture system and the output aperture system. Further, the light guide can include multiple light guide segments arranged along the path. For example, the light guide segments have spiral shapes relative to the forward direction. As another example, the light guide has a coil shape.

In some cases, the path can form a closed loop. Here, the closed loop can be a circle. In some cases, the path can follow a polygon. In some cases, the path can undulate or zigzag.

In some implementations, the optical system can be formed as one or more solid transparent bodies. In some implementations, all output light can propagate in backward directions with the first and second directions including obtuse angles relative to the forward direction. In some implementations, the first and second light sources can include solid state light-emitting elements.

In some implementations, the luminaire can include optical fibers configured to couple the first and second light sources with the input aperture system. In some implementations, one or more portions of the light guide can form part of the output aperture system and output light. In some implementations, the luminaire can include a light guide with one or more light guide segments each including pairs of opposing walls, and optically coupling the input aperture system and the output aperture system. Here, the light guide segments can be formed from a transparent material. Also, the opposing walls can flare in forward direction.

In some implementations, the output aperture system can output light in the first and second directions through one or more refractive optical interfaces.

In another innovative aspect, a lighting system can include the luminaire according to any one of the previous implementations and a control system configured to control amounts of light provided by the first and second light sources to the input aperture system.

The foregoing and other implementations can each optionally include one or more of the following features, alone or in combination. In some implementations, the lighting system is configured to provide more than two amounts of light from each of the first and second light source. In some implementations, the lighting system is configured to vary the amounts of light from the first and second light source continuously.

In another innovative aspect, a luminaire includes a first light source and a second light source, the first and second light source operatively configured to provide amounts of light independently controllable during operation; and an optical system extending along a forward direction from a first end to a second end and having an elongate nonlinear extension perpendicular to the forward direction, the first end operatively coupled with the first and second light source and configured to guide light received from the first and second light source along the forward direction and output along at least a portion of the elongate nonlinear extension perpendicular to the forward direction light from the first light source in first directions, and output along at least a portion of the elongate nonlinear extension perpendicular to the forward direction light from the second light source in second directions. The second directions are at least in part different from the first directions.

The foregoing and other implementations can each optionally include one or more of the following features, alone or in combination. In some implementations, the optical system can include a light guide with one or more light guide segments each having a pair of side surfaces extending along the forward direction, the light guide configured to guide light received from the first end to the second end. In some cases, the light guide segments can include multiple redirecting elements configured to redirect some of the guided light and configured to output at least some of the redirected light through one or both of the side surfaces. Here, the optical system can include an extractor arranged to receive light from the light guide, the extractor configured to output at least some of the received light. For example, the extractor can be arranged at the second end of the optical system.

In another innovative aspect, a light guide system includes multiple light guide segments, each having a pair of opposing side surfaces and a pair of opposing edges, both extending between respective input apertures and output apertures of the light guide segments along a forward direction, the side surfaces and the edges having shapes configured to allow a tubular arrangement of the light guide segments.

The foregoing and other implementations can each optionally include one or more of the following features, alone or in combination. In some implementations, the input apertures of the light guide segments in the tubular arrangement can be within a first plane. In some implementations, the output apertures of the light guide segments in the tubular arrangement are within a second plane. In some implementations, the output apertures of the multiple light guide segments are arranged to form one substantially contiguous output aperture.

In some implementations, the opposing side surfaces can flare in the forward direction. In some implementations, the opposing edges can flare in the forward direction.

In another innovative aspect, a lighting system includes a spatially controllable luminaire configured to allow separate control of amounts of light output in different directions; a sensor system configured to sense one or more ambient lighting conditions; a control system operatively coupled with the sensor system; and one or more lighting programs. The control system is configured to separately control amounts of light output from the spatially controllable luminaire in different directions based on the one or more ambient conditions and the one or more lighting programs.

The foregoing and other implementations can each optionally include one or more of the following features, alone or in combination. In some implementations, a lighting program is configured to provide amounts of light from the spatially controllable luminaire to increase spatial uniformity of one or more of the ambient lighting conditions.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF FIGURES

FIGS. 13 through 38 show schematic views of various example luminaires according to the present technology.

FIGS. 39 through 57 show schematic views of various example luminaires according to the present technology.

Reference numbers and designations in the various drawings indicate exemplary aspects, implementations of particular features of the present disclosure.

DETAILED DESCRIPTION

This disclosure includes technologies directed to variations of implementations disclosed in patent applications related to the edge coupled virtual filament (ECVF). Examples of such applications are U.S. Pat. Nos. 8,506,112 and 9,658,382, and U.S. Patent Application Publications Nos. 2013/0208495, 2013/0039050, 2016/0161656 and 2017/0010401. The contents of these applications are incorporated herein by reference.

The noted disclosures provide implementations that show how ECVF design can be used to collect and manipulate light from an array of light-emitting elements (LEEs) such as light emitting diodes. The instant technology can employ ECVF designs. Its implementations may take advantage of aspects of ECVF and beyond to provide new luminaires and detail novel ways to additionally configure and control the amount of light emitted from such luminaires and respective optical systems in different directions during operation. As such, it is noted that some implementations may employ no, only some or all aspects of ECVF. For example, some implementations of the instant technology may include an extractor whereas others do not. Further details are described herein.

Luminaires according to the instant technology include multiple light sources coupled with an optical system configured to condition light from the sources into a beam of light having a distribution suitable for respective lighting applications such as space, architectural, automotive, decorative or other forms of illumination. As such, the optical system provides one or more input apertures, collectively referred to as an input aperture system, and one or more output apertures, collectively referred to as an output aperture system. More generally, the optical system has an input end or input side and an output end or output side. The terms end and side can be used interchangeably. Input and output ends/sides each include their respective counterpart in the input/output aperture nomenclature. Consequently, the terms input side/end/aperture may be used interchangeably in this description. Likewise applies to the terms output side/end/aperture.

Figure 1A:
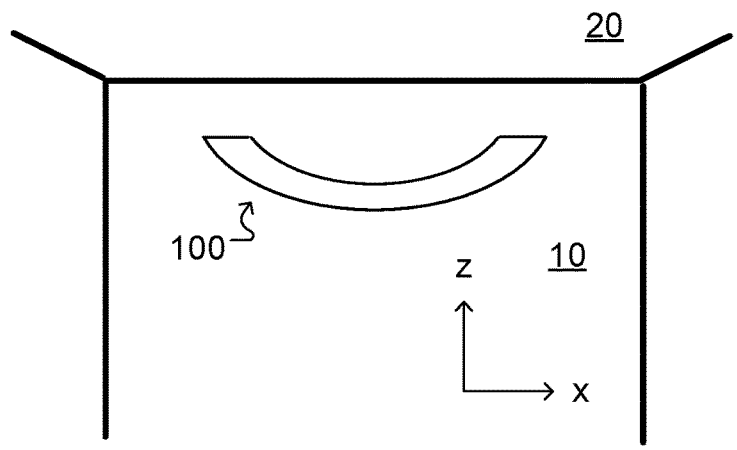
FIG. 1A schematically shows an upper portion of a wall with an example luminaire according to the present technology.

FIG. 1A shows an example luminaire 100 configured to illuminate a surrounding portion of a wall 10. In this case the luminaire 100 is located near the top edge of a wall 10 adjacent a ceiling 20 but can be mounted elsewhere in other installations and/or lighting applications. For space lighting purposes, such a luminaire is typically referred to as wall washer or wall grazer. The luminaire 100 has a generally arched or semi-circular profile when viewed along the z-axis with the open end facing up towards the ceiling and is configured to output substantially all light in a grazing manner towards the wall 10. Other example luminaires may have ellipsoidal, polygonal, undulating or other regular or irregular profiles with open or closed shapes.

Figure 1B:
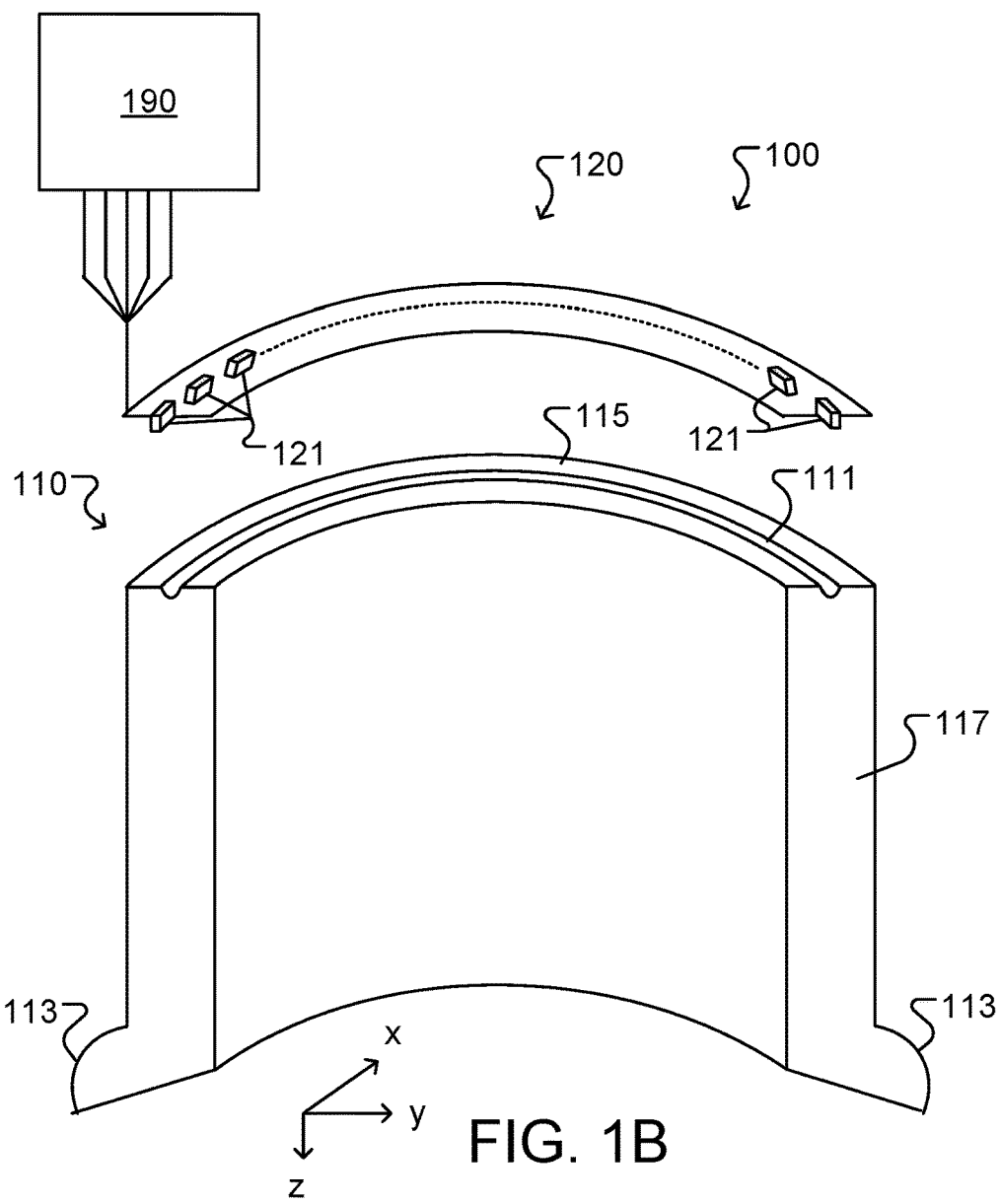
FIG. 1B shows a perspective view of the luminaire of FIG. 1A.

FIG. 1B shows a perspective exploded view of some components of the luminaire 100 including an optical system 110, a single modular light-engine 120 including a substrate with light-emitting elements (LEEs) 121 that is configured to operatively connect to a control system 190. In this case the LEEs are multiple discrete light-emitting diodes (LEDs). In other examples, the LEEs may be displaced from the optical system 110 via optical fibers (not illustrated). In such cases as little as one LEE may be coupled to a bundle of fibers with the optical fibers receiving light from the one or more LEEs on one end and the opposite ends of the fibers being optically coupled with the optical system. In this case, the light sources for the optical system 110 are then provided by the output ends of the optical fibers.

In the instant example, luminaire 100 is configured to allow independent control of each of the LEEs 121. In other examples, luminaires or their light engines may be configured to allow control of LEEs by group rather than by individual LEE. Furthermore, multiple light engines may be employed to facilitate spatial dimming control, fabrication and/or other aspects of the instant technology. For example, different groups of LEEs may be provided by the different light engines.

It is noted that the example luminaire 100 as well as other luminaires according to the present technology, even if the luminaire/light engine(s) is configured for spatial dimming, may also be used without actually activating the spatial dimming capability. This may be accomplished by controlling the respective LEEs collectively or according to other non-spatial dimming principles whether by LEE or by group of LEEs. Such luminaires, however, may still include different types of light sources that are independently controllable to output uniform light, stabilize color or CCT or other aspects of the output light. It is further noted that luminaires according to the present technology may be useful on their own completely without the ability for spatial dimming and as such not even be configured to support the spatial dimming function. This may be straightforward in luminaires with modular light engines by employing light engines that do not offer control of the light sources for spatial dimming purposes.

The optical system 110 includes a coupling portion 115 with a groove 111 providing an input aperture for receiving light from the LEEs 121. The groove is sized to accommodate the LEEs 121 when the light engine 120 and the optical system are operatively combined. The coupling portion 115 can be tapered (not illustrated) radially relative to an axis of the coupling portion parallel to the z-axis to collimate light before it propagates to light guide 117. The light guide 117 of this example is configured to aid in mixing light from different LEEs 121 to provide a more uniform light distribution along the exit aperture of the light guide 117 near the extractor 113. The extractor 113 and other components of the luminaire 100 are described in detail in the incorporated references noted above.

Figure 1C:
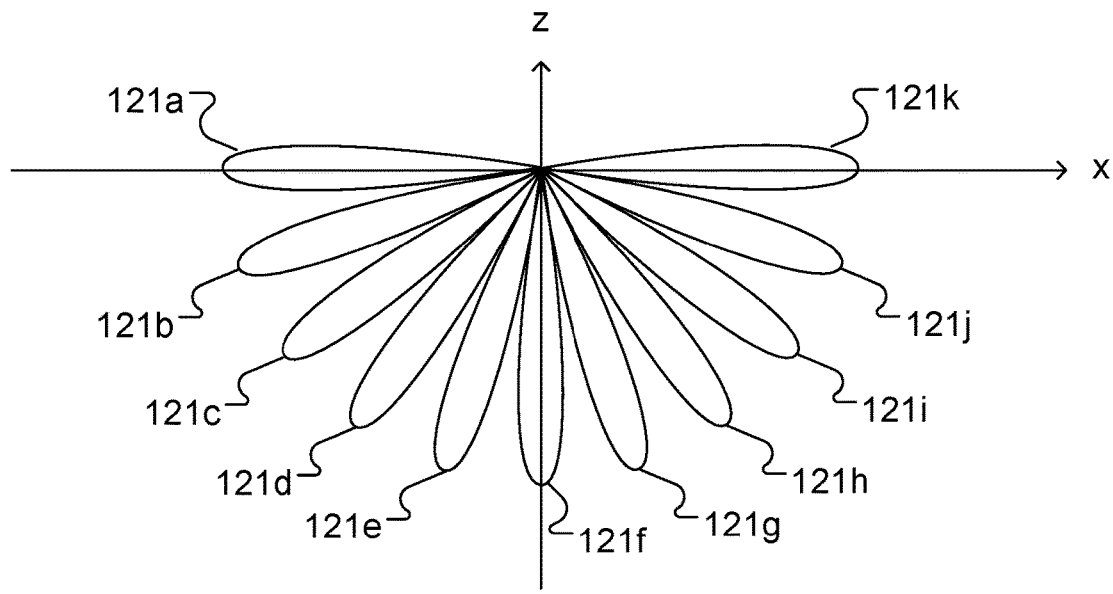
FIG. 1C shows a polar plot of example output light distributions of individual light sources of the luminaire of FIGS. 1A-1B.
Figure 1D:
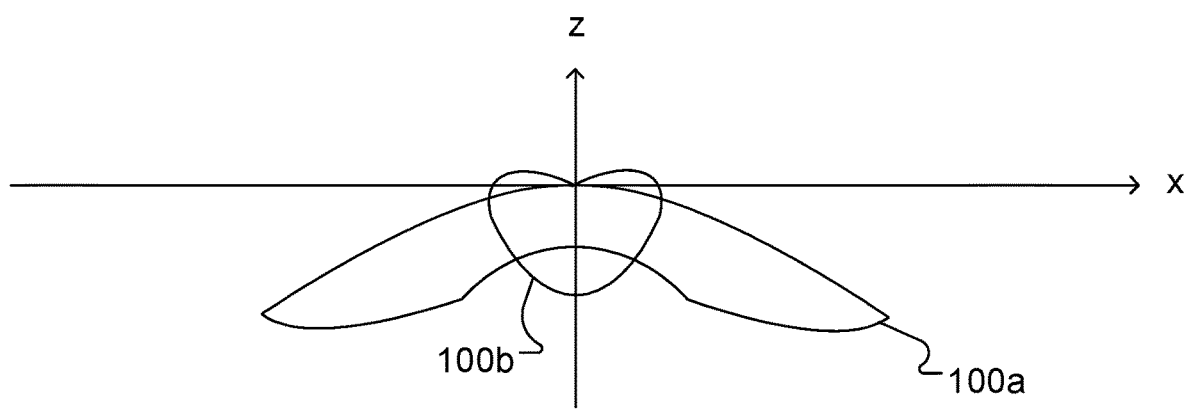
FIG. 1D shows a polar plot of example output light distributions of the luminaire of FIGS. 1A-1B.

FIG. 1C shows a polar plot of approximate example output light distributions 121a through 121k of each of the light sources of the luminaire of FIG. 1A. In this example, the luminaire 100 includes eleven individually independently controllable LEDs 121, providing respective light distributions 121a through 121k if they were individually resolved as illustrated. The present technology achieves spatial dimming as a superposition of individually weighted light distributions 121a through 121k by selectively activating and/or dimming the LEDs 121. FIG. 1D schematically illustrates two symmetrical example light distributions 100a and 100b being the result of suitably superimposed and respectively dimmed light distributions 121a through 121k. Potential undulations in the overall light distribution of the superposed components are possible depending on the implementation. Such undulations are not illustrated in the example light distributions 100a and 100b. Note that other light distributions can be symmetrical or asymmetrical depending on the control and selective activation of the various light sources of the luminaire. It is noted that the spatial dimming resolution achievable to generate example light distributions such as 100a and 100b is determined based on the resolution provided by the individual light distributions 121a through 121k. Resolution may be different for example if the light sources are grouped into independently controllable groups.

Figure 2A:
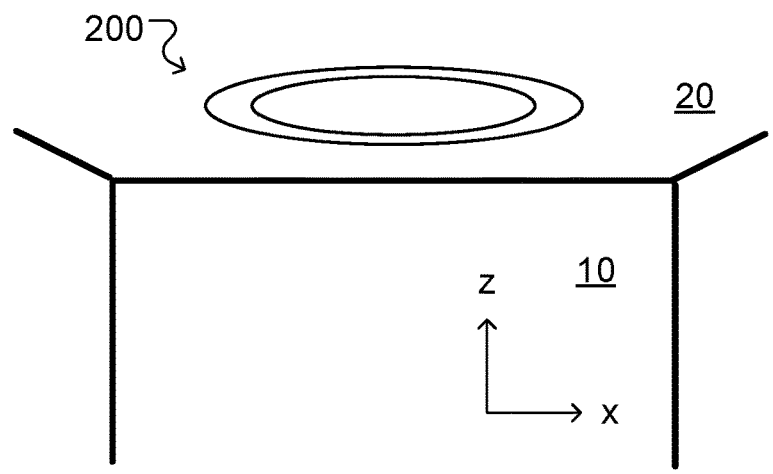
FIG. 2A schematically shows a ceiling with an example luminaire according to the present technology.

FIG. 2A schematically shows an example luminaire 200 arranged on/in/near a ceiling 20 and is configured to illuminate the surrounding portion of the ceiling 20. The example luminaire 200 has a circular profile within the x-y plane. Depending on implementation, respective luminaires may be installed in a partially or fully recessed/protruding manner relative to a ceiling or a wall, flush mounted such that the output aperture is substantially flush with the plenum or pending from a ceiling/wall. Depending on the implementation, other example luminaires can have ellipsoidal, polygonal, undulating or other regular or irregular profiles which do not necessarily need to be closed.

For space lighting purposes, luminaires that emit light to a ceiling can be used to avoid impressions of overly dark ceilings in an otherwise lit space. In this example, the luminaire 200 has an extractor that protrudes a certain distance below the ceiling from which light is output towards the ceiling. The luminaire can be configured to direct amounts of light toward the ceiling that can provide sufficient reflected light from the ceiling to indirectly light target surfaces below the luminaire and provide an ambient lighting experience similar to daylight received through wall/ceiling windows from an overcast sky or provide just enough light to provide a pleasant impression of the ceiling.

Additionally, or instead, the extractor may be configured to output light in forward direction and provide direct illumination on target surfaces below the luminaire. Adequate direct illumination can provide contrast on target surfaces and avoid unnecessary eye strain. Depending on the implementation, only the direct, only the indirect or both direct and indirect illumination may be spatially dimmable. Depending on the implementation, for separate spatial dimming of direct and indirect illumination, a luminaire may be provided with different extractors, or the extractor profile can be varied suitably along the extension of the extractor, for example.

Figure 2B:
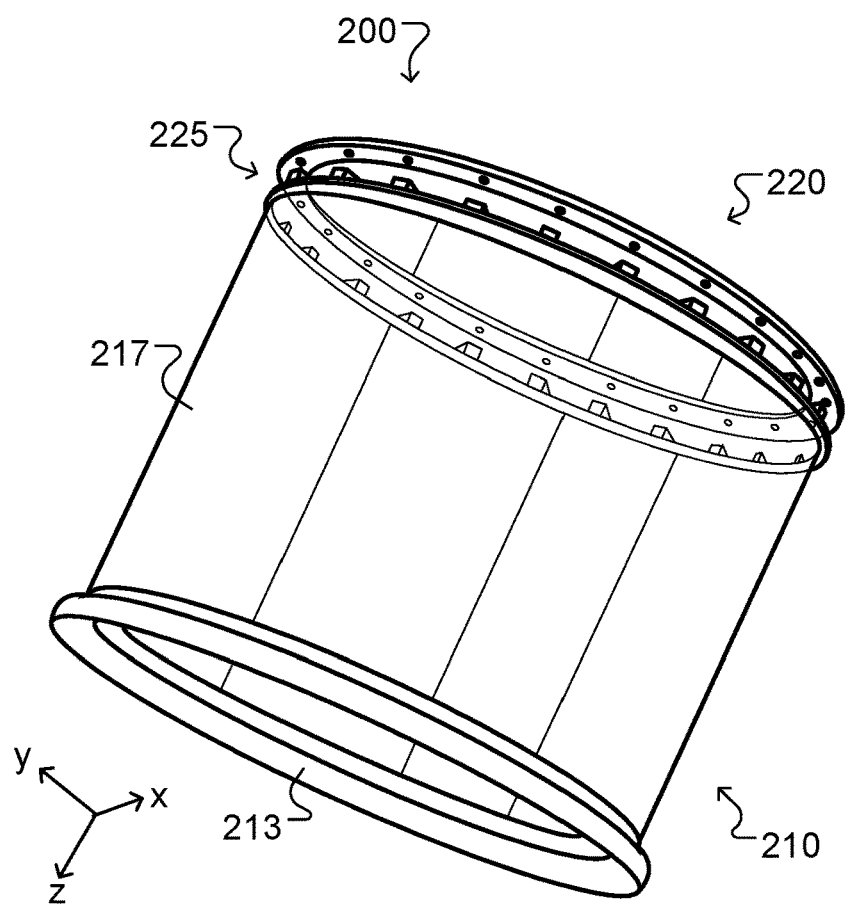
FIG. 2B shows an exploded perspective view of the luminaire of FIG. 2A.

FIG. 2B shows an exploded view of the optical system 210 and the light engine 220 of the luminaire 200. The example luminaire 200 shares similarities with the example luminaire 100 described above but has a closed tubular shape and a coupling system 225 separate from the light guide 217 with a number of discrete hollow reflective pockets shaped to receive and collimate light from the LEEs of the light engine 220. The coupling system 225 in this example relies on reflection from the hollow reflective pockets. It can be formed in a number of ways, for example by vacuum forming a sheet of suitably reflective material over a mold. In this example, the coupling system 225 extends beyond the output apertures of the pockets across the full thickness of the input end of the tubular light guide 217. This can be different in other implementations. The output end of the light guide 217 is coupled with the extractor 213. The extractor 213 has a profile similar to that of the extractor 113 of the example luminaire 100 described above.

Figure 2C:
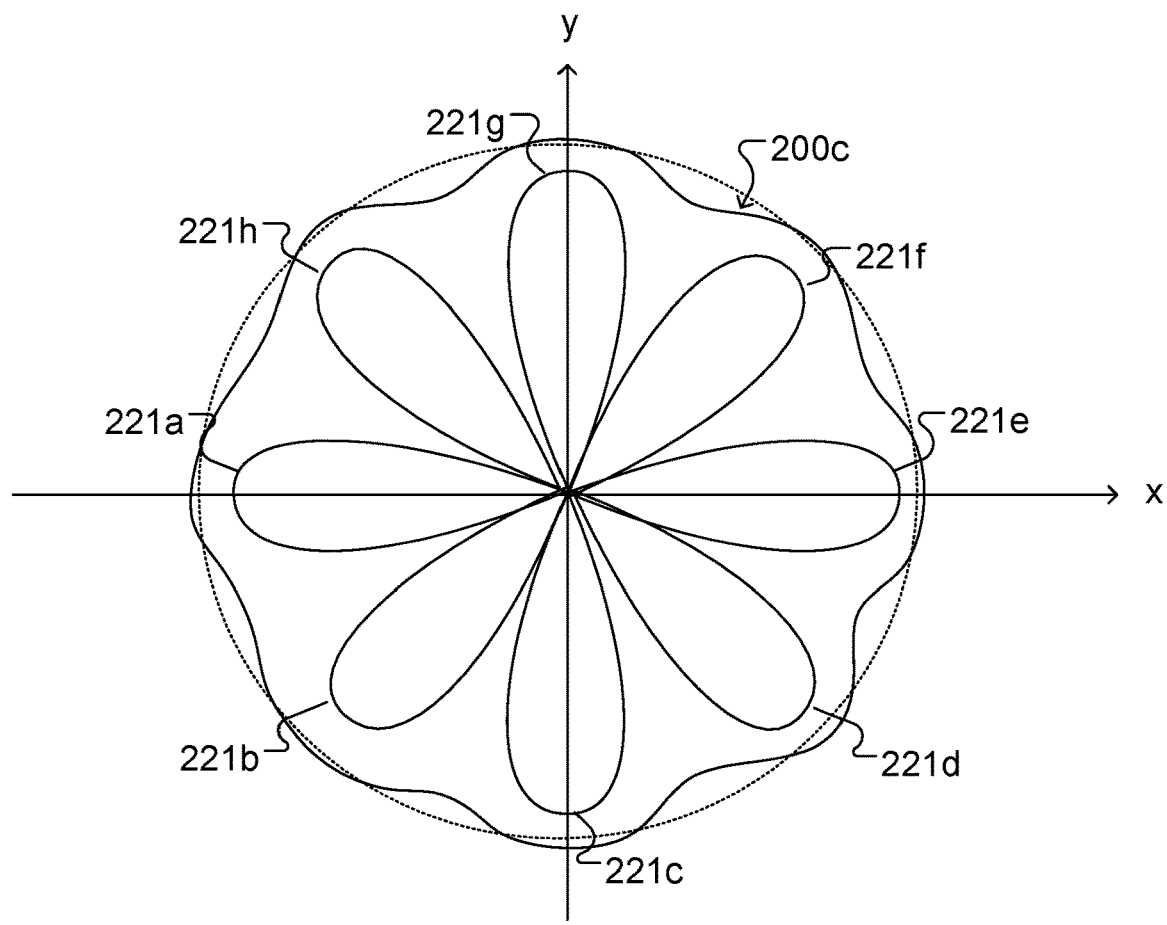
FIG. 2C shows a polar plot of various example light distributions of the luminaire of FIG. 2A.

FIG. 2C shows a polar plot of example light distributions 221a through 221h if respective LEEs were individually activated as well as a superposition 200c of all light distributions 221a through 221h (without scale) assuming all LEEs provide like amounts of light to the system. As illustrated, the superposition 200c exhibits undulations in the light distribution due the number and shapes of the respective example light distributions 221a through 221h of the underlying light sources (LEEs). Again, depending on the implementation, such light distributions may refer to only direct, only indirect, or both direct and indirect illumination, and direct and indirect illumination may be separately or only commonly controllable.

Figure 2D:
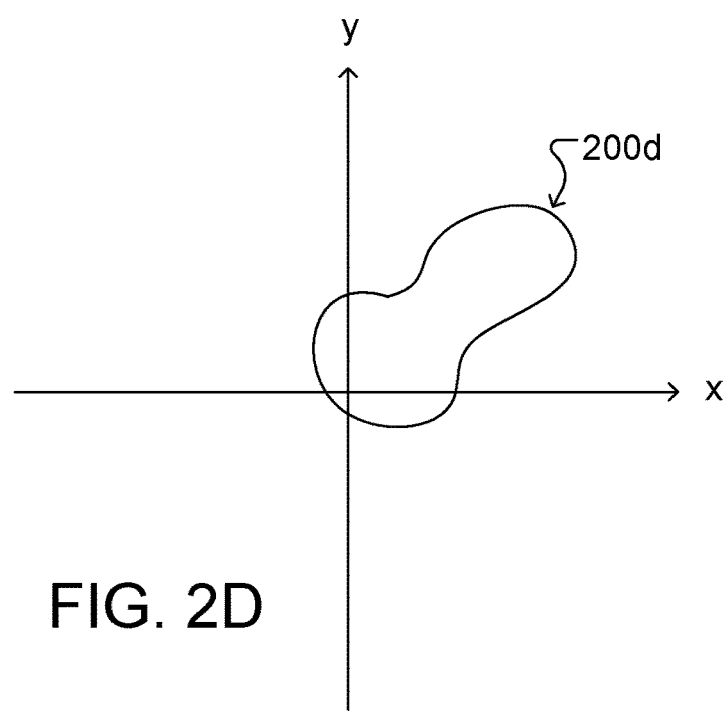
FIG. 2D shows a polar plot of an example light distribution of the luminaire of FIG. 2A.
Figure 2E:
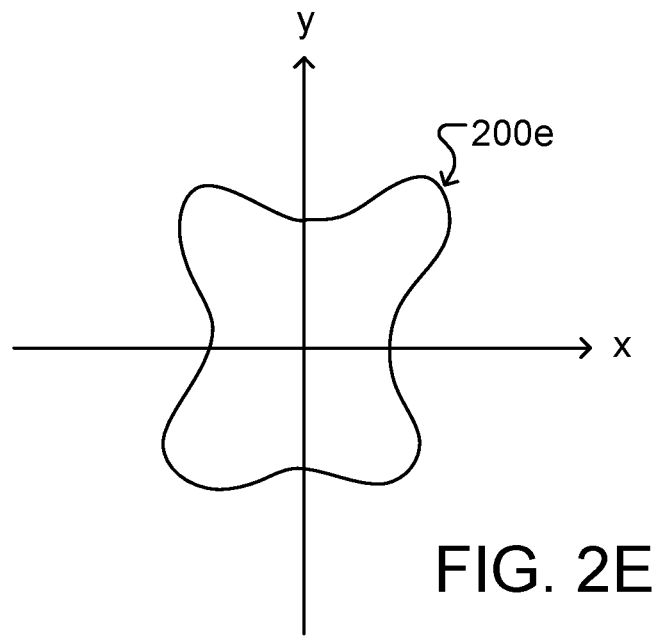
FIG. 2E shows a polar plot of an example light distribution of the luminaire of FIG. 2A.
Figure 2F:
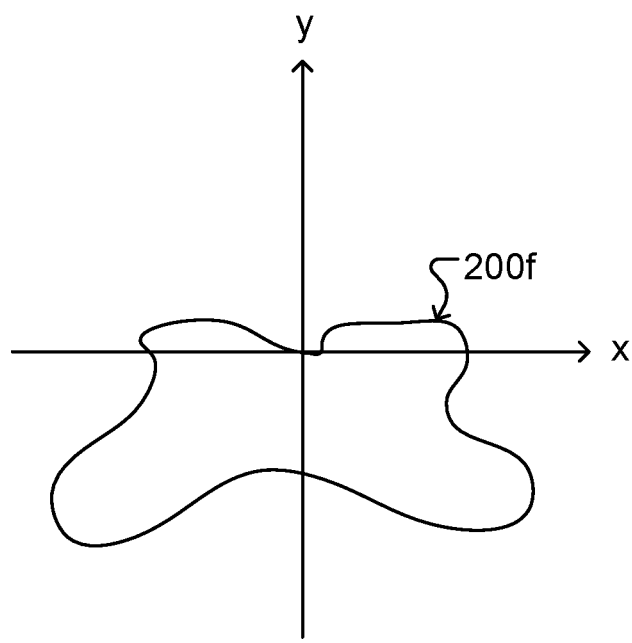
FIG. 2F shows a polar plot of an example light distribution of the luminaire of FIG. 2A.

FIGS. 2D, 2E and 2F illustrate further example light distributions achievable with the luminaire 200 by selectively dimming respective LEEs. The light distribution of FIG. 2D is a superposition 200d of light distributions 221e, 221f and 221g with 221e and 221g being scaled back (respective LEEs dimmed lower) compared to the light distribution 221f. The light distribution of FIG. 2E is a superposition 200d of all light distributions 221a through 221h with light distributions 221a, 221c, 221e and 221g being scaled back (respective LEEs dimmed lower) compared to the remaining light distributions. The light distribution of FIG. 2F is a superposition 200f of light distributions 221a through 221e with light distributions 221a, 221c and 221e being scaled back (respective LEEs dimmed lower) and the LEEs of the remaining light distributions OFF.

Accordingly and depending on potential symmetries of example luminaires, spatial dimming can achieve numerous different light distributions amounting to as much as the product of the number of dimming levels per light source times the number of independently controllable light sources.

Figure 3:
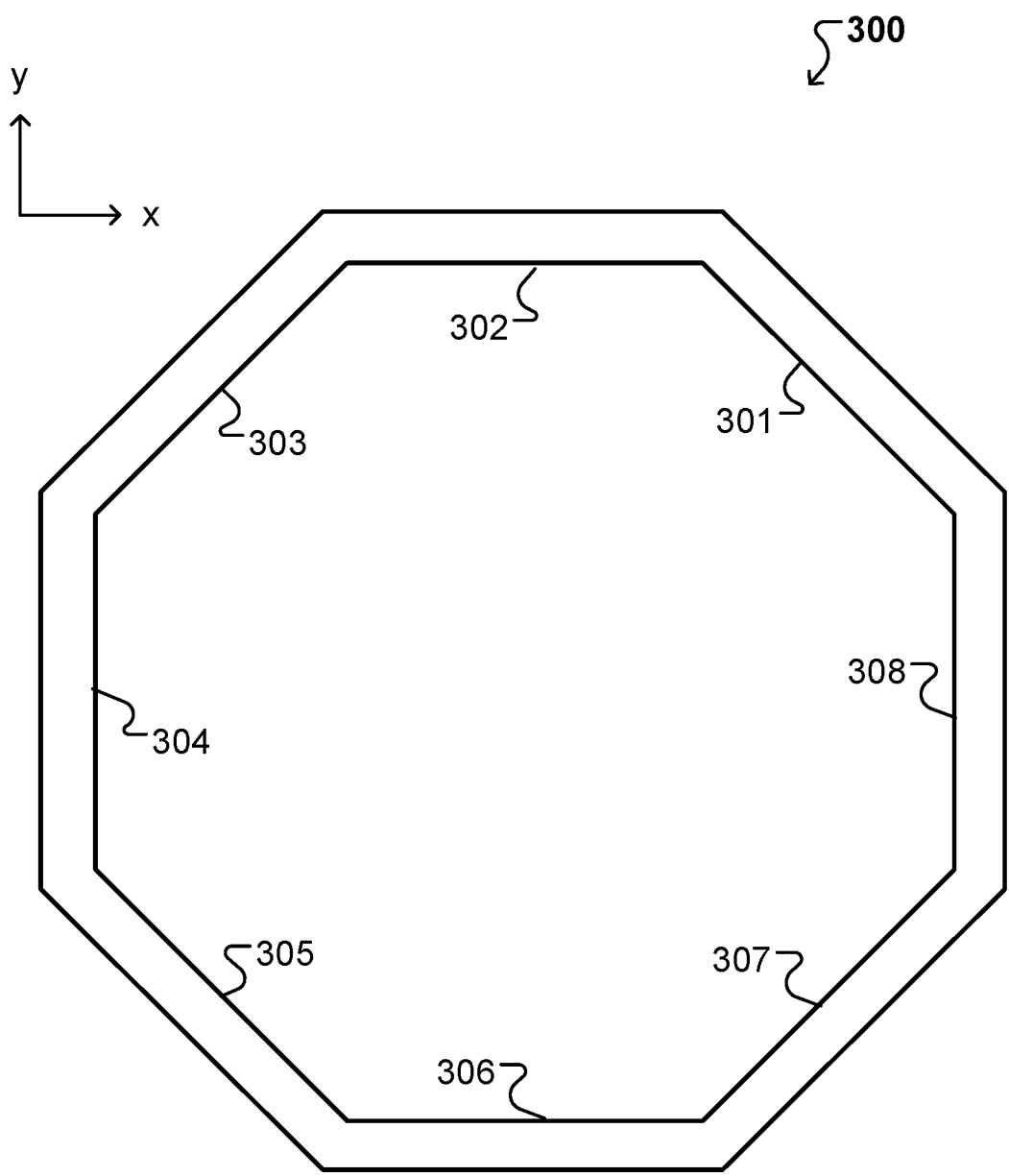
FIG. 3 shows a schematic view of a profile of an example luminaire according to the present technology.

FIG. 3 schematically shows a profile of a further example luminaire 300 comprising eight straight equal length luminaire modules 301 through 308 arranged in an octagon shape. Depending on the specific example, corners formed between the luminaire modules 301 through 308 can be optically passive or active, separated or fully optically coupled to allow light propagation across the edge between adjacent modules.

Figure 4:
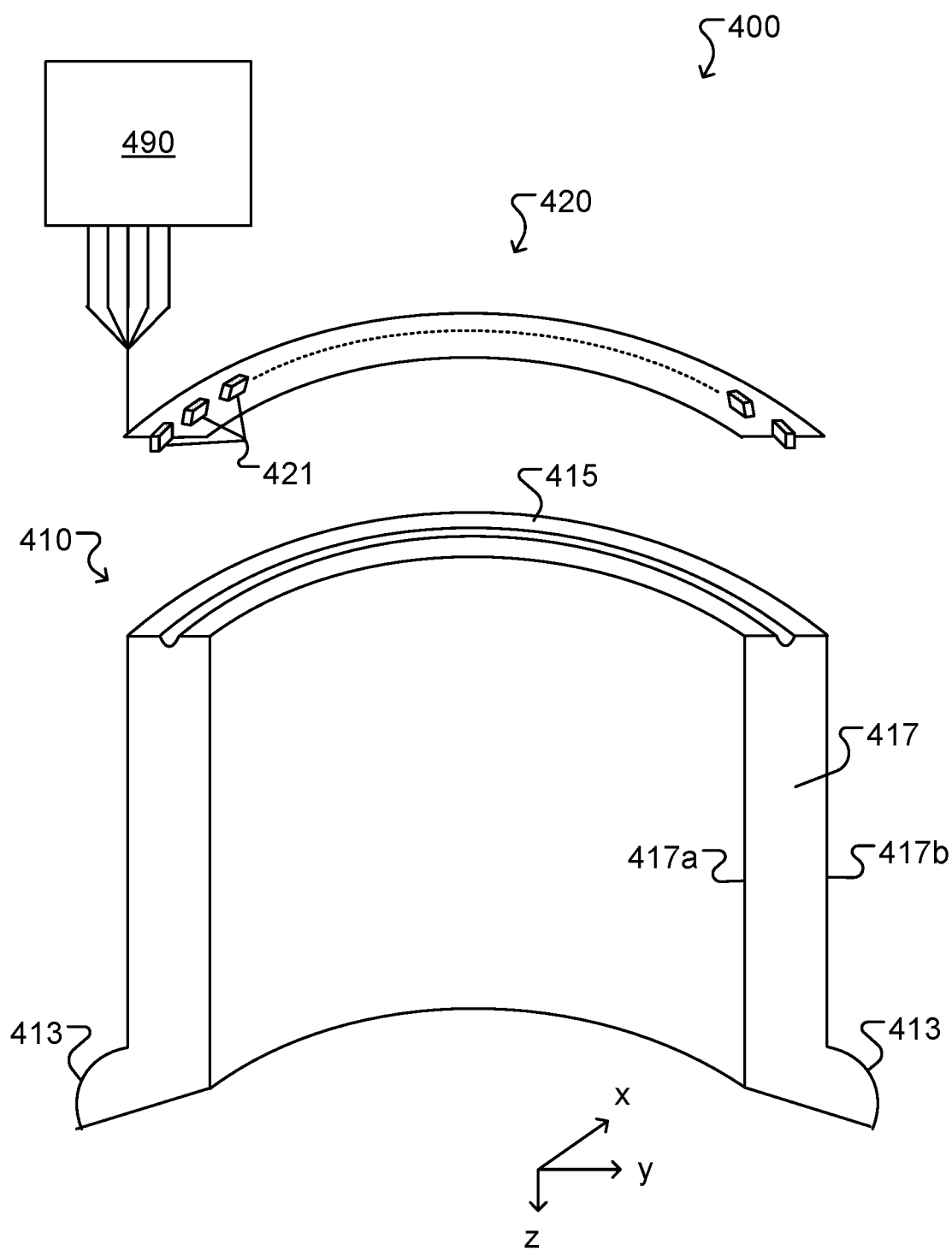
FIG. 4 shows a perspective view of an example luminaire according to the present technology.

FIG. 4 shows a perspective view of another example luminaire 400 having an arched shape that is similar to the luminaire 100 described above. Other example luminaire geometries including closed loops, polygons, undulating open or closed shapes are possible. The example luminaire 400 is configured, however, to allow light to escape from side surface 417a, 417b or both 417a and 417b of the light guide 417. Various escape mechanisms can be employed. For example, the light guide 417 may include redirecting elements (not illustrated) that are arranged inside the light guide or in/on/near/adjacent the surface of the light guide 417. The redirecting elements are configured to redirect a portion of guided light that otherwise undergoes total internal reflection in such a way that the guided light no longer only totally reflects on the respective side surfaces 417a, 417b or both.

Generally, example redirecting elements include scattering centers, surface features on the side surfaces 417a and/or 417b or other redirecting elements alone or in combination. Scattering centers may be disposed within the light guide 417 itself or in/on the side surfaces 417a, 417b (including on the outside of the side surfaces) of the light guide. Furthermore, the injected light at the input aperture of the light guide 417 adjacent the light engine 420 may have a distribution pattern that allows a portion of the injected light to undergo TIR and another portion to leak some light via refraction at the side surfaces 417a and 417b. Moreover, the light guide may be tapered instead of having a constant width W and become narrower with increasing distance from the input aperture forcing declining incidence angles (closer to normal incidence) achieving transmission of some light via the side surfaces 417a and 417b with increasing number of incidences. Other escape mechanisms are possible.

To achieve spatial dimming as described, the luminaire 400 includes a light engine 420 with individually/separately controllable LEEs 421 operatively coupled with a respective control system 490. The effect on spatial dimming of selective activation of the LEEs 421 via the control system 490 may depend on what particular escape mechanisms (as noted above) are employed in the luminaire. For example, scattering elements may provide a more diffuse output light distribution compared to other escape mechanisms and additionally affect the output light distribution provided by the extractor 413.

In further implementations, the extractor at the distal end of the light guide 417 relative to the light engine may be modified or omitted. For example, the bottom end of the light guide 417 (opposite the input aperture), may include linear and/or curvilinear surfaces different from the described extractors, transmit and/or reflect some or all incident light, and/or be partially or fully specular or diffuse reflective and/or diffuse transmissive. For example, the light guide may be terminating with a planar, conical or otherwise shaped surface arranged distal of the light engine. Such a surface may be configured to provide substantially no light output and reflect all guided light incident from the light guide back into it, for example. Some examples are described in US Patent Publication No. 2017/0010401 and U.S. Pat. No. 9,658,382.

Figure 5:
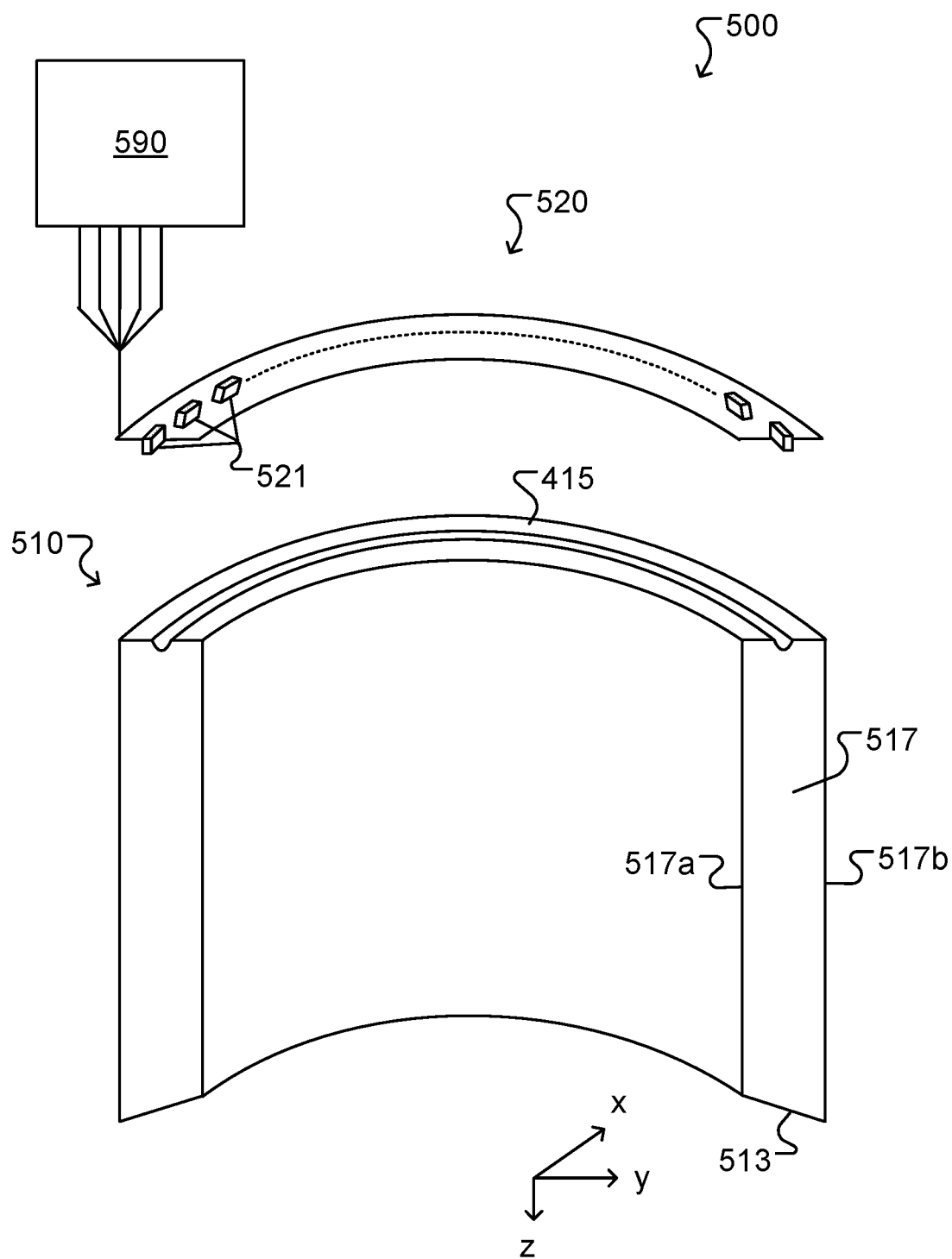
FIG. 5 shows a perspective view of an example luminaire according to the present technology.

FIG. 5 shows another arched shaped example luminaire 500 which includes light engine 520 and light guide 517. To achieve spatial dimming as described, the light engine 520 includes individually/separately controllable LEEs 521 operatively coupled with a respective control system 590. Here, the light guide 517 is terminated with conical surface 513 arranged distal of the light engine. In other examples, substantially all guided light may be output through side surfaces 517a, 517b of the light guide 517 before reaching its distal end. This can be the result of various escape mechanisms, for example it can occur in systems with a tapered light guide, or with a light guide that sufficiently extends in forward direction and includes adequate amounts of redirecting elements. In such cases the distal end of the light guide may be configured based purely on appearance, if any portion remains visible once installed. The noted aspects can be employed in other open or closed shape example luminaires.

Further Luminaires and Optical Systems

It is noted that luminaires according to the present technology, may also be used without actually activating the spatial dimming capability. This may be accomplished by controlling the respective LEEs collectively or according to other non-spatial dimming principles whether by LEE or by group of LEEs. Such luminaires, however, may still include different types of light sources that are independently controllable to output uniform light, stabilize color or CCT or to control other aspects of the output light.

It is further noted that luminaires according to the present technology may be useful on their own completely without the ability for spatial dimming and as such may not even be configured to support the spatial dimming function. This may be straightforward in luminaires with modular light engines by employing light engines that do not offer control of the light sources for spatial dimming purposes. As such, an ability to perform spatial dimming is determined by whether or not LEEs can be controlled individually or by group which rests in the configuration of the light engine.

The following describes various examples of luminaires or portions thereof that can include/be combined with light engines that are configured to provide spatial dimming or light engines that do not support this function. Respective luminaires, optical systems or other components may provide advantages for fabrication only, design only, spatial dimming only or other aspects or combinations thereof beyond those described.

Light Guide

Figure 6A:
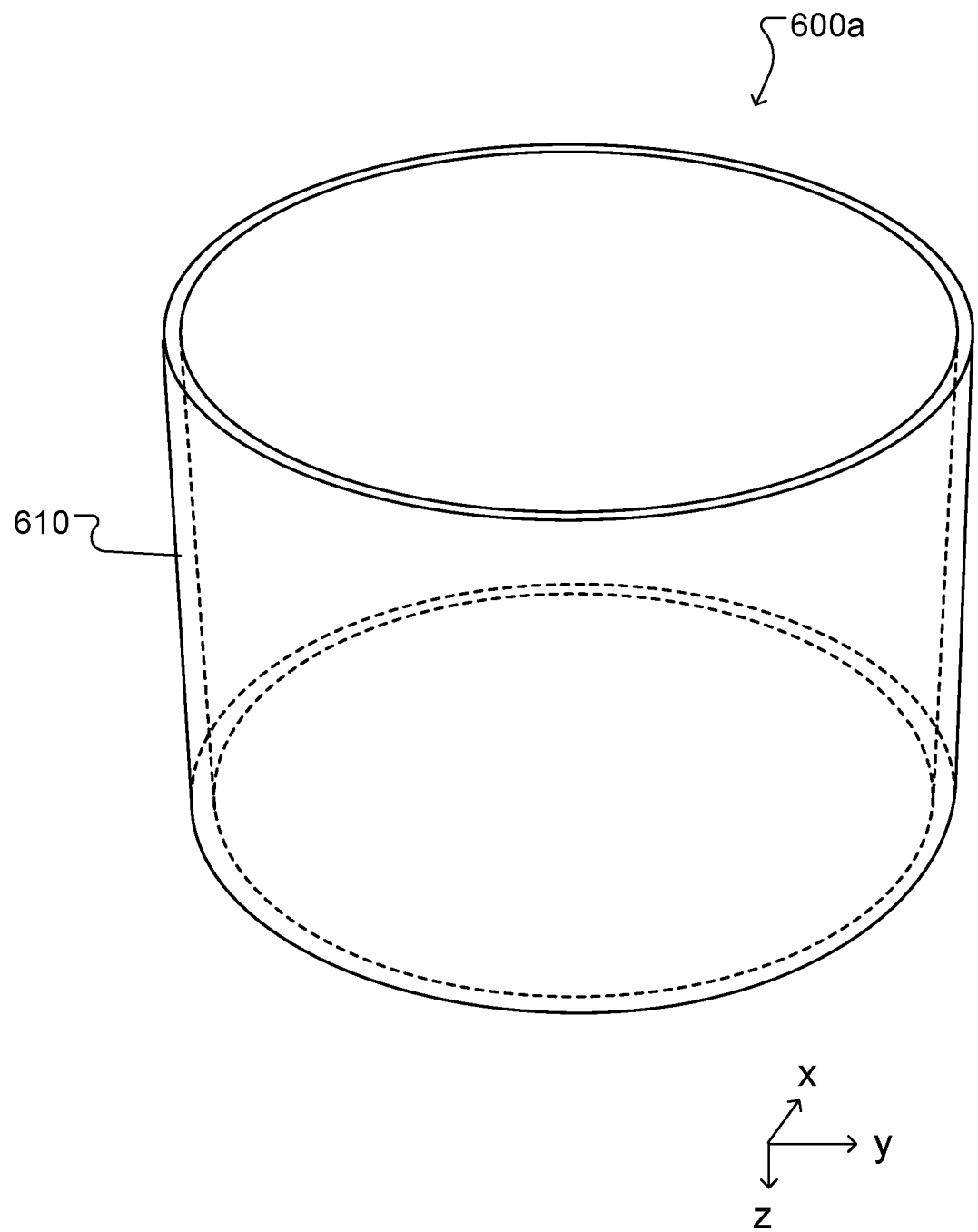
FIG. 6A shows a perspective view of an example luminaire according to the present technology.
Figure 6B:
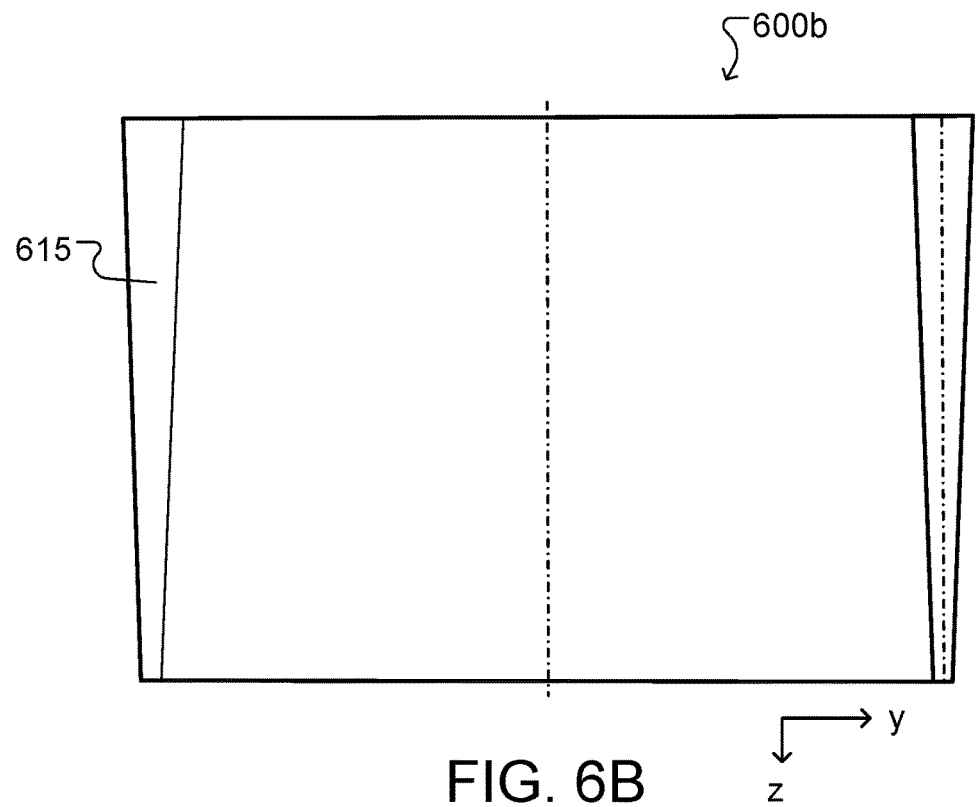
FIG. 6B shows a sectional view of an example light guide according to the present technology.
Figure 6C:
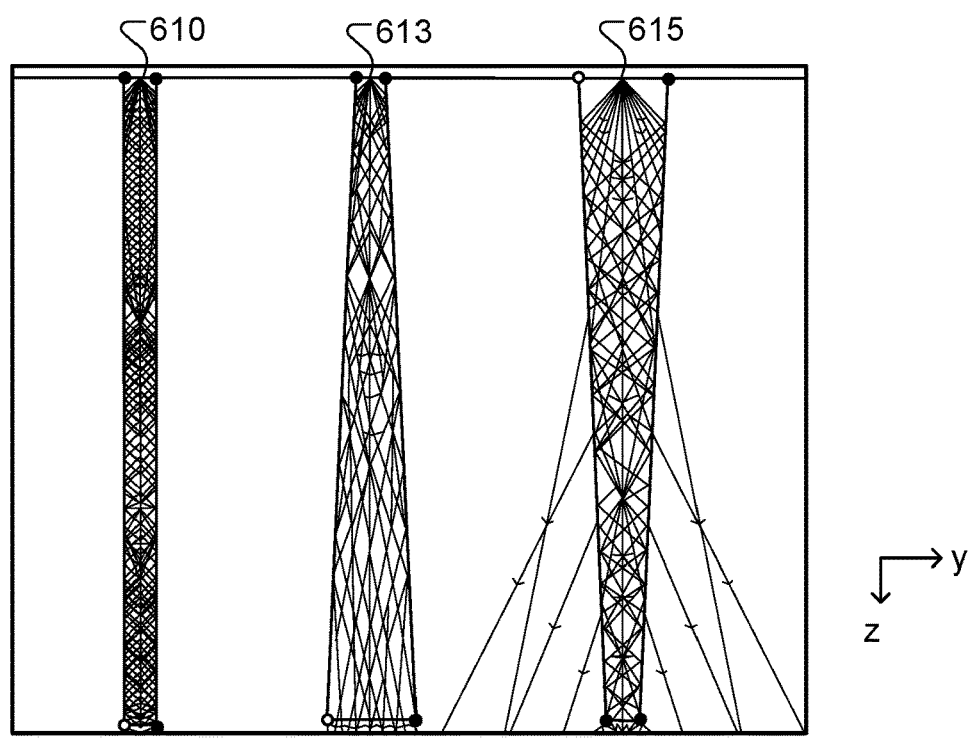
FIG. 6C shows sectional views through walls of an example light guide according to the present technology.

FIG. 6A shows a perspective view of a generally contiguous/monolithic tubular example light guide 600a. The light guide 600a can have a straight cylindrical shape or have conical walls. FIG. 6B shows a sectional view through the wall of an example tubular light guide 600b with a revolving, tapering tubular wall 615—the taper is in the z-direction. Depending on the direction of the taper, light guides with tapering walls can provide collimating or decollimating effects. FIG. 6C shows three sectional views of different walls 610, 613, 615 of respective example light guides with sample rays propagating from the injection end (input aperture) at the top of FIG. 6C toward the ejection end (output aperture) of the light guide/wall at the bottom of FIG. 6C. Compared to uniformly thick walls 610, widening/flaring walls 613 will collimate, narrowing/tapering walls 615 will de-collimate the rays, the latter can cause light extraction through the side surfaces of the light guide 615.

In addition to optical effects, walls of flared light guides 613 and of tapered light guides 615 can improve yield and cost when fabricating light guides, for example when curvilinear and other shapes such as tubular light guides need to be fabricated via shot/injection molding. In such cases walls of flared light guides 613 and of tapered light guides 615 can greatly facilitate release of the light guide from a mold after injection and improve yield. Like considerations apply to implementations described with reference to FIG. 12.

To further improve yield, light guides may be formed as a light guide system from multiple modules rather than one monolithic component. The components/modules of such a polylithic light guide can then be shaped to allow easy release from respective shot/injection molds on their own without requiring additional tapered walls or other surfaces. This can reduce component volume, molding time, tooling complexity and ultimately cost of fabrication compared to a tapered monolithic light guide.

Figure 7A:
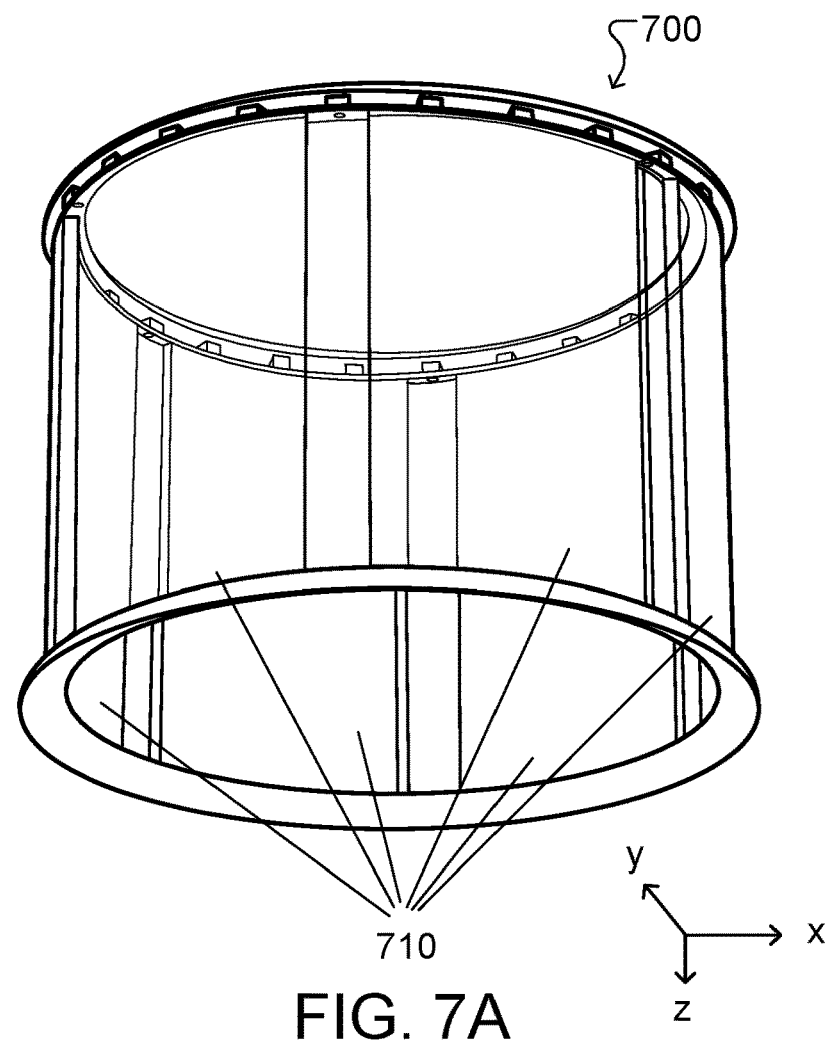
FIG. 7A shows a perspective view including multiple light guide segments of a luminaire according to the present technology.

FIG. 7A shows a perspective view of a portion of an example luminaire 700 with multiple light guide segments 710 in a tubular arrangement. Aside from its fabrication aspects, the segmentation suitably supports the described spatial dimming and can be configured to aid spatial dimming resolution.

Depending on the implementation, light guide segments 710 may be arranged to form gaps or seams between them. Gaps can be as narrow as manufacturing tolerances allow or be several millimeters or more. Gaps may be filled or left open to provide suitable optical interfaces with respective light guide segments. For example, adequately smooth and suitably shaped edges of light guide segments can aid in the guiding of the light within and the shaping of the distribution of the light extracted from the light guide. In some implementations, gaps can be filled with clear, translucent or opaque material to affect optical performance and/or aesthetics of the assembled fixture.

Figure 7B:
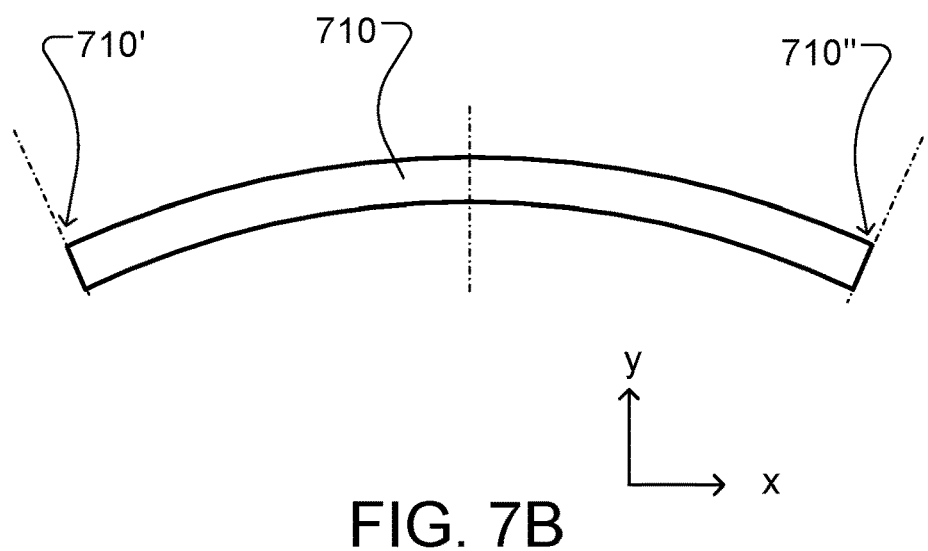
FIG. 7B shows a sectional view of one of the light guide segments of FIG. 7A.

FIG. 7B shows a sectional view of one of the multiple light guide segments 710. In this example, the light guide segments have arched shapes in the x-y plane that correspond with the curvature of the tubular shape of the example luminaire 700. Opposite edges 710' and 710" mark the widest extension of such a segment and provide a natural location for mold part lines marking where the multiple pieces of the respective mold should be configured to come apart to release the segment from the mold after molding.

Figure 8A:
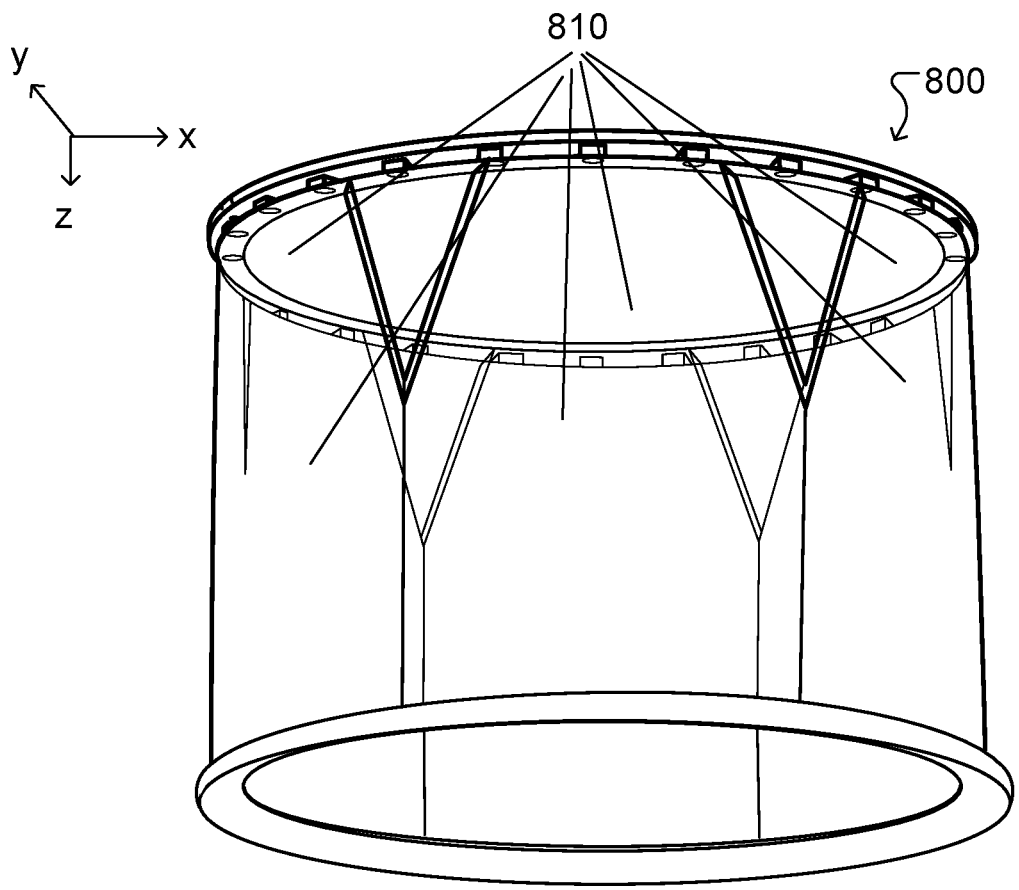
FIG. 8A shows a perspective view including multiple light guide segments of a luminaire according to the present technology.
Figure 8B:
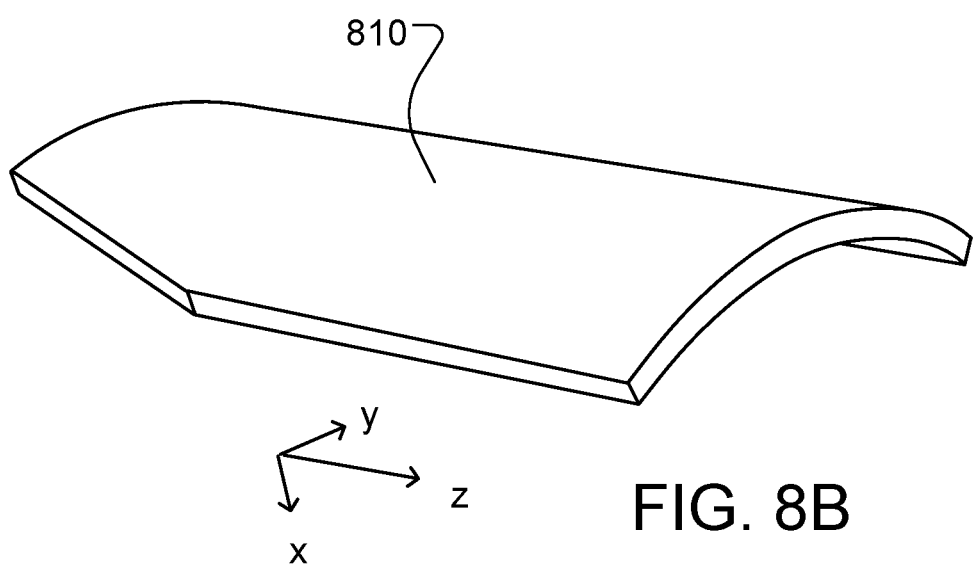
FIG. 8B shows a perspective view of one of the light guide segments of FIG. 8A.

FIG. 8A shows a perspective view of a portion of an example luminaire 800 with multiple light guide segments 810. The segments 810 provide azimuthal taper to aid respective azimuthal collimation of injected light and azimuthal resolution for spatial dimming—in contrast to the radial taper discussed with regard to FIG. 6C. The azimuthal taper can be linear or curvilinear and configured to provide predetermined collimation of the injected light. FIG. 8B shows a perspective view of one of the multiple light guide segments 810. Again, such a segment can be molded easier than a corresponding monolithic light guide and provides a reduced shot volume. Depending on the lighting application, the tapered portions of the light guide segments in a respective complete luminaire may be obscured by other components or not be visible after final installation of the luminaire.

In some implementations of the luminaire 800, adjacent edges of the multiple light guide segments 810 additionally are configured to mutually engage, for example by way of mating shapes or additional interlocking features or components.

Figure 8C:
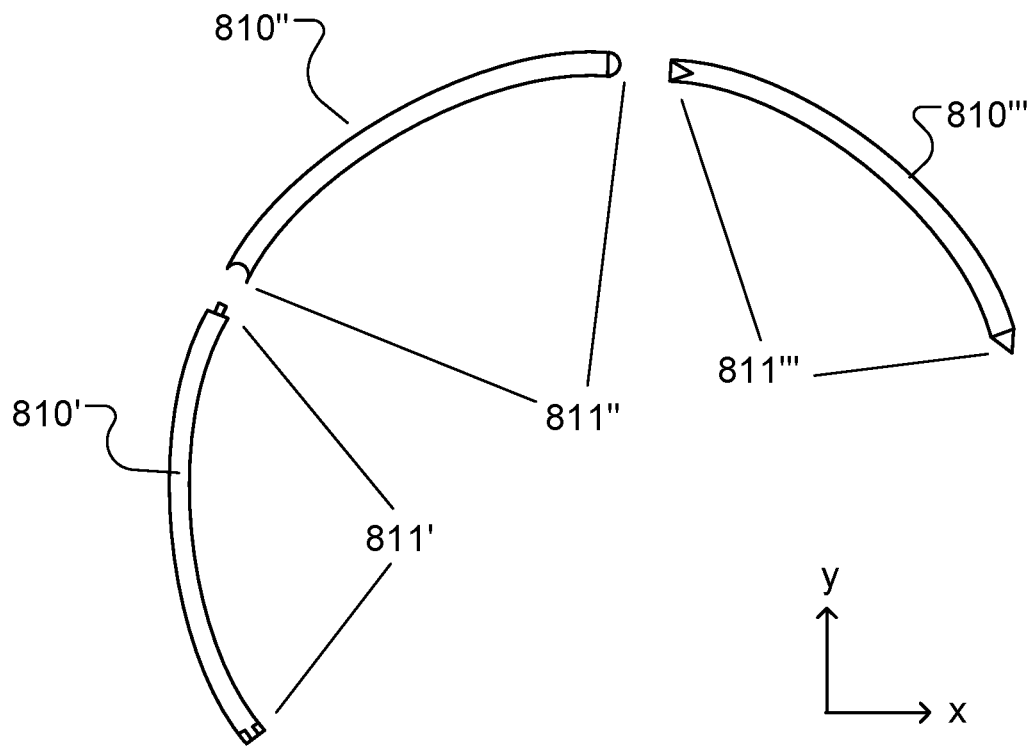
FIG. 8C shows a sectional view of one of the light guide segments of FIG. 8A.

FIG. 8C shows a sectional view perpendicular to the axis of the luminaire 800 of three different example segments 810', 810" and 810" with respectively shaped edges 811', 811" and 811"'. For example, six segments 810' can be assembled into a full tubular arrangement as shown in FIG. 8A.

Figure 9A:
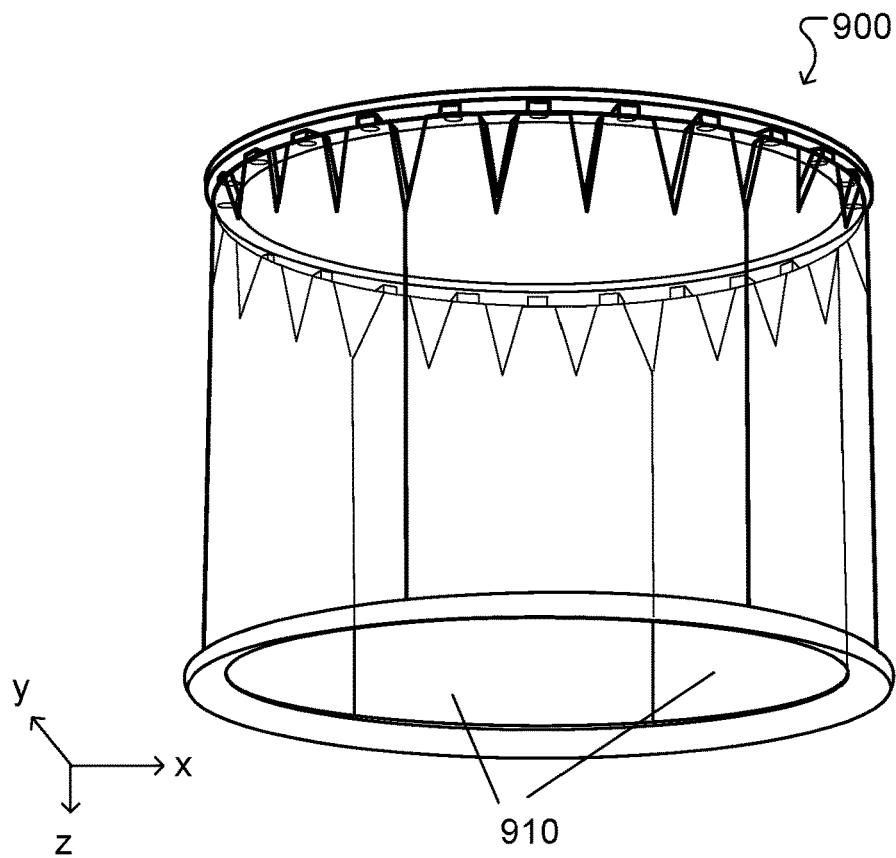
FIG. 9A shows a perspective view including multiple light guide segments of a luminaire according to the present technology.
Figure 9B:
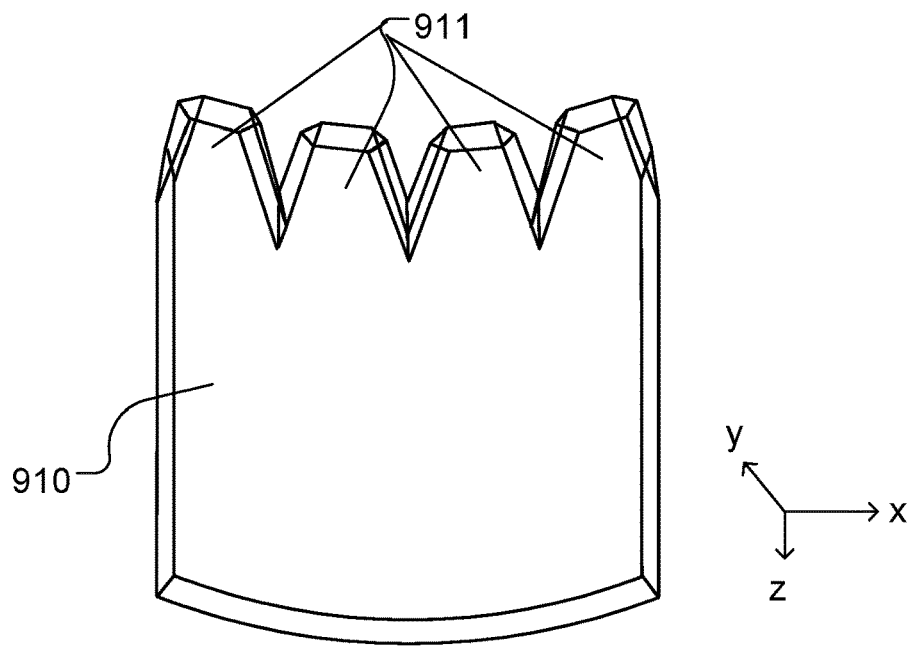
FIG. 9B shows a perspective view of one of the light guide segments of FIG. 9A.

FIG. 9A shows a perspective view of a portion of an example luminaire 900 with multiple light guide segments 910. FIG. 9B shows a perspective view of one of the multiple light guide segments 910. In this example, there are multiple tapered portions 911 per segment 910 and the tapering is per portion rather than per segment only. Each tapered portion provides both lateral and radial tapered facets to aid respective collimation of injected light and azimuthal resolution for spatial dimming. In this example, the taper is by single light source/LEE but can be per segment in other implementations. As such azimuthal resolution should be increased compared to collimation by multiple light sources/LEE.

Figure 10A:
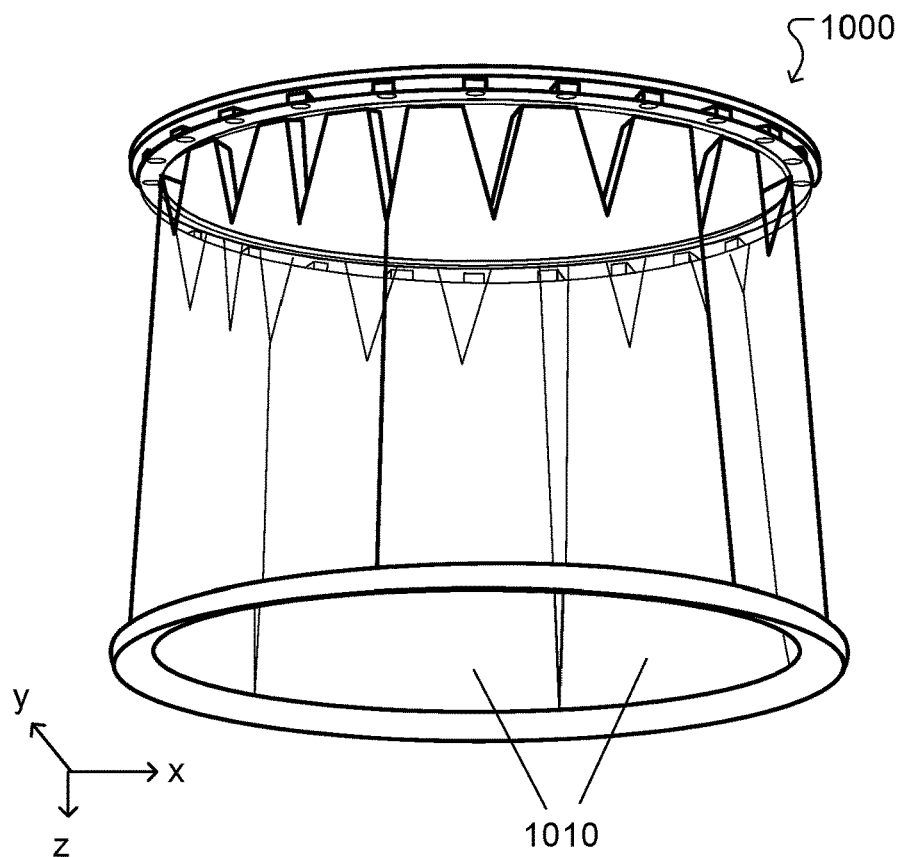
FIG. 10A shows a perspective view including multiple light guide segments of a luminaire according to the present technology.
Figure 10B:
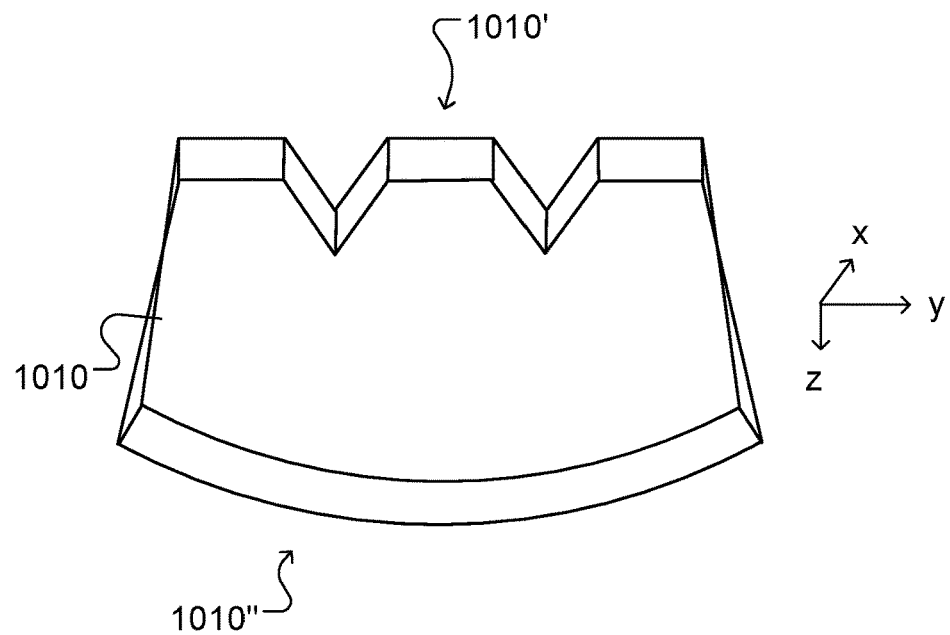
FIG. 10B shows a perspective view of one of the light guide segments of FIG. 10A.

FIG. 10A shows a perspective view of a portion of an example luminaire 1000 with multiple light guide segments 1010. FIG. 10B shows a perspective view of one of the multiple light guide segments 1010. Ignoring the misalignment between light sources in the light engine and input apertures of the light guide segments 1010 in FIG. 10A, the light guide segments 1010 have straight linear extensions at their input end 1010' and circular extensions at their output end 1010" and suitably transition in shape there between. Generally, this enables use of simpler, linear light engines in combination with circular or other curvilinear shaped extractors.

Figure 11:
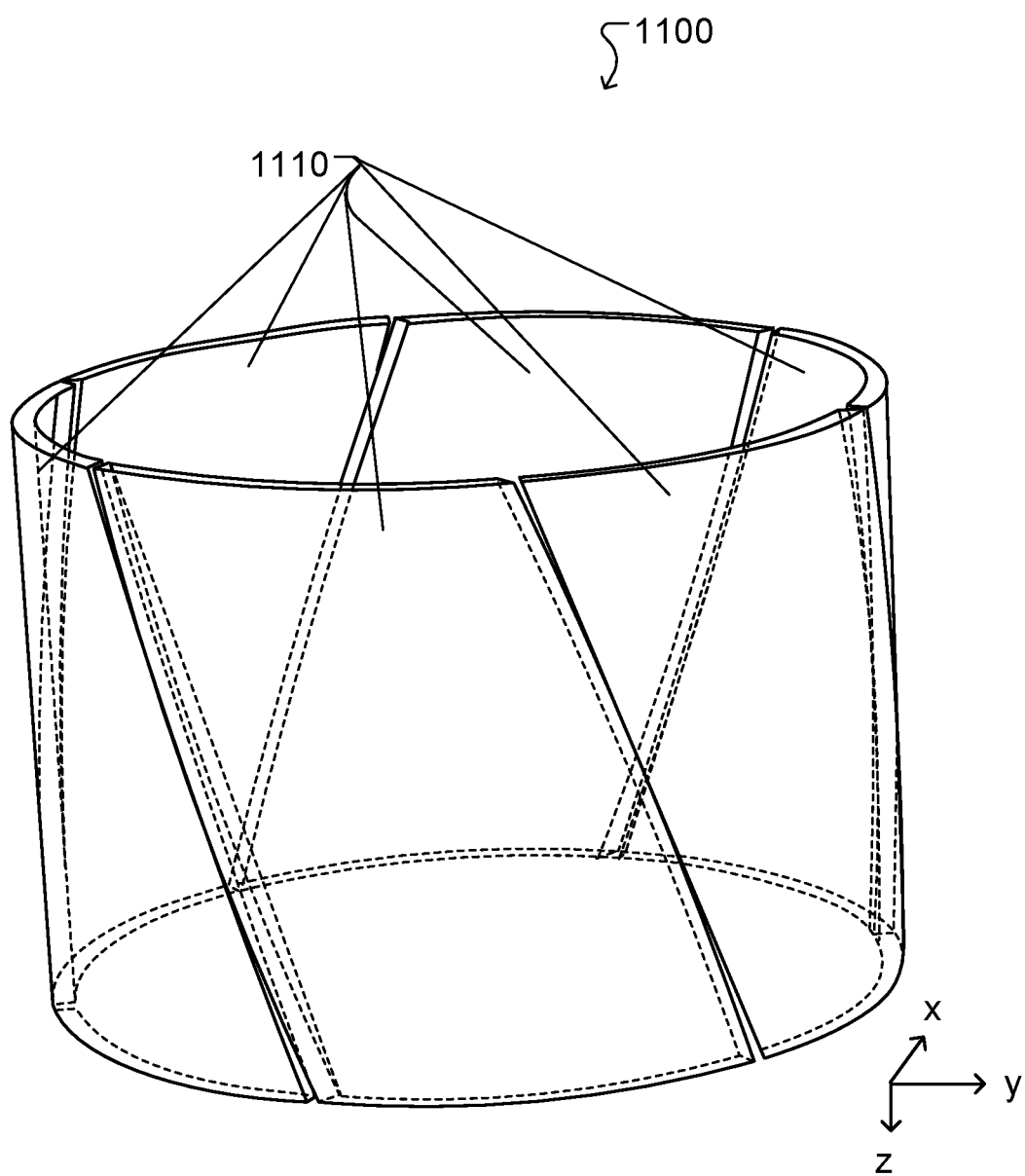
FIG. 11 shows a perspective view light guide system of a luminaire according to the present technology.

FIG. 11 shows a perspective view of six spiral shaped light guide segments 1110 arranged into a tubular light guide system for use in a luminaire 1100 according to some implementations of the instant technology. In this example, the variation of the spiral shaped edges along the axis of the light guide system provides a uniform curvilinear seam or gap. This can be non-uniform, polygonal or otherwise depending on implementation. Furthermore, different seams/gaps within the same luminaire can have different shapes. Aside from aesthetics, this can affect resolution and other aspects of spatial dimming, for example. In another implementation (not illustrated), the light guide can include a single helix/spiral shaped segment.

Generally, it is noted that the number of segments in different tubular or otherwise shaped light guide systems can be different. While the noted examples show few to several segments, different numbers of segments per light guide system may be employed depending on fabrication, aesthetics and other aspects. For pure aesthetic reasons, as little as one single seam or gap may be formed within a light guide. Moreover, seams/gaps may wind around a portion of the circumference. Inclination angles and dimensions of the light guide segments can affect throw of light output from respective luminaires.

Figure 12:
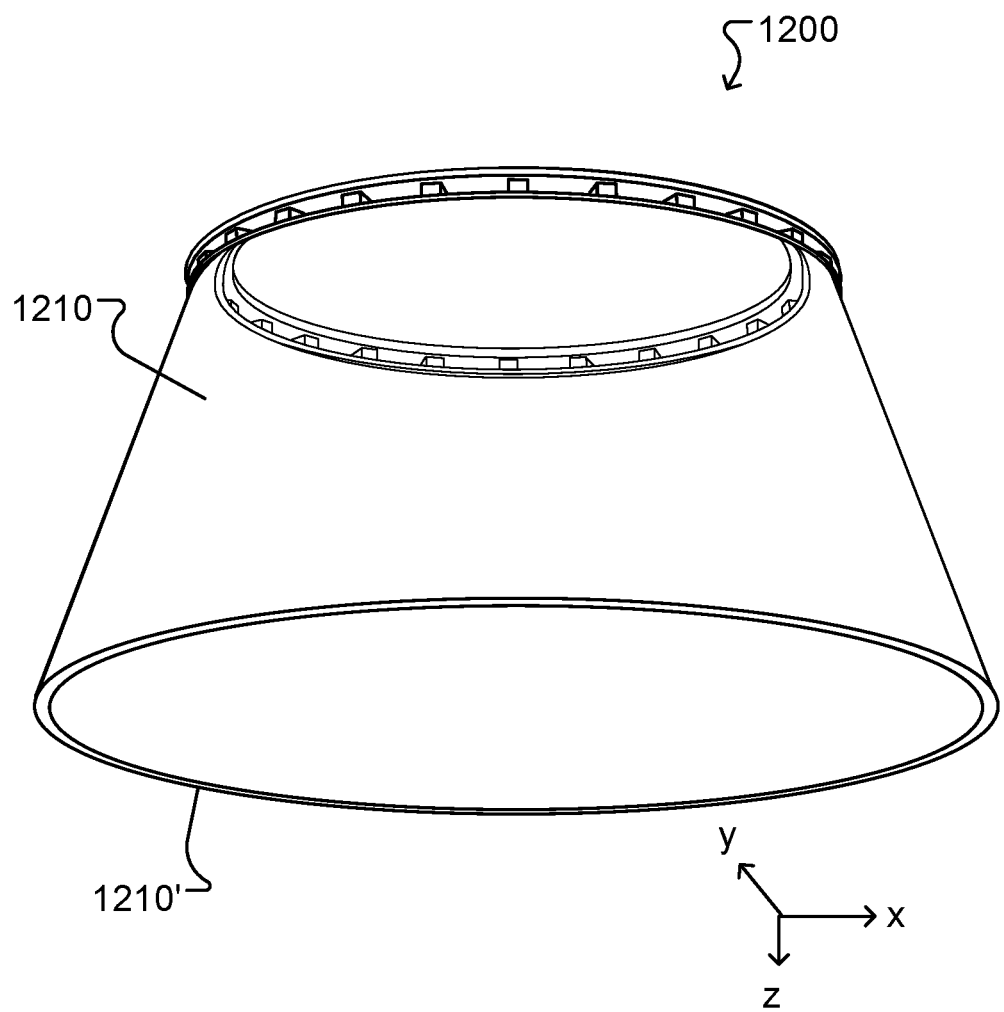
FIG. 12 shows a perspective view of a luminaire according to the present technology.

FIG. 12 shows a perspective view of a portion of an example luminaire 1200 with a straight circular conical, monolithic light guide 1210 having side surfaces defined by straight line generatrix providing a uniform wall thickness and terminating in a flat exit aperture 1210' that is perpendicular to an axis of the forming cylinder but can have other shapes in other implementations. The luminaire 1200 can output light into the ambient environment via exit aperture 1210' directly or via an additional suitably shaped extractor (not illustrated). The light guide 1210 optionally may be configured to output at least some light through the side surfaces.

This may be accomplished, for example by tapering or narrowing the light guide in the direction of the light propagation, or by including scattering centers within the light guide 1210 or its surface. In some such cases, an outer side surface may provide upward light towards a ceiling, for example. Surface scattering can be provided via suitably roughening certain portions or all of the side surfaces of the light guide. This can provide additional decorative aspects to a light guide by introducing milky, translucent patterns and enhance the appeal of the corresponding fixture.

In other implementations, other axial variations of the light guide geometry may be employed. For example, the defining cone for the light guide may be oblique or noncircular, the generatrix for the side walls of the light guide may be curvilinear. Furthermore, different implementations can have different inclinations of generatrixes relative to the corresponding axis/axes of the cone(s) to provide a light guide with an apparent conical form or even substantially cylindrical appearance. Moreover, some implementations may employ generatrixes that are non-parallel allowing for a tapered or flared light guide with non-uniform wall thickness.

The light guide 1210 and other light guides having similar geometries may be molded monolithically without major fabrication penalties, however, as described above/herein, segmentation, tapering, or both segmentation and tapering of such light guide geometries may be useful and provide various utilitarian and aesthetic benefits.

Control System

The control system, e.g., 190, 490, 590, can include various components such as one or more processing units, drivers, switches, dimmers, control system or computer user interfaces, and/or other components. To spatially dim a spatially dimmable luminaire, control over the amount of light generated per light source or group of lights sources of the luminaire is required. A portion or all of such a control system can be integrated with the luminaire, for example within or adjacent a luminaire housing. Furthermore, the control system may be displaced and partially or completely remote from the luminaire.

Depending on the configuration, different luminaires may be capable of providing different forms and specifically different numbers of light distributions. This can include superposition of base light distributions arising from activation and, if any, various dimming levels of single or groups of light sources. Although the control system can be configured to provide control of each of the light sources in an installed luminaire, this may be impractical or unnecessary depending on the use case. As such in some implementations, the control system may be configured to limit the number of light distributions accessible for control by a user after installation. This may be accomplished by selecting from the possible light distributions only actually needed or desired light distributions. Such needed or desired light distributions then may be referred to as lighting programs. Lighting programs may be static or dynamic over time.

Selection and/or (de)activation of lighting programs may be accomplished via suitable user interfaces provided by switches/dimmers, computer-controlled devices or other user interface devices. Depending on the implementation, the user interface can be remote from or, in some cases, resident in the luminaire. Operative coupling between the user interface and the control system may be by wire or wireless. Selection and/or activation of a lighting program via switches or dimmers can be implemented via toggling from one lighting program to the next by repeat ON/OFF switching, for example. Other means include direct selection on a screen of a suitable device with immediate or subsequent activation of selected lighting programs upon respective user input.

In some implementations, the control system can be configured to vary its light output via dynamic lighting programs. This may be in a predetermined manner and/or based on one or more parameters including time of day, time of year, information about weather conditions supplied from elsewhere, data from one or more sensors or other information.

In some implementations, the luminaire may include a sensor system configured to sense ambient lighting levels in the visible, infrared and/or other electromagnetic spectral range with a spatial resolution that is useful to respectively spatially dim the luminaire based on a feedback control scheme. This may be used to provide the control system with information about ambient lighting levels with respective spectral resolution. Such a system can be used to determine space illumination conditions, occupancy and motion detection and other ambient conditions within the service range of the luminaire with spatial resolution. Depending on the implementation, one or more components may be shared between the sensor system and the space illumination system portion of the luminaire. In some implementations, the sensor system may be completely separate. In some implementations, the sensor system may be provided by a separate camera system with suitable spatial and temporal resolution.

Example lighting programs for feedback control systems may be configured to improve uniformity of space illumination levels within the service range of the luminaire by compensating for shadowing effects, daylight variations near windows or other effects. Other example lighting programs may be configured to improve uniformity of illumination except within solid angles with detected occupancy, within a predetermined range of such occupancy or according to other schemes. Such variations may be instant or time-delayed and/or dampened based on other parameters such as rate of change of the sensed information and so forth.

In some implementation, the control system may be configured to provide a self-learning operating mode. This may be the only mode of operation or be provided as part of other operating modes. The self-learning control system can be preconfigured with one or more initial lighting programs and configured to monitor various user interface events in combination with time, date, sensed lighting conditions and/or other information to then identify user preferences based on correlations it determines and adjust one or more of the initial lighting programs accordingly. Such correlations may be determined based on configuration of one or more rules, suitable neural network processing or otherwise.

In some implementations, a sensor system for sensing ambient lighting levels may include the optical system, the light engine and/or other components that are already being employed in a respective luminaire for space illumination purposes. For example, the luminaire 100 may allow or be further configured to allow use of the optical system 110 as a receiver antenna and the light engine 120 may be configured to operate the LEEs as light sensors or additionally be equipped with respective light sensors. LEEs that are already present for purposes of space illumination may be intermittently operated as optical sensors. In some implementations, separate visible, infrared and/or other sensors may be provided.

Depending on the implementation, luminaires may be additionally used as transceivers for data communication while also providing space illumination or even as data communication nodes only. Data communication may be via infrared light only, visible light only, both visible and infrared, and/or other useful spectral portion of electromagnetic radiation. Some or all of data communication functions may be included in the control system for space illumination function of a respective luminaire. In some implementations, the spatial dimming function may be extended to the data communication function. As such the control system may be configured to carry out data communication in a spatially resolved manner to support isolate respective communications.

FIGS. 13 through 38 show schematic views of various example luminaires according to the present technology, some of which are ceiling mounted such as suspended, flush or recessed or wall mounted, for example.

Figure 13:
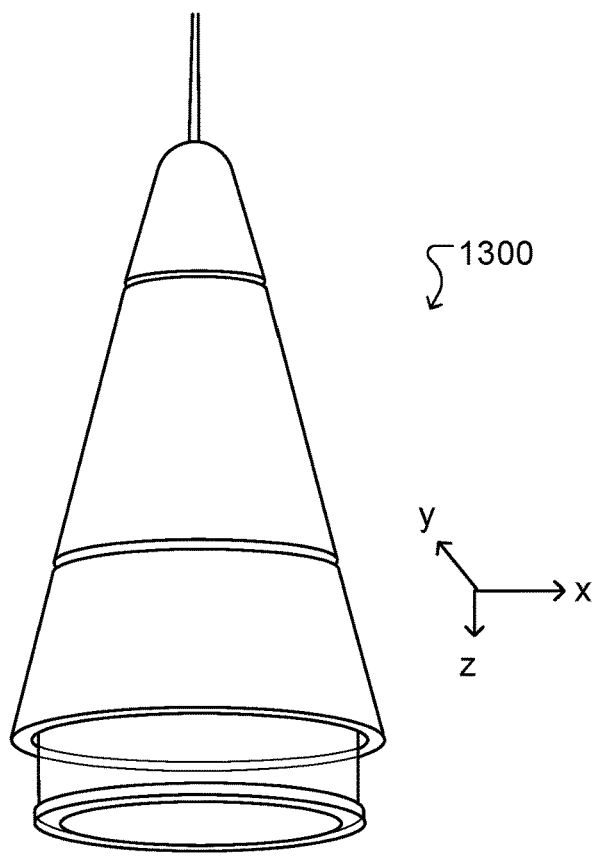

FIG. 13 shows an example pendant luminaire 1300 with an optical system configured for both direct and indirect illumination.

Figure 14:
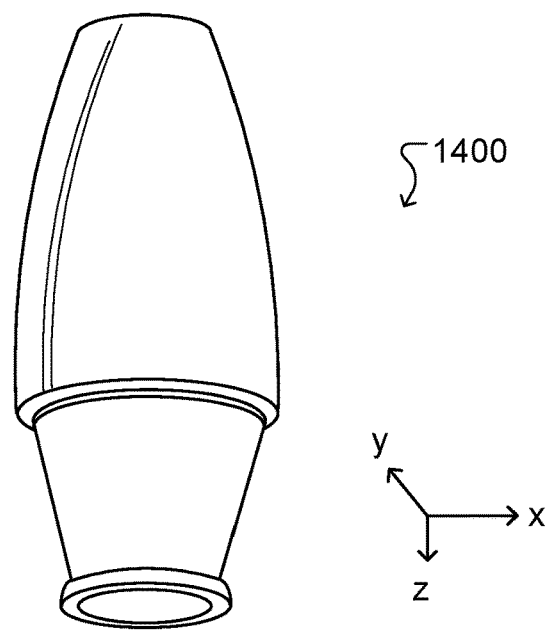
Figure 15:
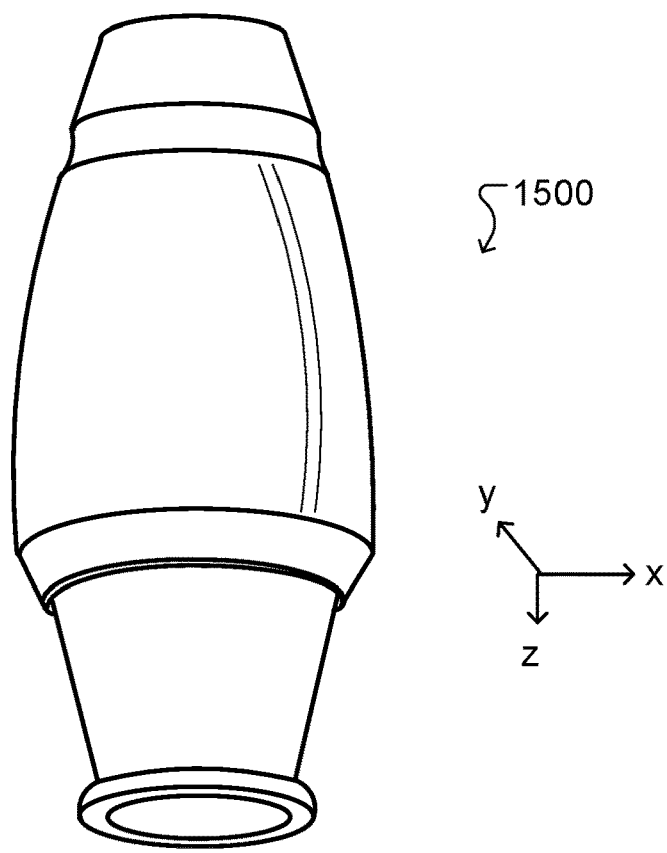

FIGS. 14 and 15 show example luminaires 1400 and 1500 having conical tubular light guides and various housings. The light guides of example luminaires 1400 and 1500 taper in z-direction. The example luminaires 1400 and 1500 may be configured (not illustrated) for pendant or wall mount applications, for example. As such the luminaires 1400 and 1500 can be configured to provide different light emission patterns suitable for how they are mounted/suspended. For example, axial symmetric light emission with or without indirect backward lighting may be employed for ceiling mounted pendants. Direct forward, wall wash or grazing illumination may be preferred for wall-mounted applications.

Figure 16:
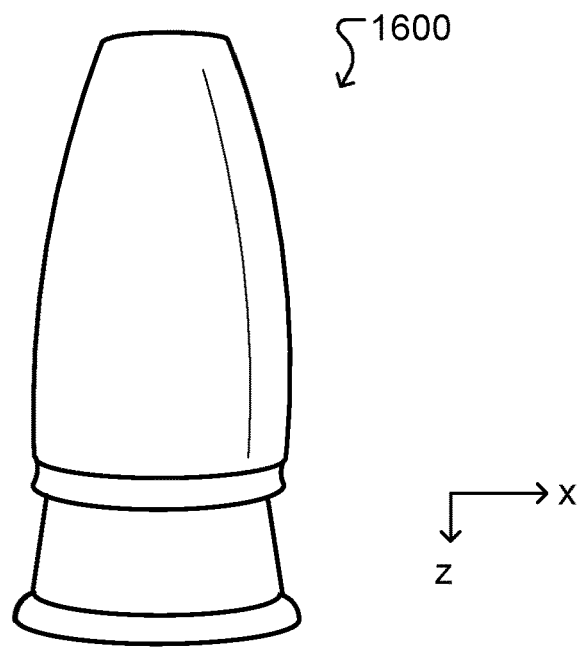
Figure 17:
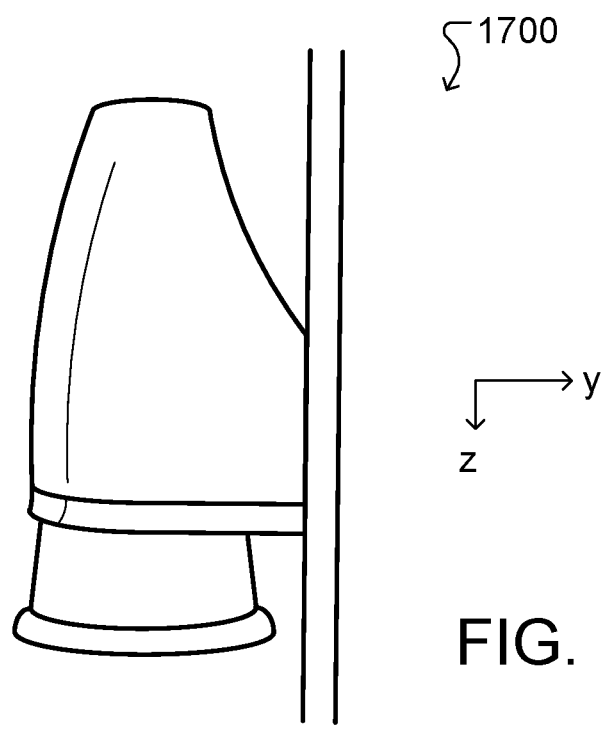
Figure 18:
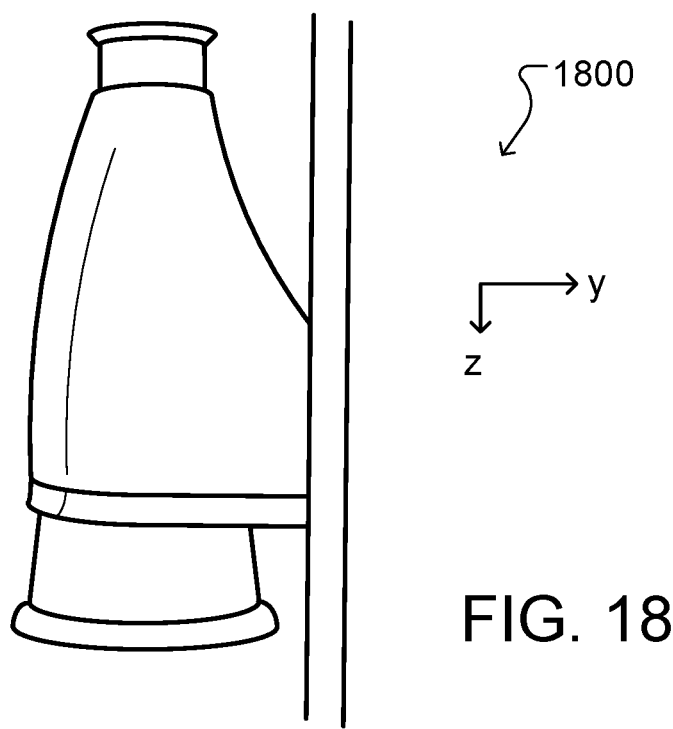
Figure 19:
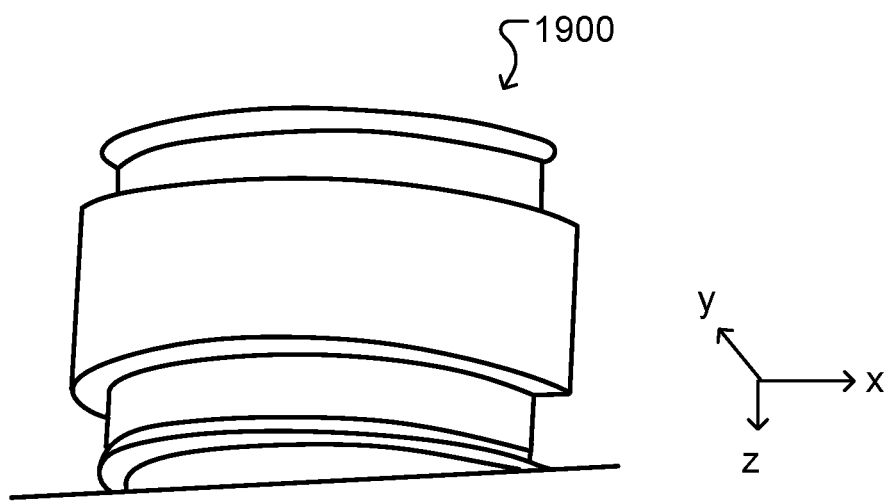
Figure 20:
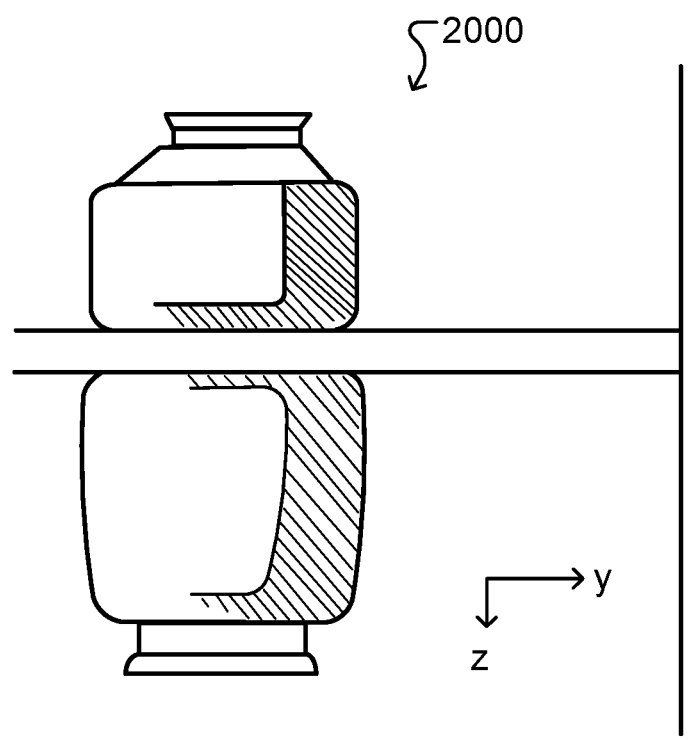
Figure 21:
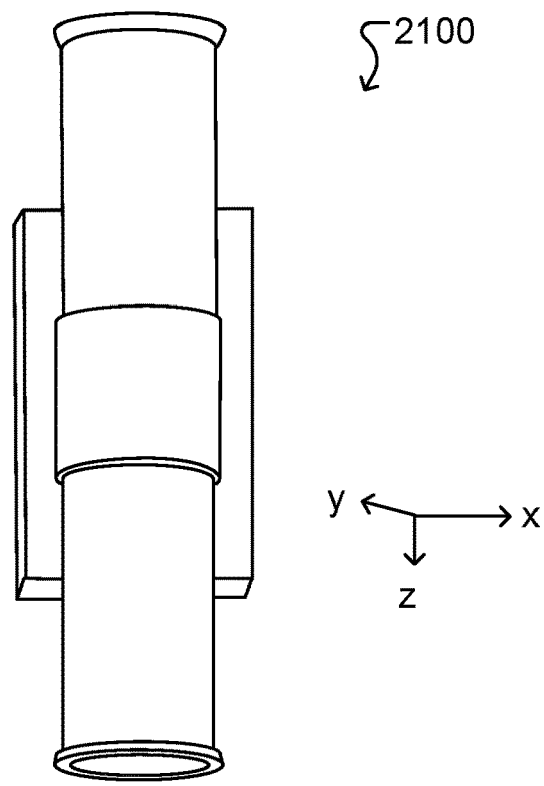
Figure 22:
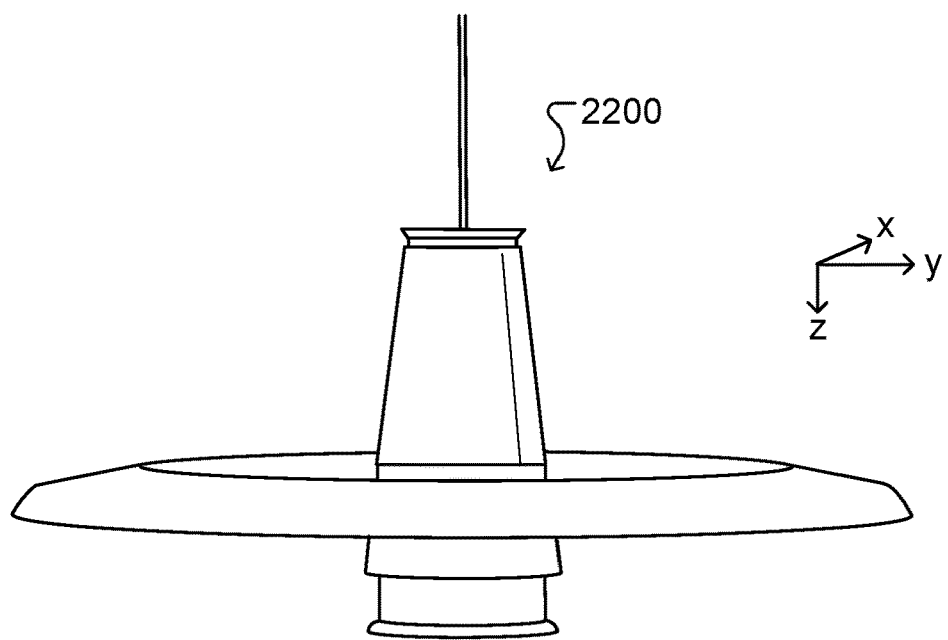

FIGS. 16 and 17 show example luminaires 1600 and 1700 having conical tubular light guides and various housings. The light guides of example luminaires 1600 and 1700 flare in z-direction. The example luminaire 1600 may be configured for pendant applications, while example luminaire 1700 is configured for a wall mount application.

FIGS. 18, 19, 20, 21 and 22 show schematic views of example luminaires 1800, 1900, 2000, 2100, 2200, respectively, with two oppositely arranged optical systems, in which each optical system can be configured for only direct, only indirect or both direct and indirect illumination. Such luminaires can have nested or similar sized coaxially arranged or axially offset optical systems. Luminaire 2200 is configured as a pendant for suspension from a ceiling, luminaires 1800, 1900, 2000 and 2100 are wall mounted.

FIG. 23 shows an example luminaire 2300 with a triangular prismatic optical system with rounded outer edges configured for direct illumination.

FIG. 24A shows a top view and FIG. 24B a side view of an example luminaire 2400 according to the present technology.

Figure 25A:
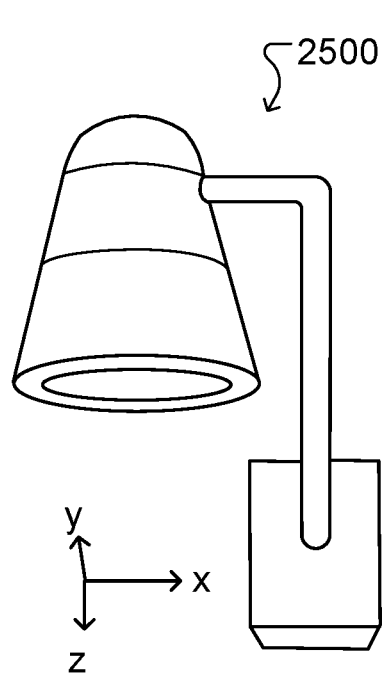
Figure 25B:
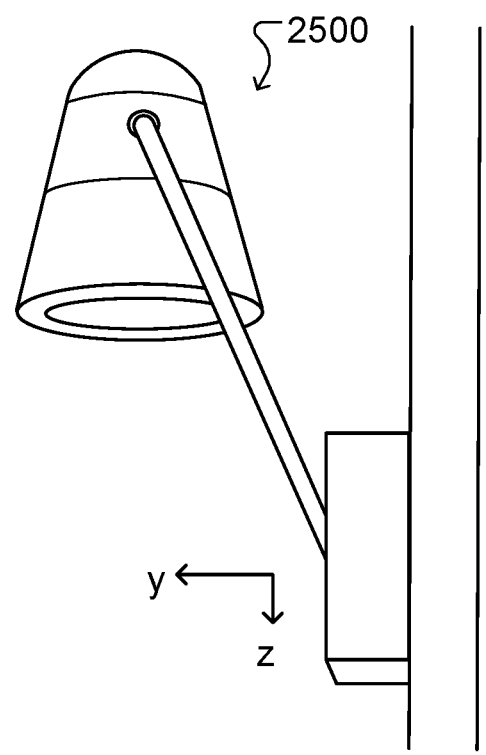

FIGS. 25A and 25B shows different views of another example luminaire 2500 according to the present technology. The example luminaire 2500 is wall mounted and includes an arm configured to hold the optical system relative to the wall mount. The luminaire 2500 optionally may include a mechanism configured to allow pivoting the arm and provide adjustment of the optical axis of the optical system relative to the face of the wall. Depending on the implementation, the example luminaire 2500 may be configured to provide spot-like illumination with a defined beam angle.

Figure 26:
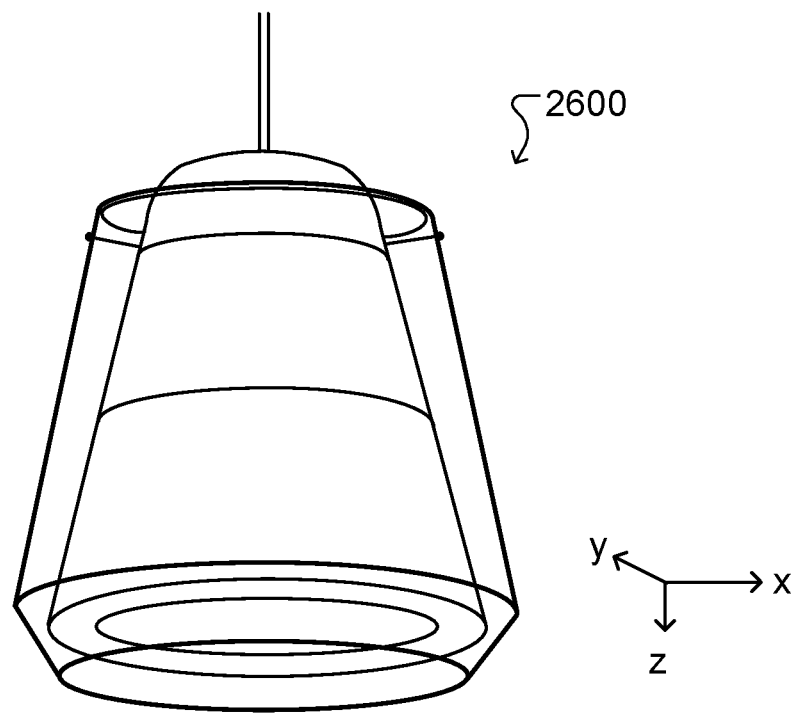

FIG. 26 illustrates a pendant version of the example luminaire 2600 shown in FIGS. 25A and 25B with an additional translucent sleeve surrounding the housing. The sleeve can be formed as a molded piece extending from the housing or a thin shell suitably coupled with the housing, for example via friction fitting distance pins. The optical system inside the housing may be configured in various ways according to the present technology.

Figure 27:
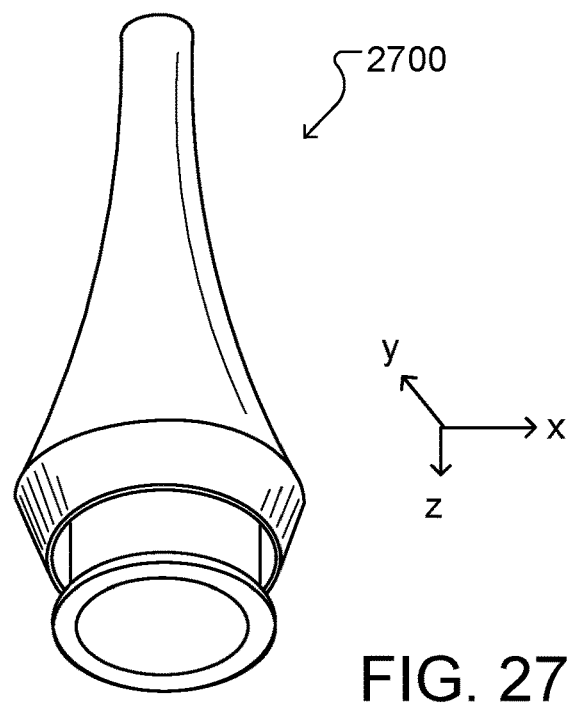
Figure 28:
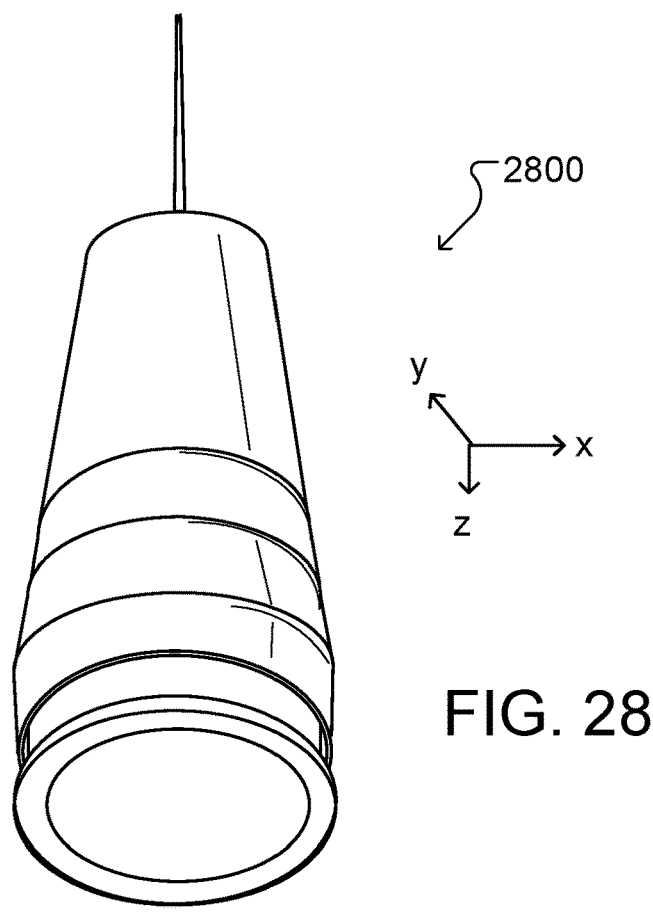

FIGS. 27 and 28 show further example pendant luminaires 2700 and 2800 each including substantially cylindrical tubular optical systems partially protruding from a housing. The example luminaire 2700 includes a housing that may be configured to allow separation from the luminaire by lifting it up along the suspending cable and direct access to upper parts of the optical system and the light engine. The example luminaire 2800 includes an additional ring-like sleeve obscuring a respective portion of the light guide of the optical system. A portion of the light guide is visible between the sleeve and the housing.

Figure 29:
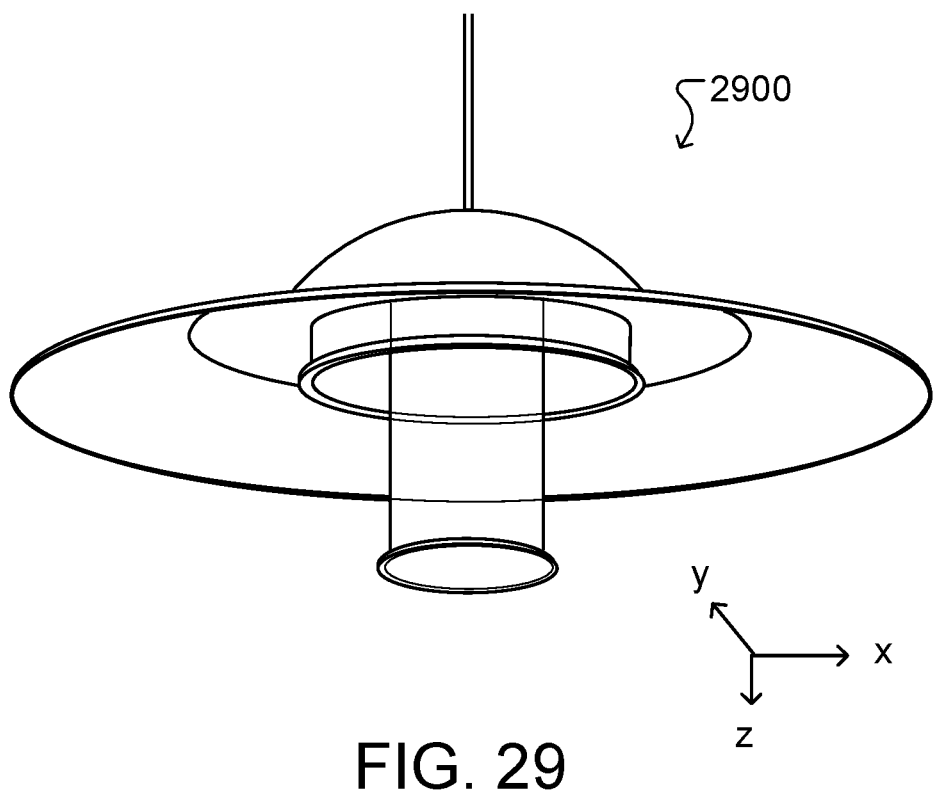
Figure 30:
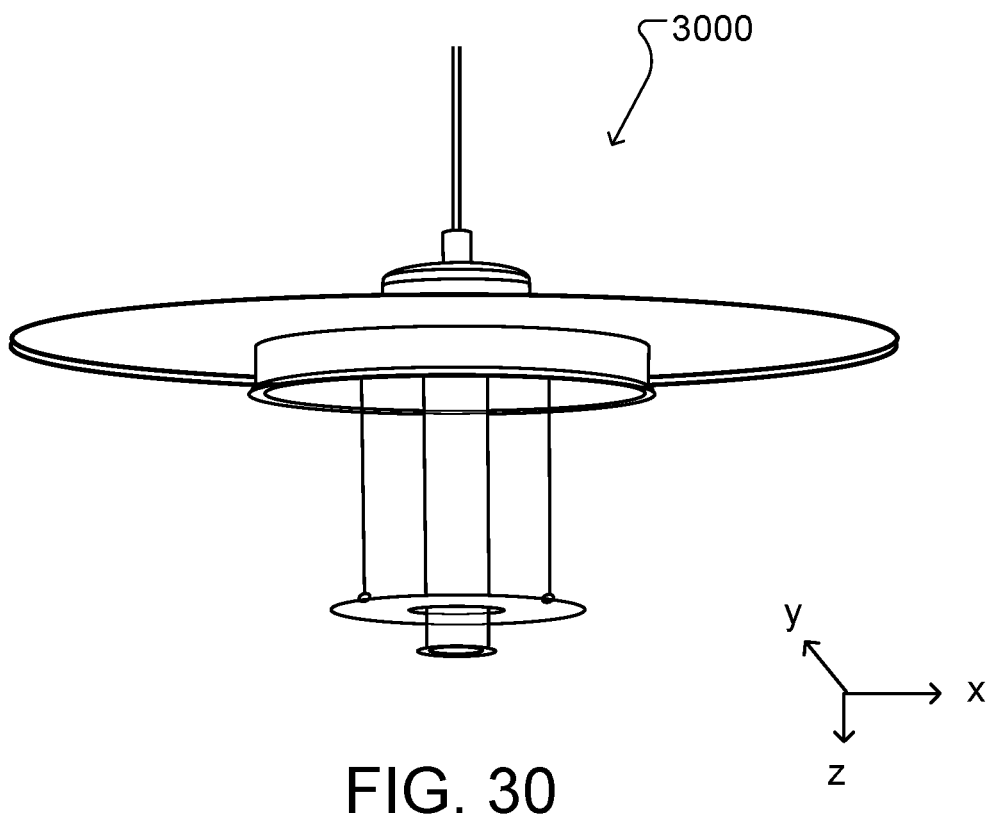

FIGS. 29 and 30 show schematic views of example luminaires 2900, 3000, respectively, with respective two and three nested optical systems arranged in like directions, in which the optical systems absent the surrounding reflectors can be configured to provide only direct or both direct and indirect illumination.

Figure 31:
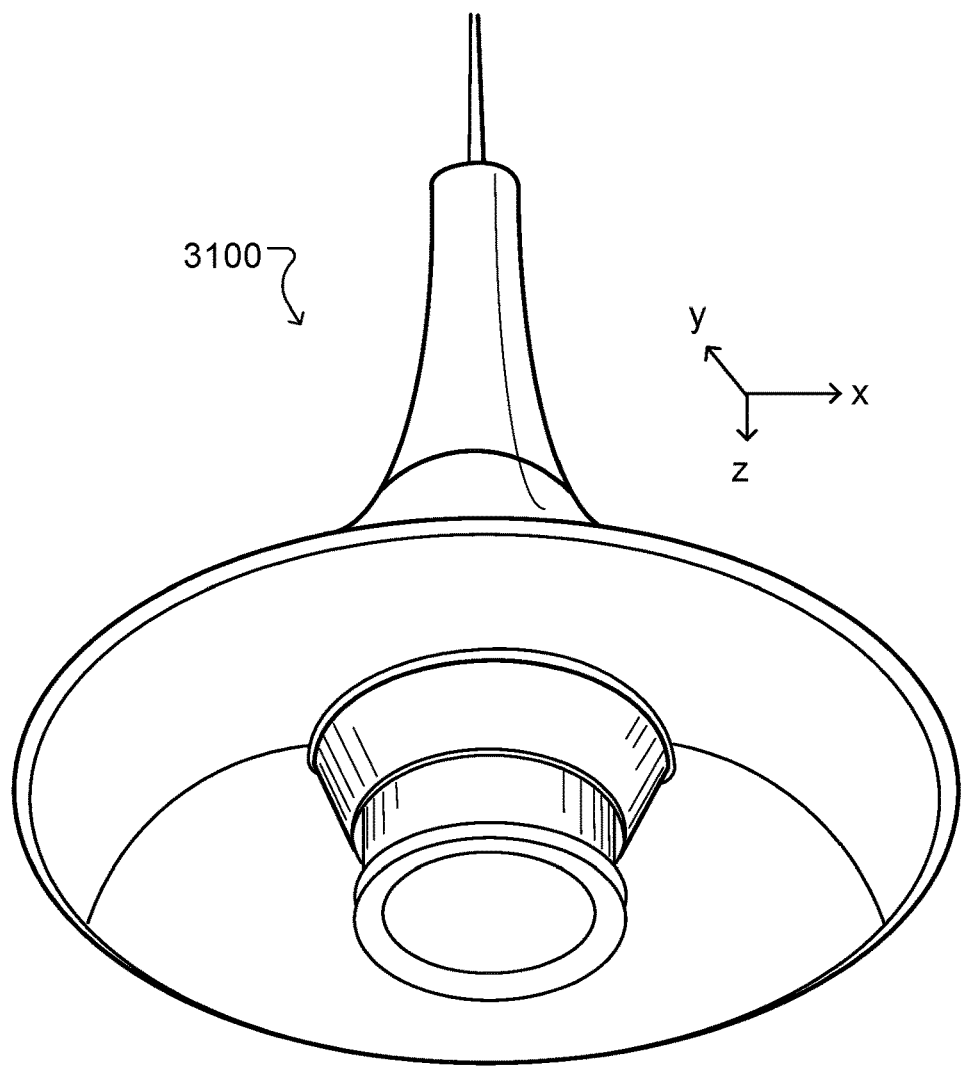

FIG. 31 shows an example pendant luminaire 3100 including a reflector dish surrounding the inner optical system similar to other example luminaires noted above. The reflector dish can be configured to be substantially transparent, translucent or opaque depending on the utility and/or aesthetics of the desired lighting application.

Figure 32:
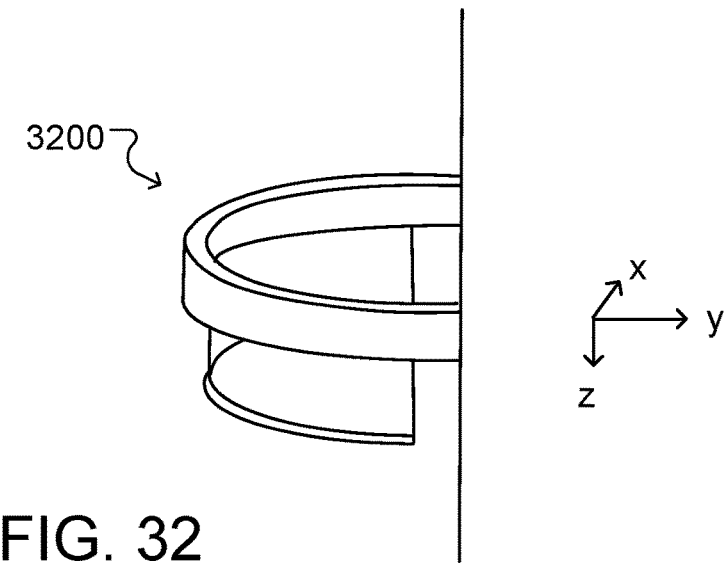

FIG. 32 shows another example luminaire 3200 with a semicircular optical system according to the present technology. The optical system is suspended from an arched support intended for wall mounting.

Figure 33:
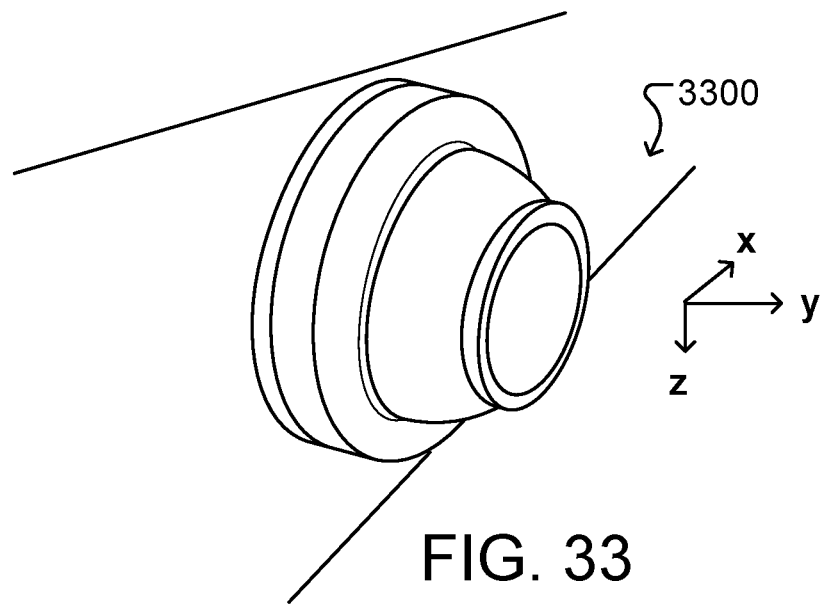

FIG. 33 shows another example luminaire 3300 with a generally circular optical system according to the present technology. The optical system enclosed in a wall mounted support intended for mounting near the lower edge of a wall but can be mounted elsewhere. The optical system can be configured to output light for floor illumination or other lighting applications.

Figure 34:
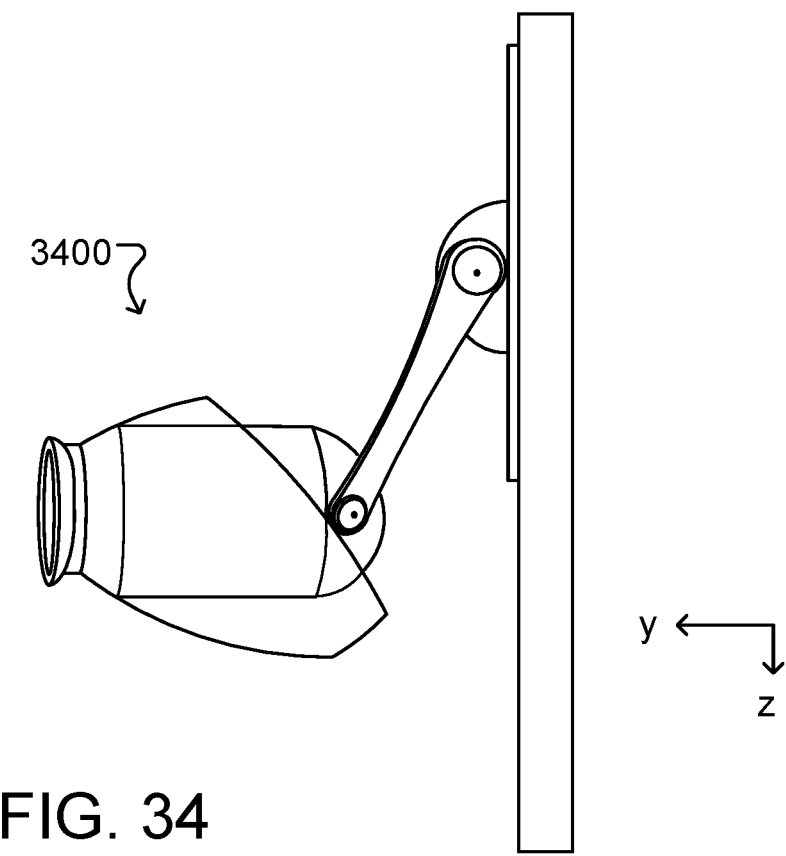

FIG. 34 shows another example luminaire 3400 with an adjustable arm that may be configured for various lighting applications. As illustrated, in a wall-mounted installation as oriented, the example luminaire 3400 can be employed as an auxiliary light source for security/surveillance applications. As such the example luminaire 3400 may be configured to provide only infrared or infrared and visible light to aid in providing suitable lighting conditions for security/surveillance cameras. Such cameras may be integrated with the example luminaire 3400 or configured for separate installation remote from the luminaire.

Figure 35:
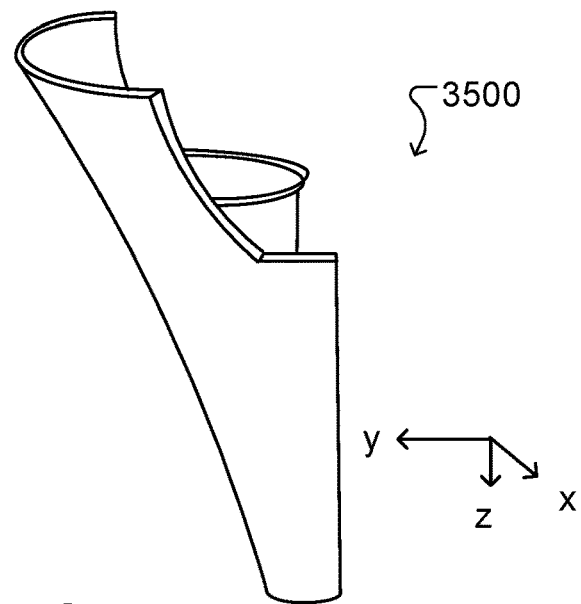

FIG. 35 shows an example luminaire 3500 for architectural lighting to illuminate surfaces located upward of the luminaire.

Figure 36:
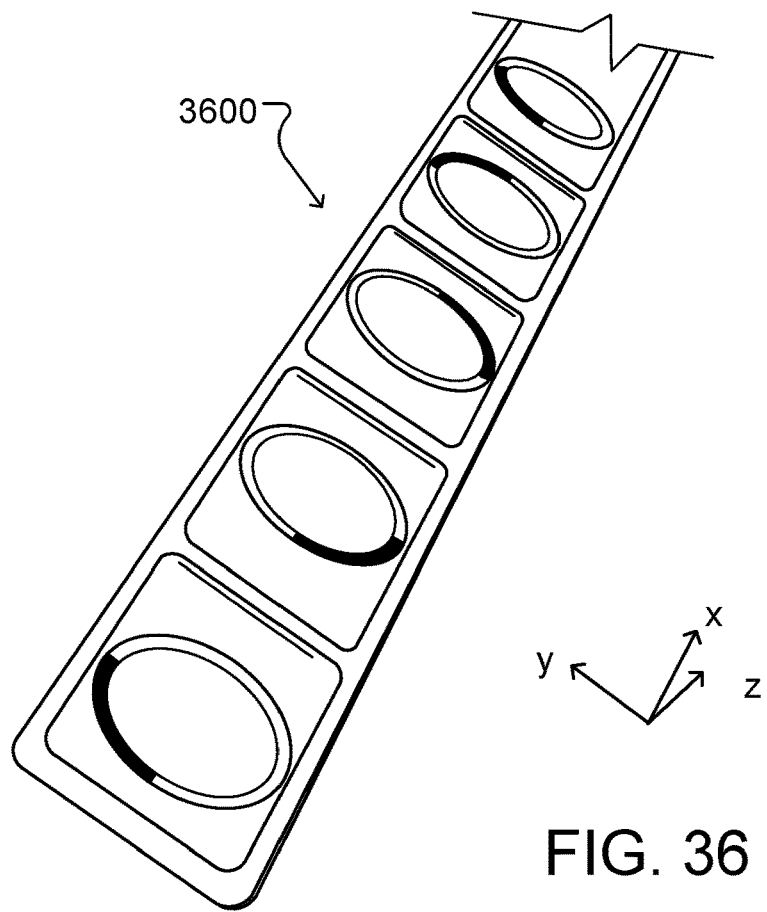

FIG. 36 shows another example luminaire 3600 including an array of optical systems according to the present technology each spatially dimmable by quadrant relative to the optical axis of the respective optical system. The example luminaire 3600 may be configured for various lighting applications, for example as a pendant luminaire to provide illumination for a conference room and/or large table surfaces to provide controllable amounts of light to different portions of such a rooms and/or table.

Figure 37:
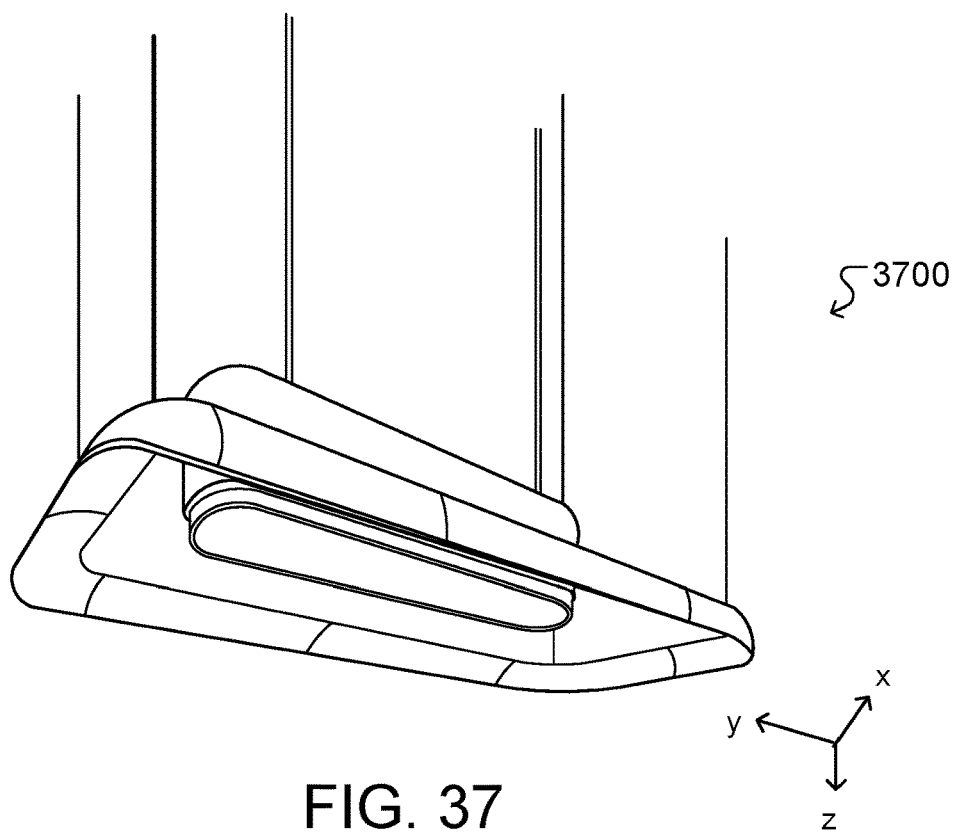

FIG. 37 shows another example luminaire 3700 including an oblong shaped spatially dimmable optical system according to the present technology. The example luminaire 3700 can be used similar to the example luminaire 3600.

Figure 38:
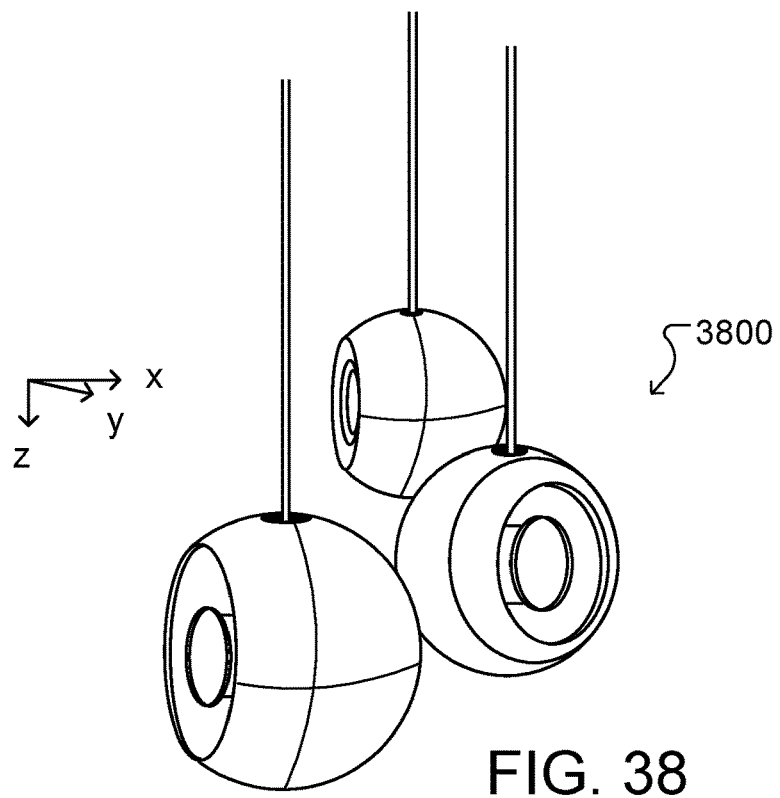
Figure 39:
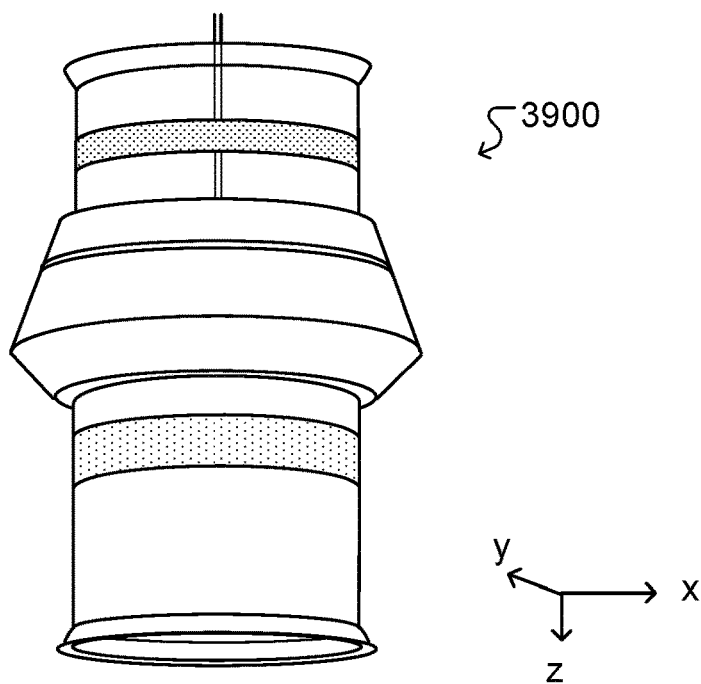
Figure 40:
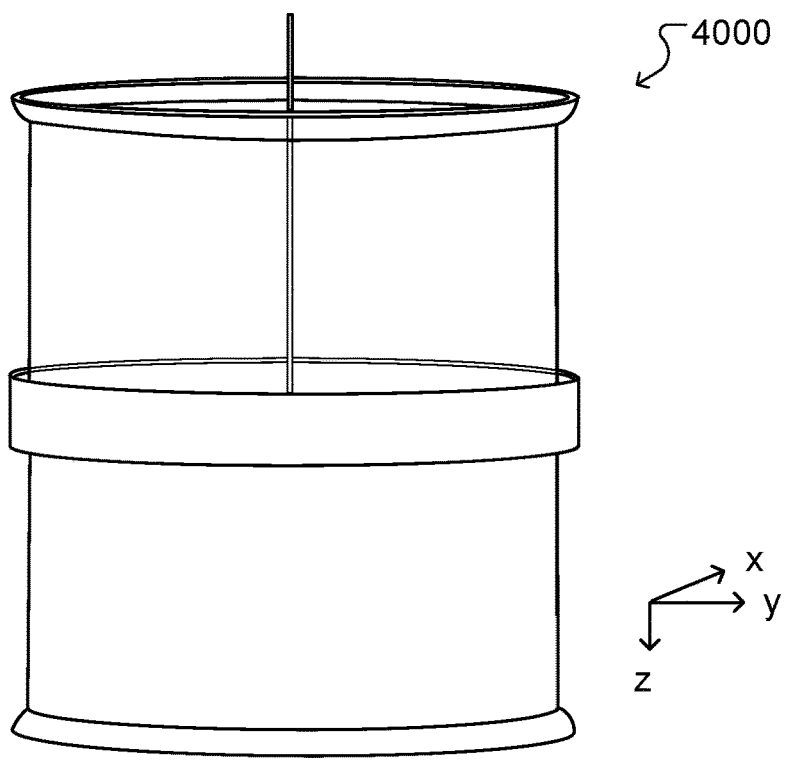

FIG. 38 shows further pendant example luminaires 3800 each having a partially spherical housing with a circular exit aperture from which light emerges from a respective optical system. The example luminaire 3800 may be configured to provide light in an upward oriented light distribution. The inside of the housing appears lit from the outside during operation.

FIGS. 39 through 58 show schematic views of various example luminaires according to the present technology.

FIGS. 39 through 46 show schematic views of example luminaires 3900, 4000, 4100, 4200, 4300, 4400, 4500 and 4600 with two oppositely arranged, similar sized, coaxial optical systems. Each luminaire includes a pair of extractors arranged at the distal portions of the respective optical systems. These example luminaires may be configured for only direct, only indirect or both direct and indirect illumination.

Example luminaire 3900 has light guides having ring-like portions including scattering elements that break total internal reflection conditions for a portion of the guided light so that some light is output from side surfaces of the light guides downstream of the ring-like portions during operation.

Each of the example luminaires 3900, 4000, 4100, 4200, 4300, 4400, 4500 and 4600 includes a ring-shaped housing arranged central along the optical axis of respective pairs of optical systems of similar dimensions. The housings include various shapes of center supports with apertures to support airflow and are in thermal contact with respective light engines to dissipate heat.

For example, FIG. 41A shows an example luminaire 4100 in which the two oppositely arranged, similar sized, coaxial optical systems are supported by a support frame 4110. The support frame 4110 can be implemented as either of the example support frames 4110B or 4110C shown in FIGS. 41B and 41C, respectively.

Figure 42A:
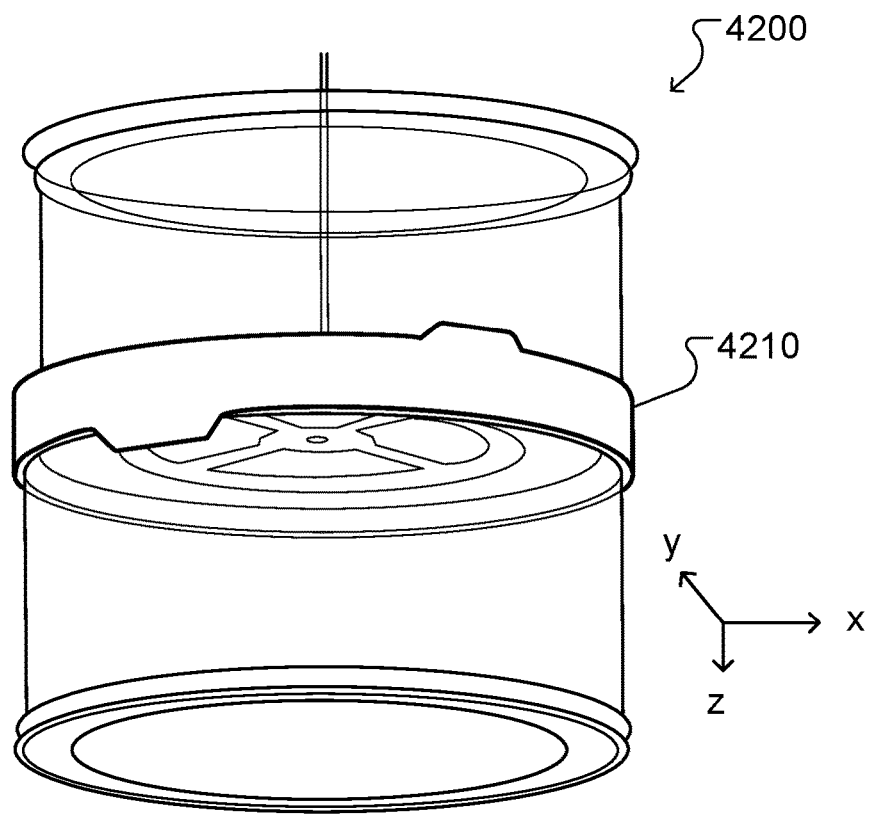
Figures 42B, 42C:
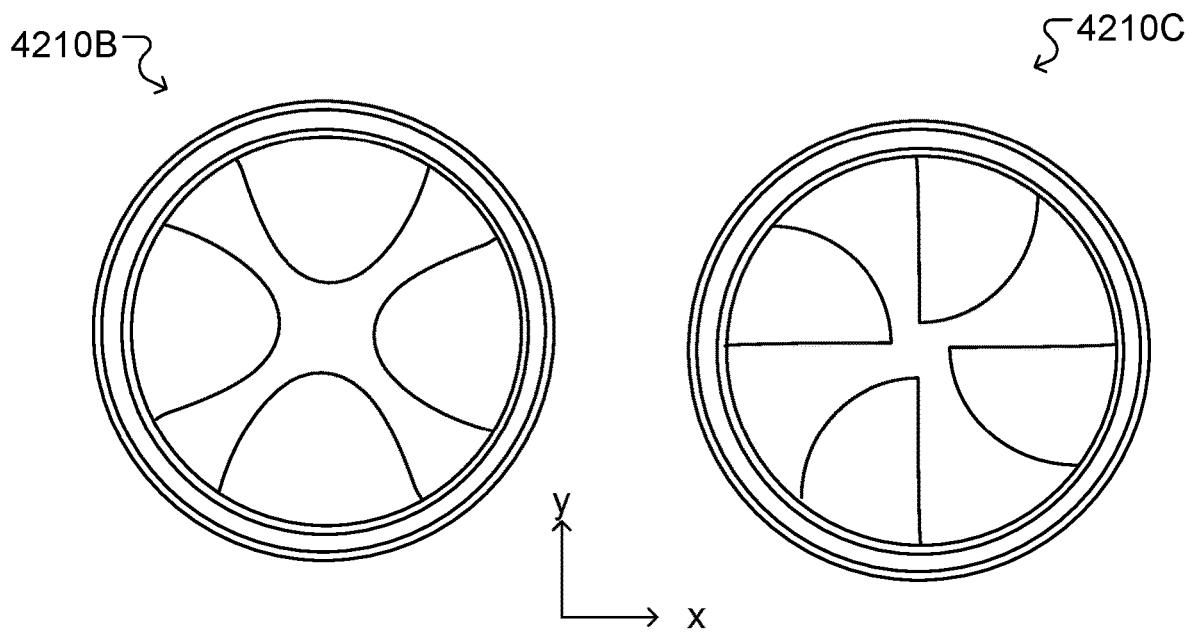

As another example, FIG. 42A shows an example luminaire 4200 in which the two oppositely arranged, similar sized, coaxial optical systems are supported by a support frame 4210. The support frame 4210 can be implemented as either of the example support frames 4210B or 4210C shown in FIGS. 42B and 42C, respectively.

As another example, FIG. 43A shows an example luminaire 4300 in which the two oppositely arranged, similar sized, coaxial optical systems are supported by a support frame 4310. The support frame 4310 can be implemented as either of the example support frames 4310B or 4310C shown in FIGS. 43B and 43C, respectively.

The support frames 4110, 4210, 4310 are configured to provide mechanical support for suspending the respective luminaires 4100, 4200, 4300. They can additionally be configured to provide heat sinking functions and/or electrical interconnections to/from light engines of respective luminaires 4100, 4200, 4300. The illustrated example support frames 4110A, 4110B, 4210A, 4210B, 4310A, 4310B have disk-like shapes with through holes as indicated. The through holes provide opportunities for convection and heat sinking to ambient air, for example. The support frames 4110A, 4110B, 4210A, 4210B, 4310A, 4310B can include outer rims as indicated in FIGS. 39 through 44A-44B or other luminaires, for example.

Figure 44A:
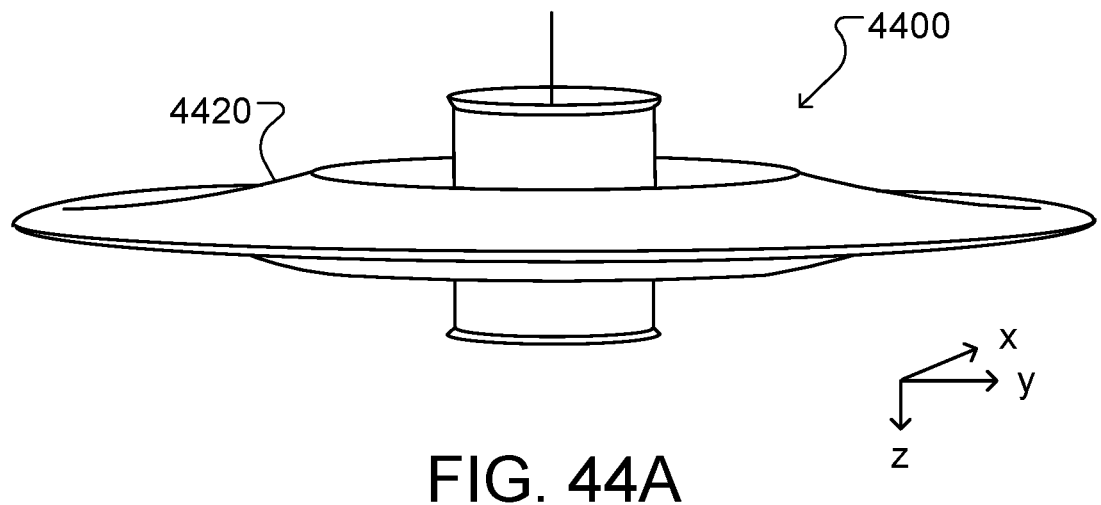
Figure 44B:
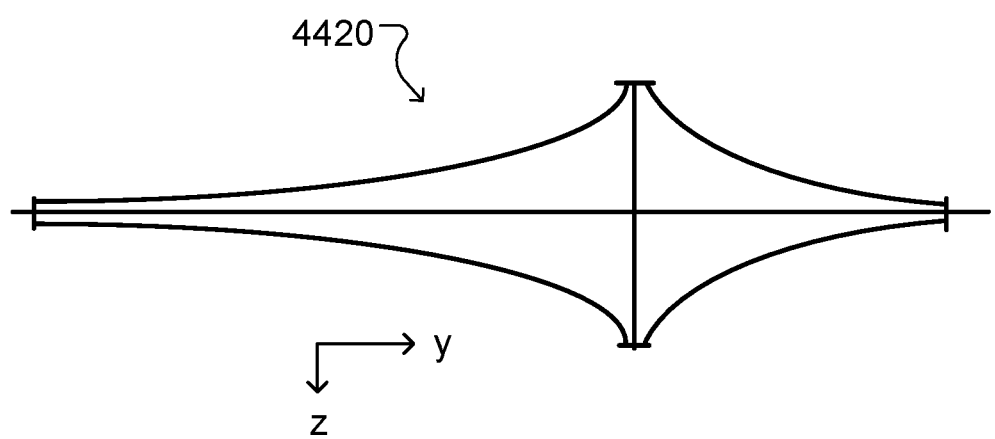
Figure 45:
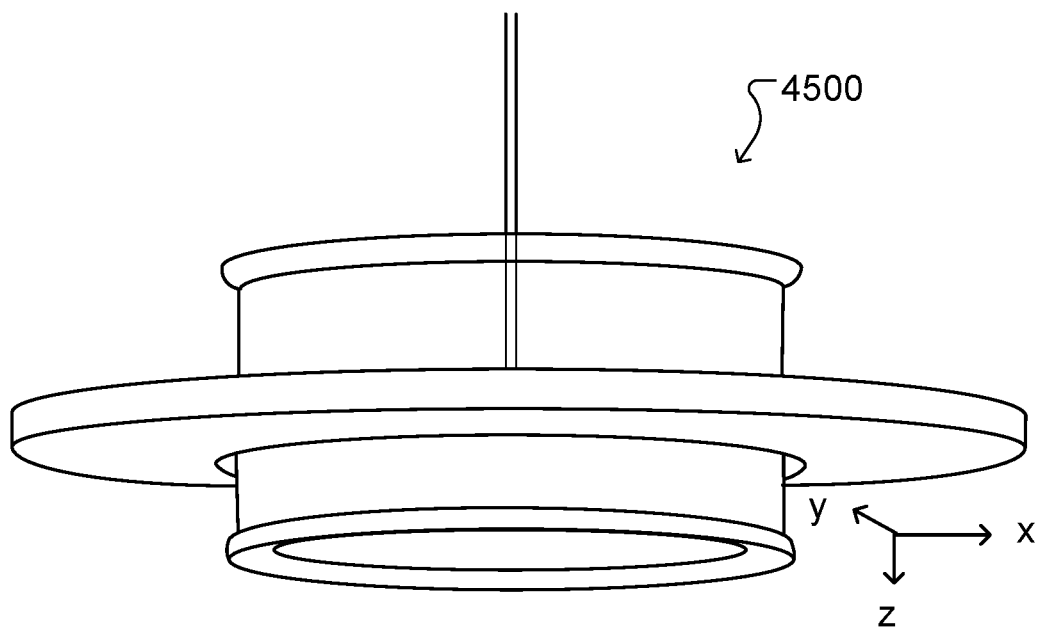
Figure 46:
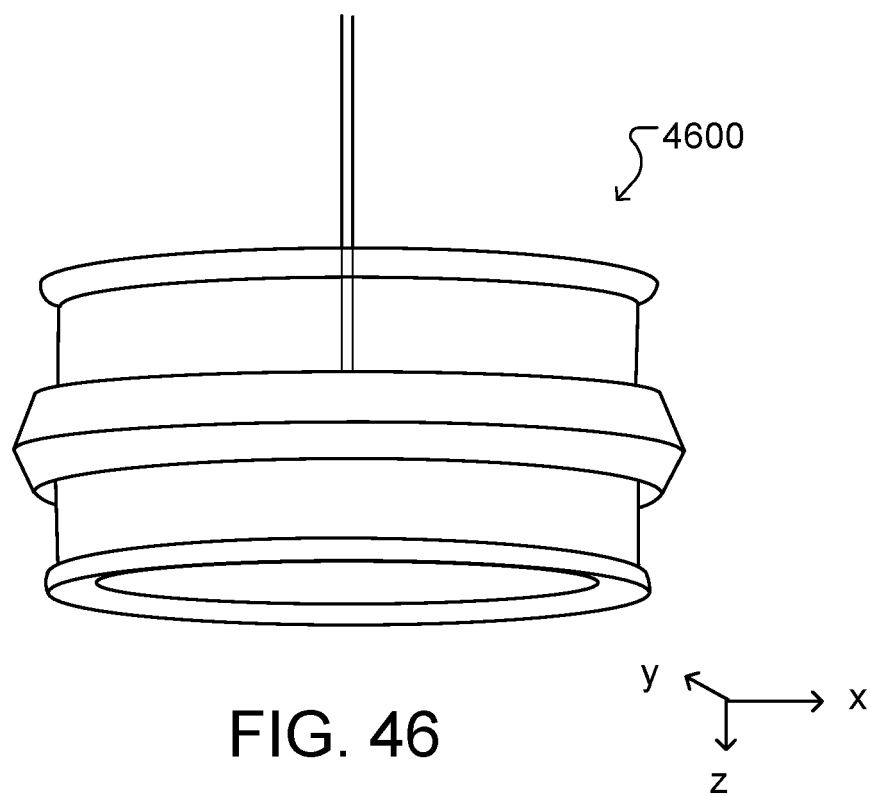

FIG. 44A shows an example luminaire 4400 which has an outer toroidal structure 4420 surrounding the inner optical systems. FIG. 44B shows a sectional view through the outer toroidal structure 4420 surrounding the inner optical systems. The outer toroidal structure 4420 can include specular and/or diffuse reflective surfaces to redirect light received from the inner optical systems.

Figure 47:
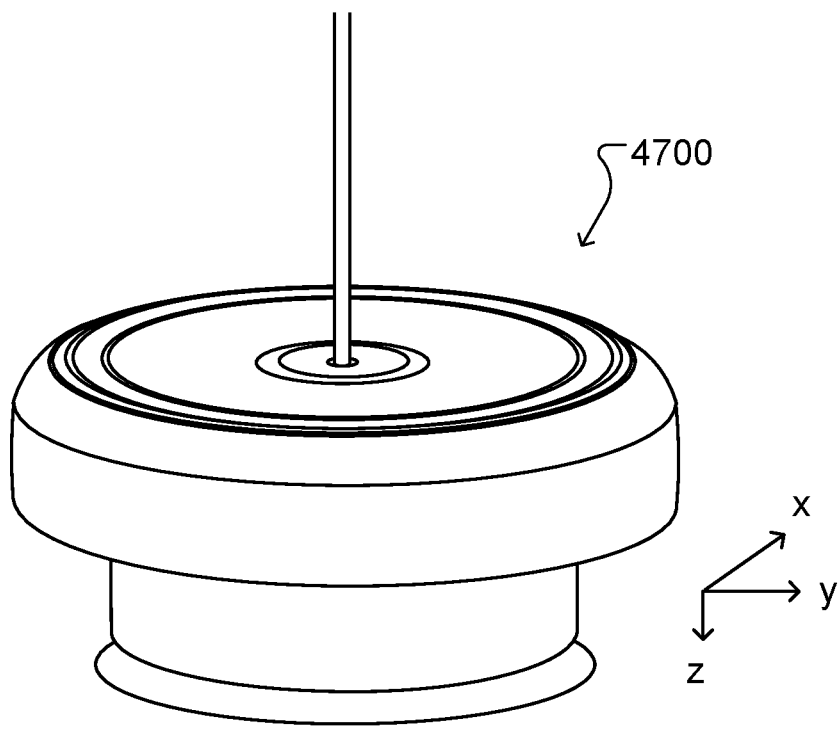
Figure 48:
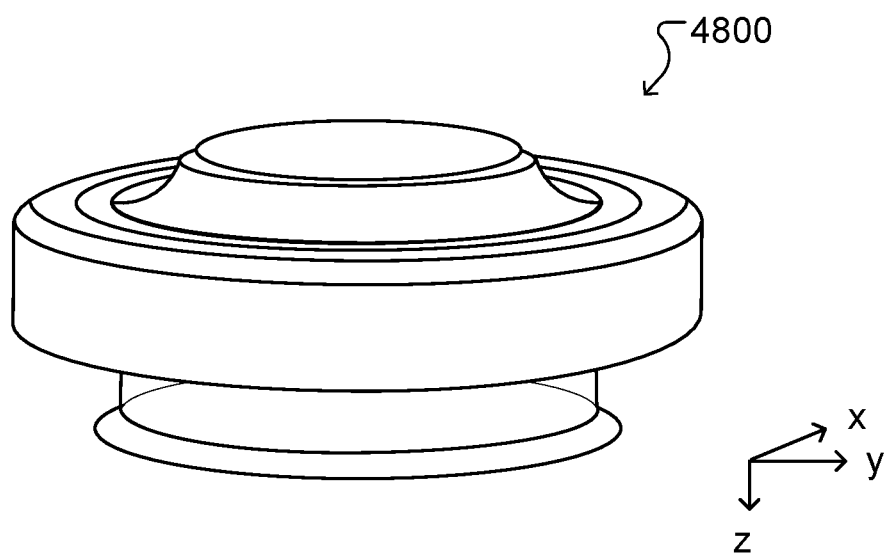

FIG. 47 shows a schematic view of an example pendant luminaire 4700 with two oppositely arranged optical systems. One optical system faces upward and has a planar annular aperture flush with the surrounding portion of the housing. The other optical system is arranged facing downward and may be configured to provide only direct or both direct and indirect illumination depending on the implementation. FIG. 48 shows an example flush (ceiling or wall) mount luminaire 4800 similar to the example pendant luminaire 4700.

Figure 49A:
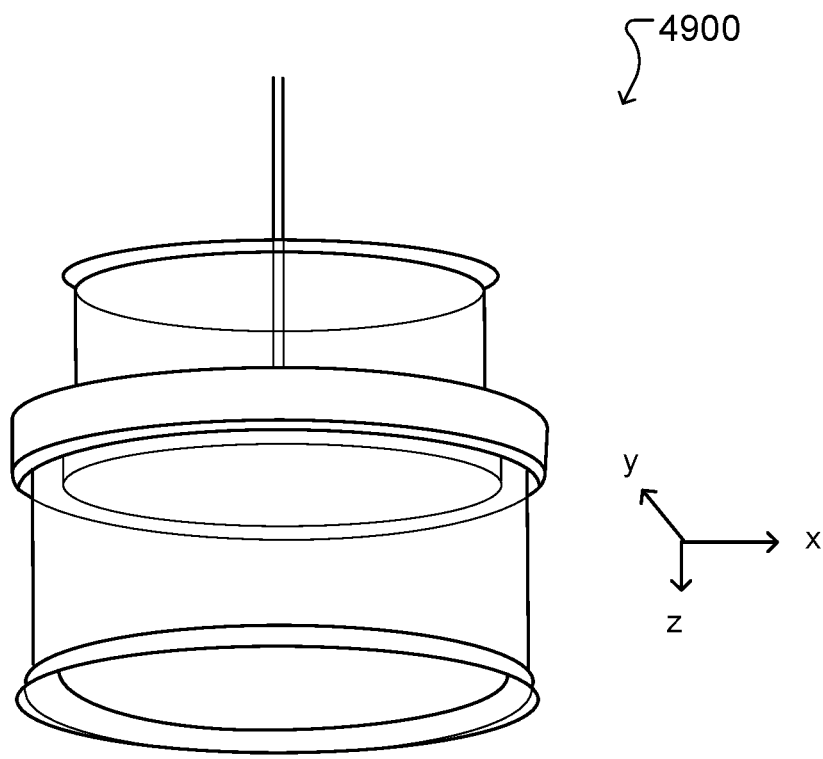
Figure 49B:
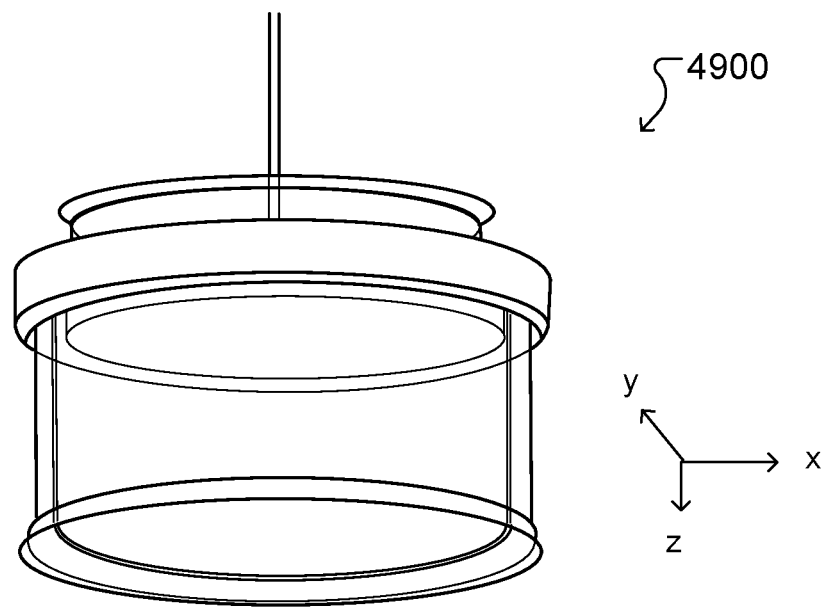
Figure 49C:
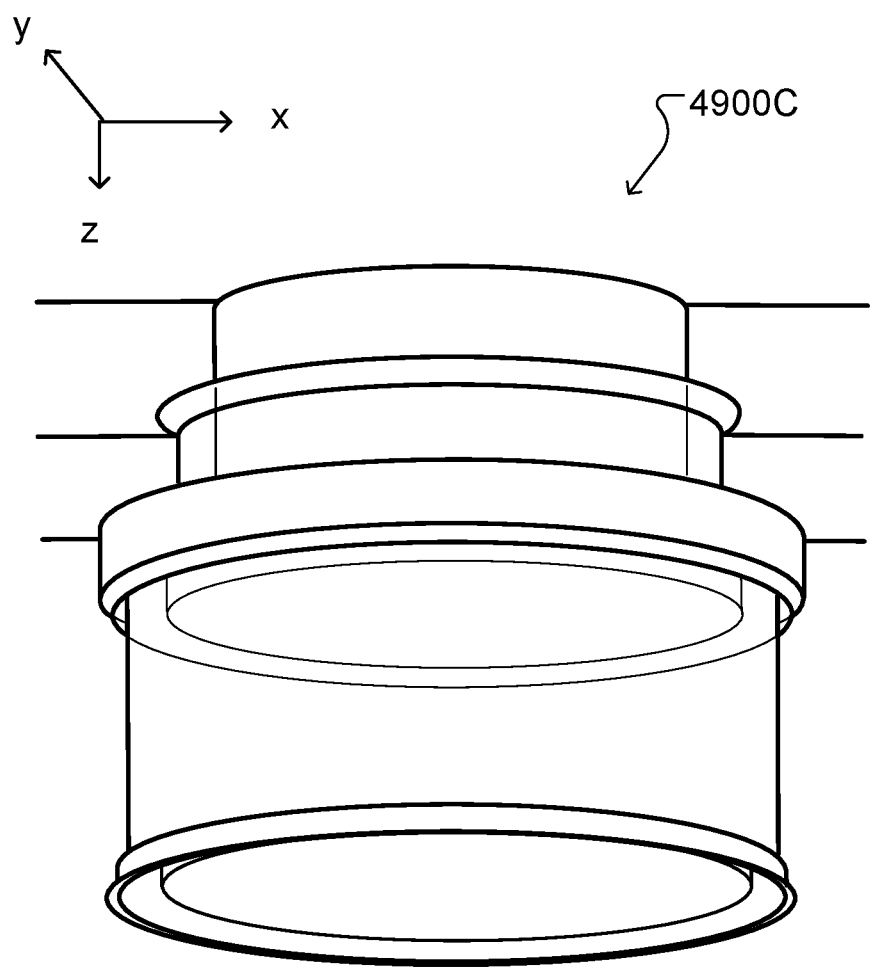

FIG. 49A shows another example pendant luminaire 4900 with two oppositely arranged optical systems. FIG. 49B shows a collapsed configuration of the example luminaire 4900. The example luminaire 4900 includes two telescoping optical systems supported by a suitable mechanism (not shown). FIG. 49C shows an example ceiling-mounted luminaire 4900C with two oppositely arranged optical systems.

Figure 50A:
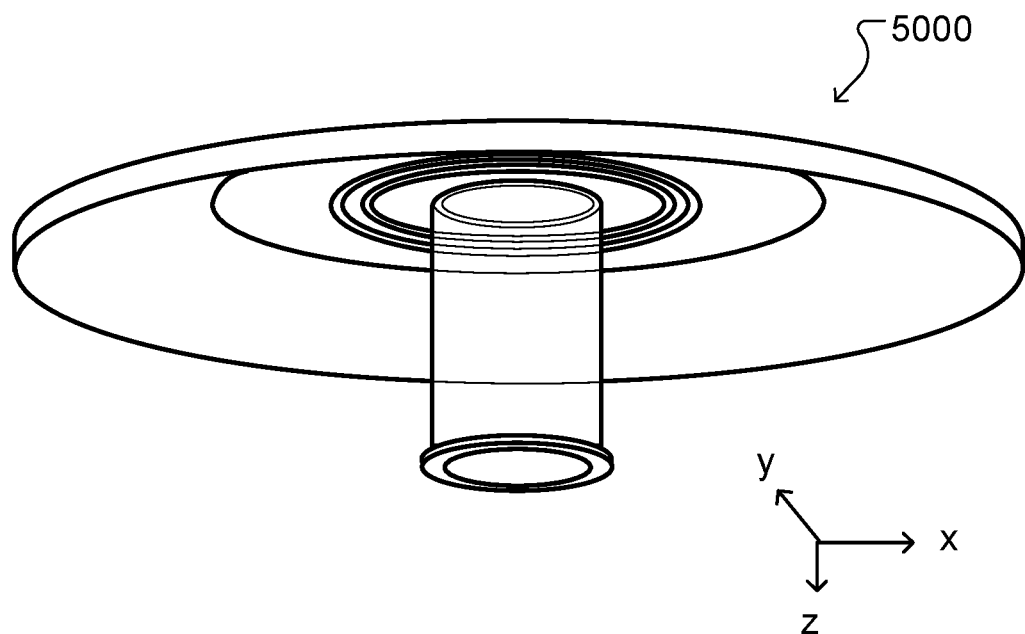

FIG. 50A shows an example ceiling mount luminaire 5000 with two concentric optical systems, the outer one providing direct downward light, the inner optical system tubularly protruding below a surrounding reflector dish and providing at least some light to the dish for downward redirection.

Figure 50B:
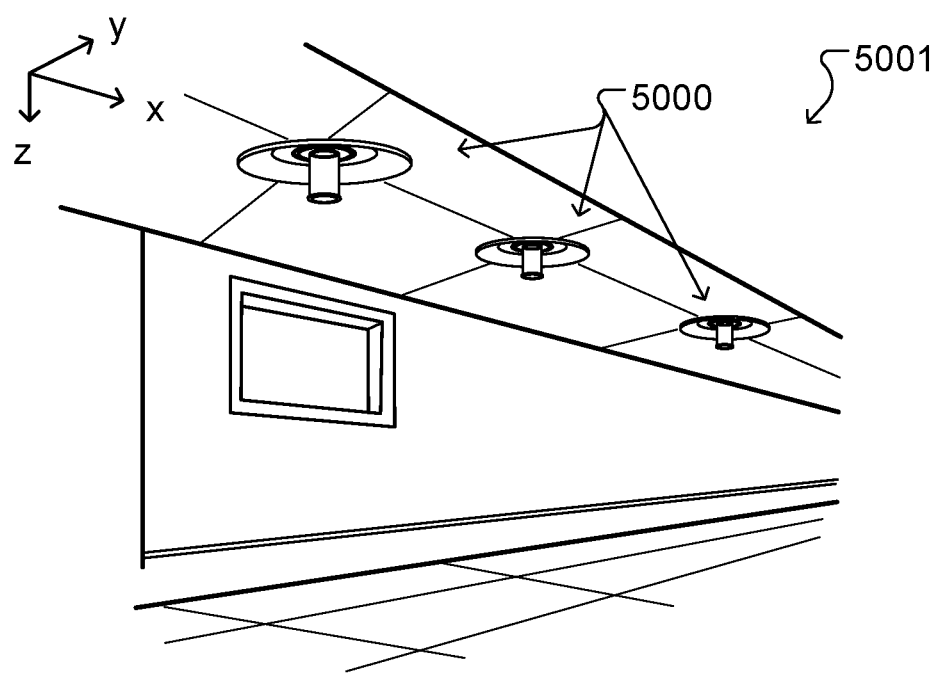

FIG. 50B shows a schematic arrangement 5001 of three example luminaires 5000 on a ceiling.

Figure 50C:
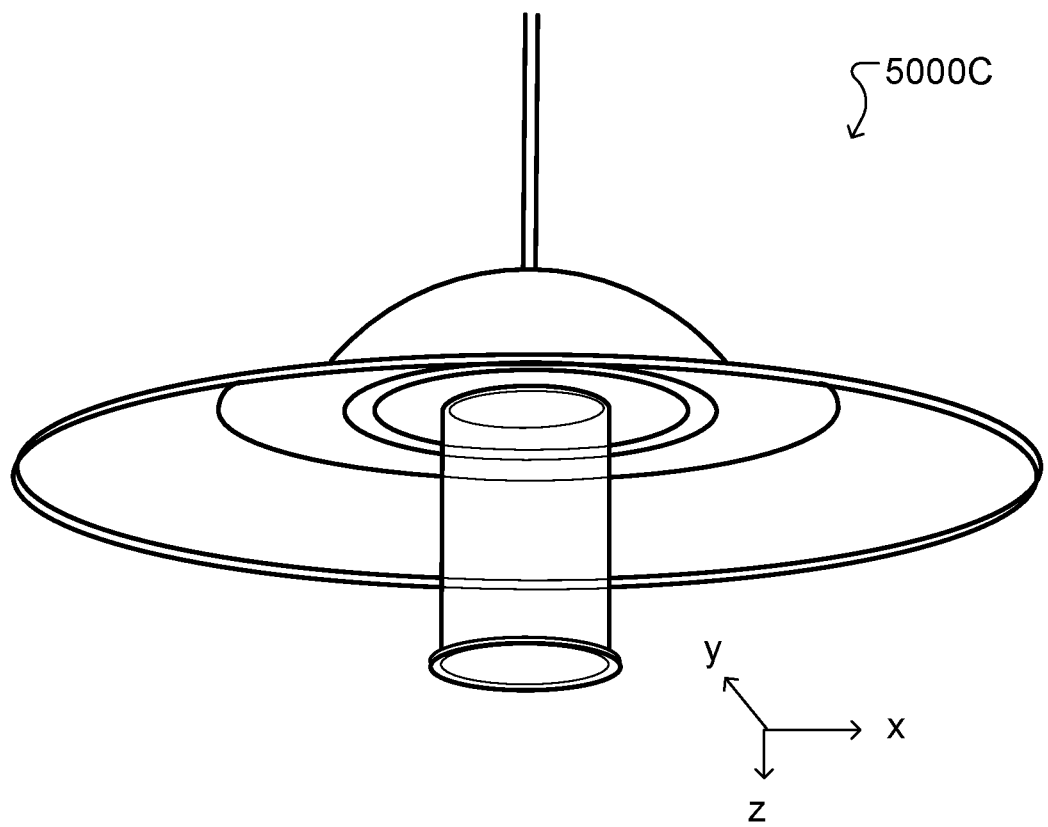
Figure 51:
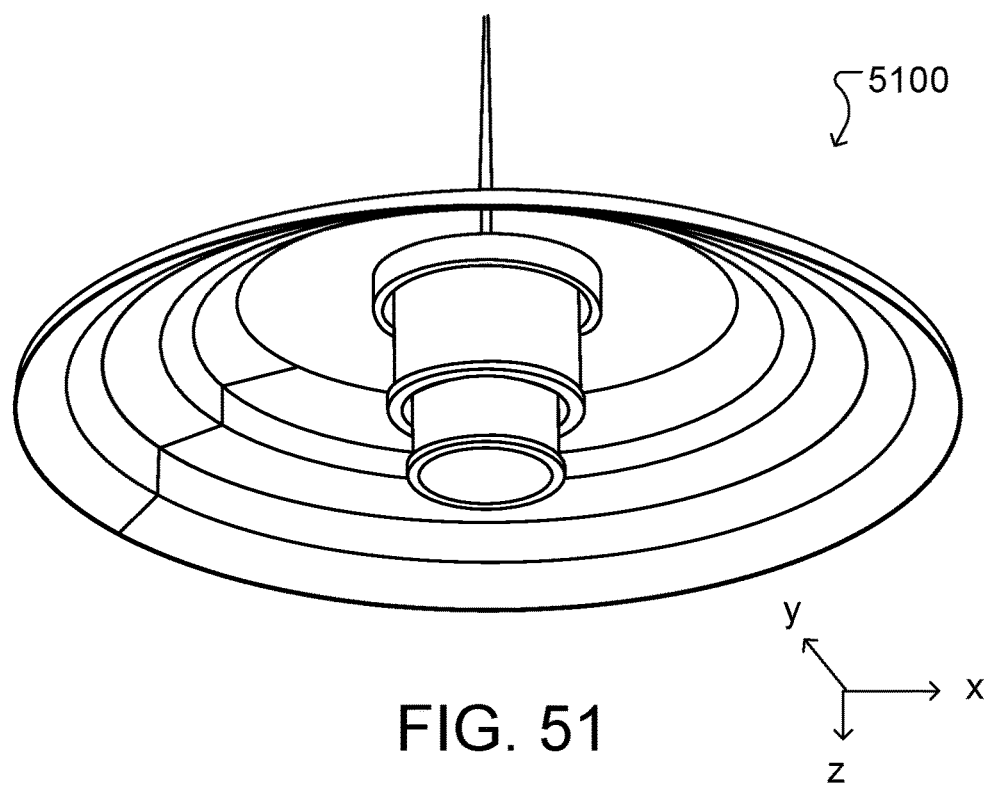
Figure 52:
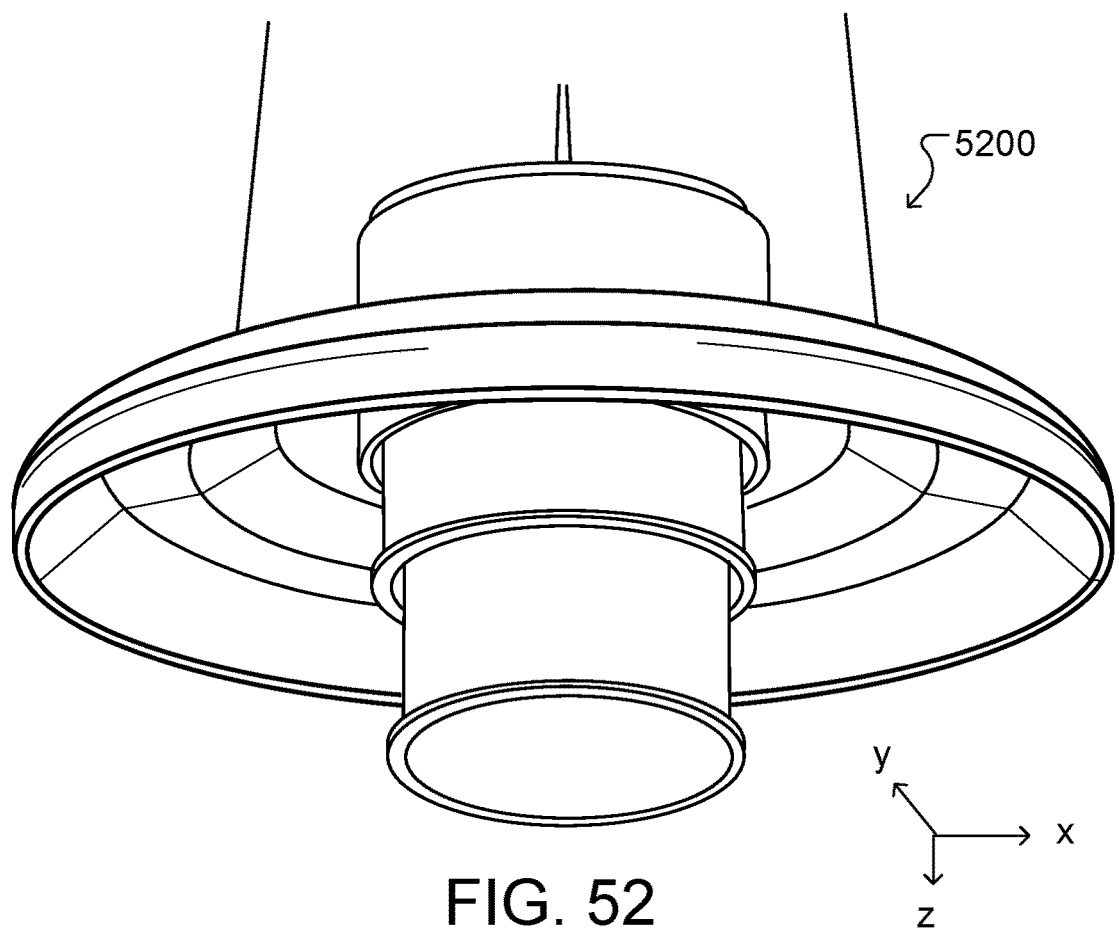
Figure 53:
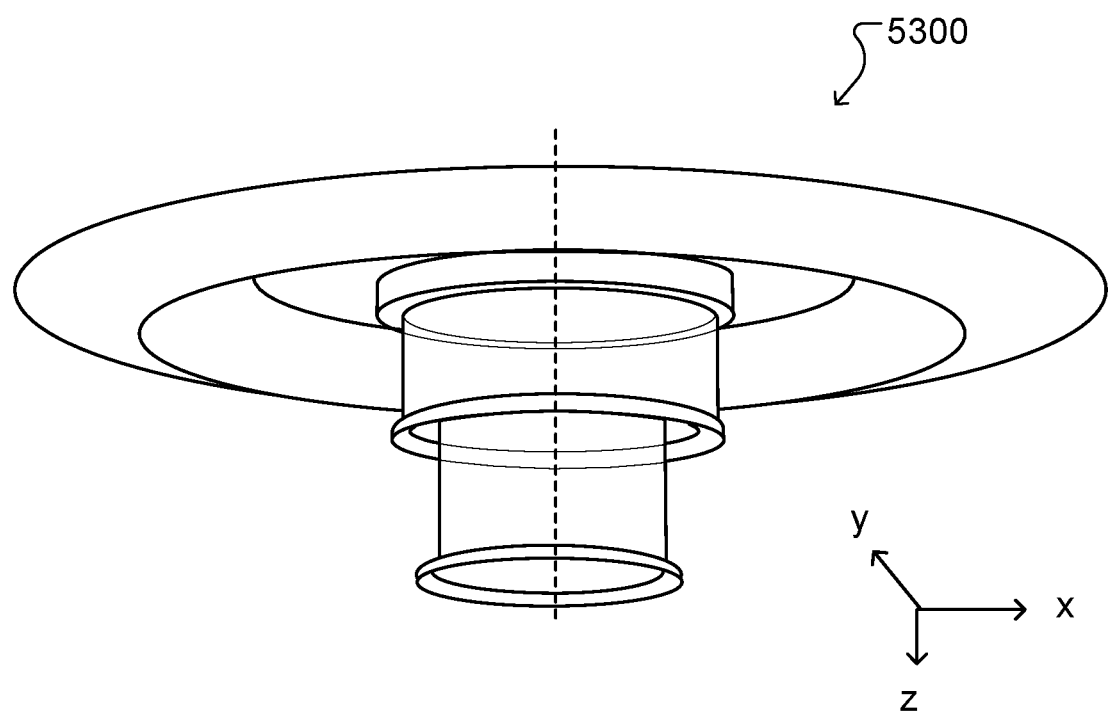

FIG. 50C shows a pendant version 5000C of the example luminaire 5000. FIG. 29 shows another example luminaire 2900 similar to the example luminaire 5000C but with the outer optical system tubularly extending downward along a portion of the inner tubular optical system. FIGS. 51, 52 and 53 show further example luminaires 5100, 5200, 5300 similar to the example luminaire 2900 but with different surrounding reflectors.

Figure 54A:
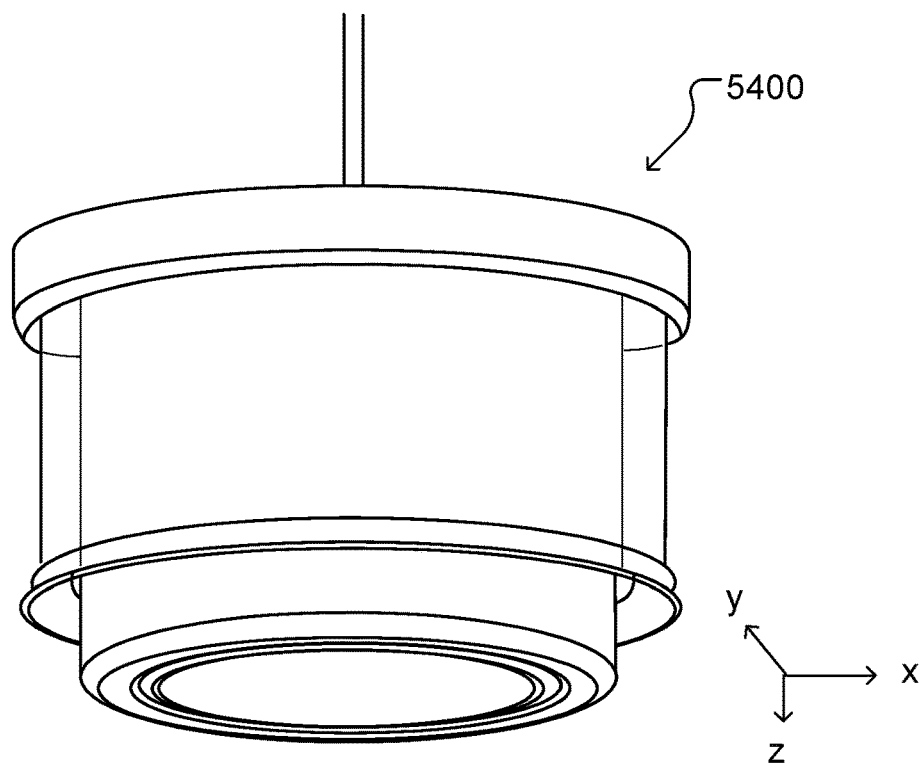
Figure 54B:
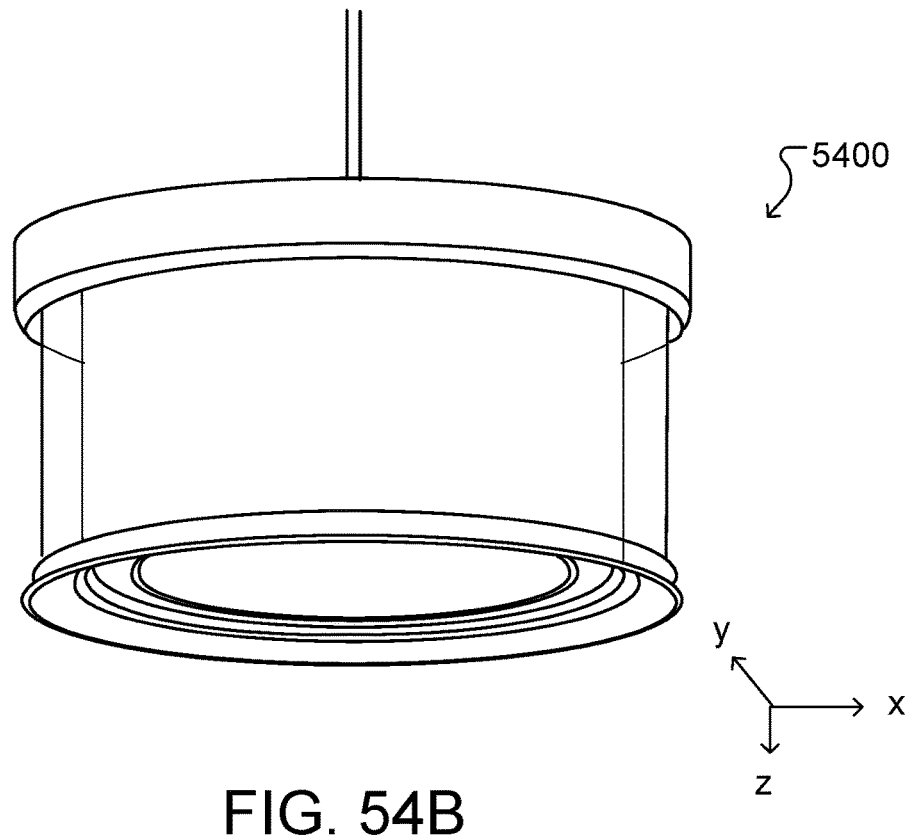

FIGS. 54A and 54B show different views of another example luminaire 5400 with two telescoping optical systems. FIG. 54B shows the example luminaire 5400 in a collapsed configuration, FIG. 54A in an extended configuration. Note that the inner optical system of the example luminaire 3900 of FIG. 39 and the example luminaire 5400 of FIGS. 54A-54B is configured to provide direct downward illumination based on a planar exit aperture.

Figure 55:
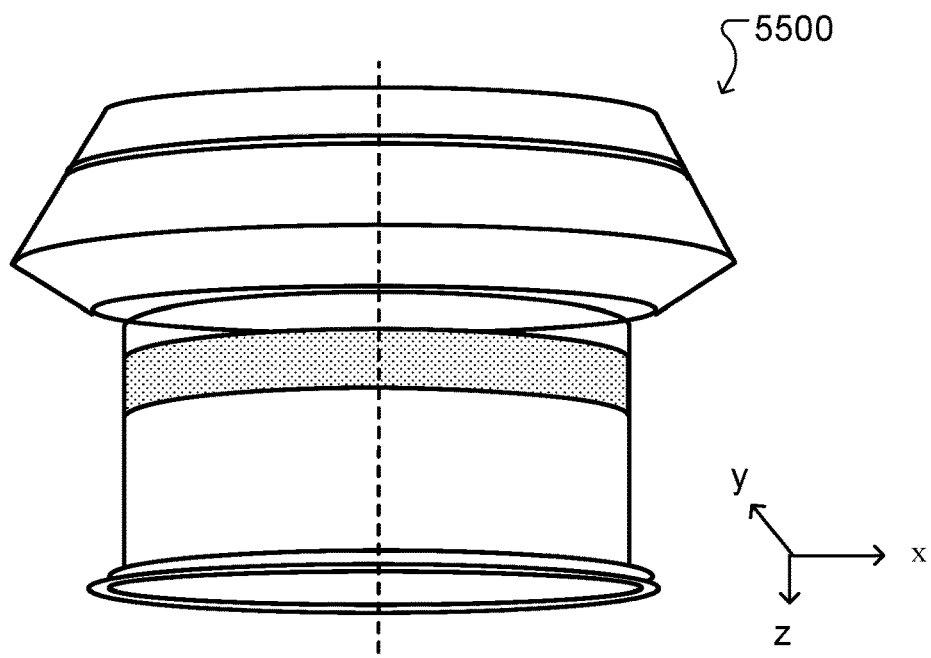
Figure 56:
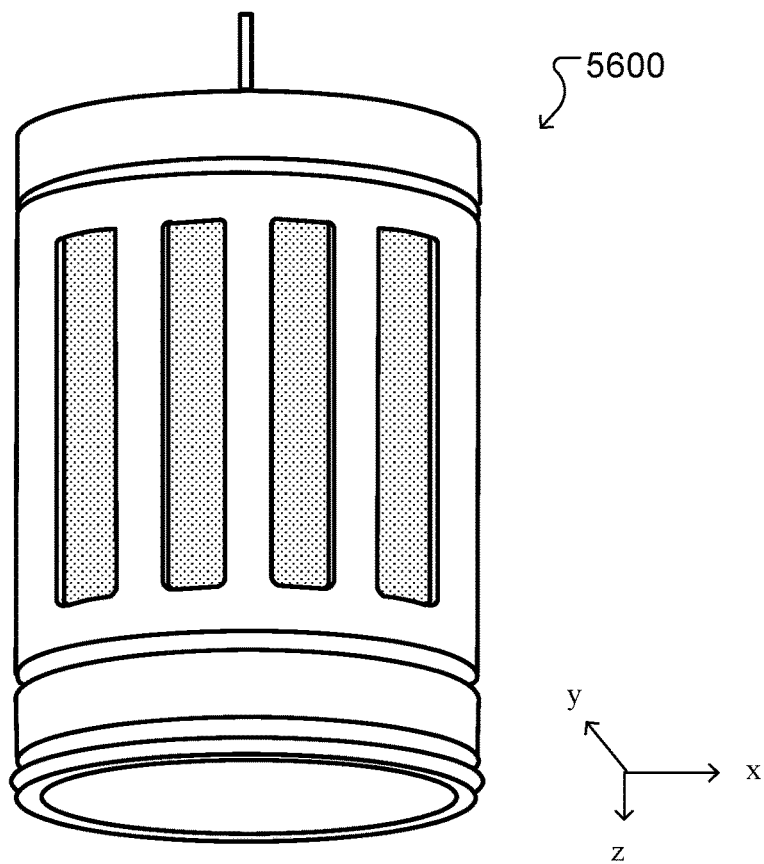
Figure 57:
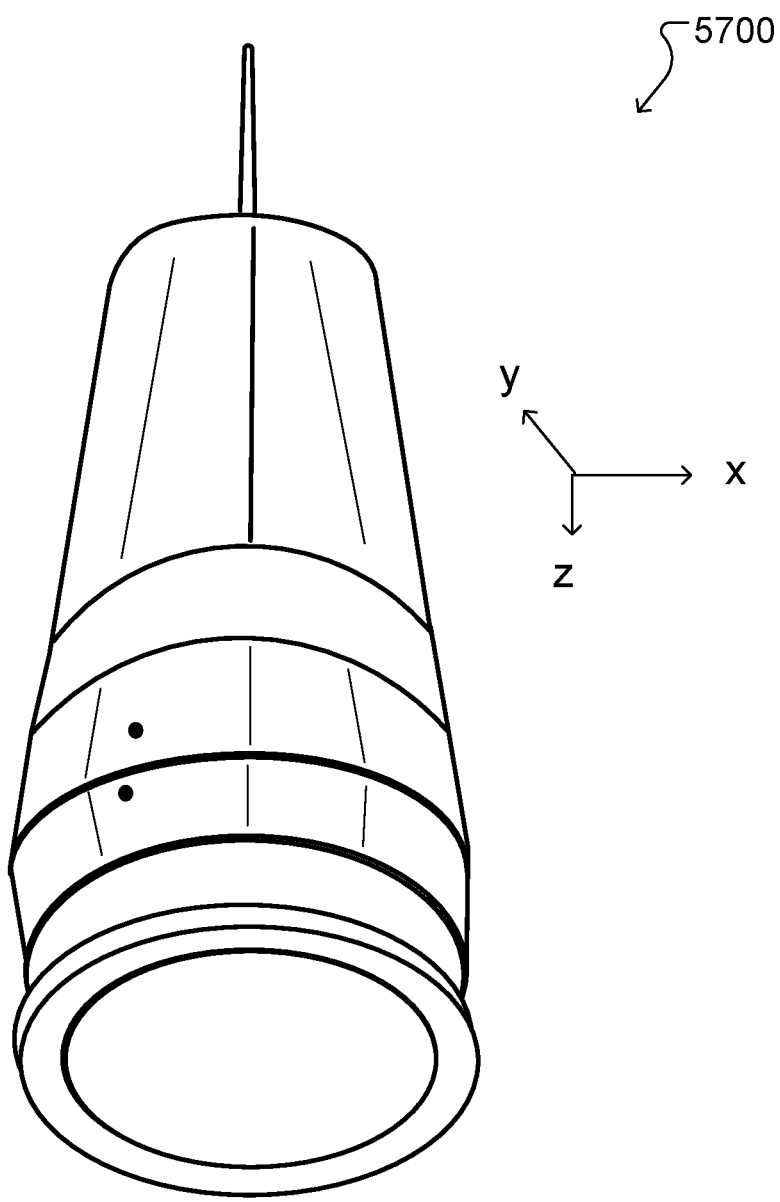

FIGS. 55, 56 and 57 show further example luminaires 5500, 5600, 5700 similar to the example luminaire 3900, which have optical systems that can output some light through the side surfaces of their respective light guides. As described below, such light output can be achieved via scattering centers located near the surface or inside the corresponding light guides or in other ways as described herein and/or in the references cited herein.

The light engines and optical systems used in the luminaires described above can be implemented in manners similar to the light engines and optical systems of the following light guide modules.

Figure 58A:
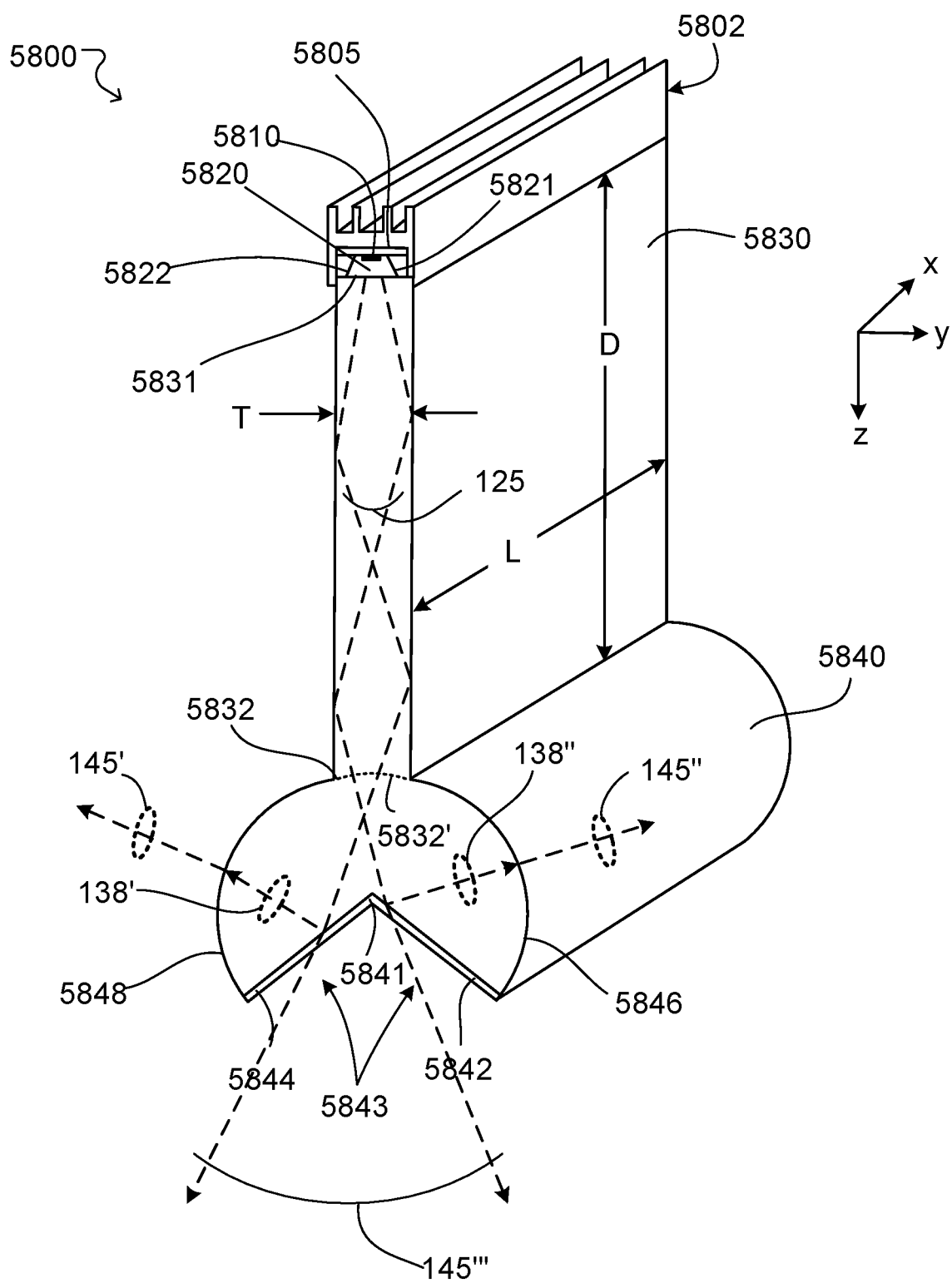
FIG. 58A shows a perspective view of an example of a light guide module having components similar to the components used in the light engines and the optical systems of the luminaires described herein.

Referring to FIG. 58A, a light guide module 5800 includes a substrate 5805 having a plurality of LEEs 5810 distributed along a first surface of the substrate 5805. The mount with the LEEs 5810 is disposed at a first (e.g., upper) edge 5831 of a light guide 5830. Once again, the positive z-direction is referred to as the "forward" direction and the negative z-direction is the "backward" direction. Sections through the light guide module 5800 parallel to the x-z plane are referred to as the "cross-section" or "cross-sectional plane" of the light guide module. Also, light guide module 5800 extends along the y-direction, so this direction is referred to as the "longitudinal" direction of the light guide module. Implementations of light guide modules can have a plane of symmetry parallel to the y-z plane, and can be curved or otherwise shaped. This is referred to as the "symmetry plane" of the light guide module.

Multiple LEEs 5810 are disposed on the first surface of the substrate 5805, although only one of the multiple LEEs 5810 is shown in FIG. 58A. For example, the plurality of LEEs 5810 can include multiple white LEDs. The LEEs 5810 are optically coupled with one or more optical couplers 5820 (only one of which is shown in FIG. 58A). An optical extractor 5840 is disposed at second (e.g., lower) edge 5832 of light guide 5830.

Substrate 5805, light guide 5830, and optical extractor 5840 extend a length L along the y-direction, so that the light guide module is an elongated light guide module with an elongation of L that may be about parallel to a display panel. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 5810 on the substrate 5805 will generally depend, inter alia, on the length L, where more LEEs are used for longer light guide modules. In some implementations, the plurality of LEEs 5810 can include between 10 and 1,000 LEEs (e.g., about 50 LEEs, about 100 LEEs, about 5800 LEEs, about 500 LEEs). Generally, the density of LEEs (e.g., number of LEEs per unit length) will also depend on the nominal power of the LEEs and illuminance desired from the light guide module. For example, a relatively high density of LEEs can be used in applications where high illuminance is desired or where low power LEEs are used. In some implementations, the light guide module 5800 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the light guide module. In some implementations, the substrate 5805 can be attached to a housing 5802 configured as a heat sink to extract heat emitted by the plurality of LEEs 5810. A surface of the substrate 5805 that contacts the housing 5802 opposes the side of the substrate 5805 on which the LEEs 5810 are disposed. The light guide module 5800 can include one or multiple types of LEEs, for example one or more subsets of LEEs in which each subset can have different color or color temperature.

Optical coupler 5820 includes one or more solid pieces of transparent optical material (e.g., a glass material or a transparent plastic, such as polycarbonate or acrylic) having surfaces 5821 and 5822 positioned to reflect light from the LEEs 5810 towards the light guide 5830. In general, surfaces 5821 and 5822 are shaped to collect and at least partially collimate light emitted from the LEEs. In the x-z cross-sectional plane, surfaces 5821 and 5822 can be straight or curved. Examples of curved surfaces include surfaces having a constant radius of curvature, parabolic or hyperbolic shapes. In some implementations, surfaces 5821 and 5822 are coated with a highly reflective material (e.g., a reflective metal, such as aluminum or silver), to provide a highly reflective optical interface. The cross-sectional profile of optical coupler 5820 can be uniform along the length L of light guide module 5800. Alternatively, the cross-sectional profile can vary. For example, surfaces 5821 and/or 5822 can be curved out of the x-z plane.

The exit aperture of the optical coupler 5820 adjacent upper edge of light guide 5831 is optically coupled to edge 5831 to facilitate efficient coupling of light from the optical coupler 5820 into light guide 5830. For example, the surfaces of a solid coupler and a solid light guide can be attached using a material that substantially matches the refractive index of the material forming the optical coupler 5820 or light guide 5830 or both (e.g., refractive indices across the interface are different by 2% or less.) The optical coupler 5820 can be affixed to light guide 5830 using an index matching fluid, grease, or adhesive. In some implementations, optical coupler 5820 is fused to light guide 5830 or they are integrally formed from a single piece of material (e.g., coupler and light guide may be monolithic and may be made of a solid transparent optical material).

Light guide 5830 is formed from a piece of transparent material (e.g., glass material such as BK7, fused silica or quartz glass, or a transparent plastic, such as polycarbonate or acrylic) that can be the same or different from the material forming optical couplers 5820. Light guide 5830 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 5830 from optical coupler 5820 (with an angular range 125) reflects off the planar surfaces of the light guide by TIR and spatially mixes within the light guide. The mixing can help achieve illuminance and/or color uniformity, along the x-axis, at the distal portion of the light guide 5832 at optical extractor 5840.

The depth, D, of light guide 5830 can be selected to achieve adequate uniformity at the exit aperture (i.e., at end 5832) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 5820 are designed to restrict the angular range of light entering the light guide 5830 (e.g., to within +/−40 degrees) so that at least a substantial amount of the light (e.g., 95% or more of the light) is optically coupled into spatial modes in the light guide 5830 that undergoes TIR at the planar surfaces. Light guide 5830 can have a uniform thickness T, which is the distance separating two planar opposing surfaces of the light guide. Generally, T is sufficiently large so the light guide has an aperture at first (e.g., upper) surface 5831 sufficiently large to approximately match (or exceed) the exit aperture of optical coupler 5820. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 5820 and light guide 5830 are formed from solid pieces of transparent optical material, hollow structures are also possible. For example, the optical coupler 5820 or the light guide 5830 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 5840 is also composed of a solid piece of transparent optical material (e.g., a glass material or a transparent plastic, such as polycarbonate or acrylic) that can be the same as or different from the material forming light guide 5830. In the example implementation shown in FIG. 58A, the optical extractor 5840 includes redirecting (e.g., flat) surfaces 5842 and 5844 and curved surfaces 5846 and 5848. The flat surfaces 5842 and 5844 represent first and second portions of a redirecting surface 5843, while the curved surfaces 5846 and 5848 represent first and second output surfaces of the light guide module 5800.

Surfaces 5842 and 5844 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 5842 and 5844 provide a highly reflective optical interface for light having the angular range 125 entering an input end of the optical extractor 5832' from light guide 5830. As another example, the surfaces 5842 and 5844 include portions that are transparent to the light entering at the input end 5832' of the optical extractor 5840. Here, these portions can be uncoated regions (e.g., partially silvered regions) or discontinuities (e.g., slots, slits, apertures) of the surfaces 5842 and 5844. As such, some light is transmitted in the forward direction (along the z-axis) through surfaces 5842 and 5844 of the optical extractor 5840 in a third forward angular range 145'''. In some cases, the light transmitted in the third forward angular range 145''' is refracted. In this way, the redirecting surface 5843 acts as a beam splitter rather than a mirror, and transmits in the third forward angular range 145''' a desired portion of incident light, while reflecting the remaining light in angular ranges 138 and 138'.

In the x-z cross-sectional plane, the lines corresponding to surfaces 5842 and 5844 have the same length and form an apex or vertex 5841, e.g. a v-shape that meets at the apex 5841. In general, an included angle (e.g., the smallest included angle between the surfaces 5844 and 5842) of the redirecting surfaces 5842, 5844 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 58A, the output surfaces 5846, 5848 of the optical extractor 5840 are curved with a constant radius of curvature that is the same for both. In an aspect, the output surfaces 5846, 5848 may have optical power (e.g., may focus or defocus light.) Accordingly, light guide module 5800 has a plane of symmetry intersecting apex 5841 parallel to the y-z plane.

The surface of optical extractor 5840 adjacent to the lower edge 5832 of light guide 5830 is optically coupled to edge 5832. For example, optical extractor 5840 can be affixed to light guide 5830 using an index matching fluid, grease, or adhesive. In some implementations, optical extractor 5840 is fused to light guide 5830 or they are integrally formed from a single piece of material.

The emission spectrum of the light guide module 5800 corresponds to the emission spectrum of the LEEs 5810. However, in some implementations, a wavelength-conversion material may be positioned in the light guide module, for example remote from the LEEs, so that the wavelength spectrum of the light guide module is dependent both on the emission spectrum of the LEEs and the composition of the wavelength-conversion material. In general, a wavelength-conversion material can be placed in a variety of different locations in light guide module 5800. For example, a wavelength-conversion material may be disposed proximate the LEEs 5810, adjacent surfaces 5842 and 5844 of optical extractor 5840, on the exit surfaces 5846 and 5848 of optical extractor 5840, and/or at other locations.

The layer of wavelength-conversion material (e.g., phosphor) may be attached to light guide 5830 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n2)(-½)$, where R is the radius of curvature of the light-exit surfaces (5846 and 5848 in FIG. 58A) of the extractor 5840 and n is the index of refraction of the portion of the extractor that is opposite of the wavelength-conversion material as viewed from the reflective surfaces (5842 and 5844 in FIG. 58A). The support structure may be a transparent self-supporting structure. The wavelength-conversion material diffuses light as it converts the wavelengths, provides mixing of the light and can help uniformly illuminate a surface of the ambient environment.

During operation, light exiting light guide 5830 through end 5832 impinges on the reflective interfaces at portions of the redirecting surface 5842 and 5844 and is reflected outwardly towards output surfaces 5846 and 5848, respectively, away from the symmetry plane of the light guide module. The first portion of the redirecting surface 5842 provides light having an angular distribution 138 towards the output surface 5846, the second portion of the redirecting surface 5844 provides light having an angular distribution 138' towards the output surface 5846. The light exits optical extractor 5840 through output surfaces 5846 and 5848. In general, the output surfaces 5846 and 5848 have optical power, to redirect the light exiting the optical extractor 5840 in first and second backward angular ranges 145', 145'', respectively. For example, optical extractor 5840 may be configured to emit light upwards (i.e., towards the plane intersecting the LEEs and parallel to the x-y plane), downwards (i.e., away from that plane) or both upwards and downwards. In general, the direction of light exiting the light guide module through surfaces 5846 and 5848 depends on the divergence of the light exiting light guide 5830 and the orientation of surfaces 5842 and 5844.

Surfaces 5842 and 5844 may be oriented so that little or no light from light guide 5830 is output by optical extractor 5840 in certain directions. In implementations where the light guide module 5800 is attached to a ceiling of a room (e.g., the forward direction is towards the floor) such configurations can help avoid glare and an appearance of non-uniform illuminance.

In general, the light intensity distribution provided by light guide module 5800 reflects the symmetry of the light guide module's structure about the y-z plane, as described below in connection with FIG. 58C. Referring to both FIGS. 58A and 58C, the orientation of the output lobes 145a, 145b can be adjusted based on the included angle of the v-shaped groove 5841 formed by the portions of the redirecting surface 5842 and 5844. For example, a first included angle results in a far-field light intensity distribution 5890 with output lobes 145a, 145b located at relatively smaller angles compared to output lobes 145a, 145b of the far-field light intensity distribution 5890 that results for a second included angle larger than the first angle. In this manner, light can be extracted from the light guide module 5800 in a more forward direction for the smaller of two included angles formed by the portions 5842, 5844 of the redirecting surface 5843.

Furthermore, while surfaces 5842 and 5844 are depicted as planar surfaces, other shapes are also possible. For example, these surfaces can be curved or faceted. Curved redirecting surfaces 5842 and 5844 can be used to narrow or widen the output lobes 145a, 145b. Depending on the divergence of the angular range 125 of the light that is received at the input end of the optical extractor 5832', concave reflective surfaces 5842, 5844 can narrow the lobes 145a, 145b output by the optical extractor 5840 (and illustrated in FIG. 58C), while convex reflective surfaces 5842, 5844 can widen the lobes 145a, 145b output by the optical extractor 5840. As such, suitably configured redirecting surfaces 5842, 5844 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, light guide module 5800 can be designed to output light into different first and second backward angular ranges 145', 145" from those shown in FIG. 58A. In some implementations, light guide modules can output light into lobes 145a, 145b that have a different divergence or propagation direction than those shown in FIG. 58C. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 58C. The "direction" refers to the direction at which a lobe is brightest. In FIG. 58C, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The light guide modules can include other features useful for tailoring the intensity profile. For example, in some implementations, light guide modules can include an optically diffuse material that can diffuse light in a controlled manner to aid homogenizing the light guide module's intensity profile. For example, surfaces 5842 and 5844 can be roughened or a diffusely reflecting material, rather than a specular reflective material, can be coated on these surfaces. Accordingly, the optical interfaces at surfaces 5842 and 5844 can diffusely reflect light, scattering light into broader lobes than would be provided by similar structures utilizing specular reflection at these interfaces. In some implementations these surfaces can include structure that facilitates various intensity distributions. For example, surfaces 5842 and 5844 can each have multiple planar facets at differing orientations. Accordingly, each facet will reflect light into different directions. In some implementations, surfaces 5842 and 5844 can have structure thereon (e.g., structural features that scatter or diffract light).

Surfaces 5846 and 5848 need not be surfaces having a constant radius of curvature. For example, surfaces 5846 and 5848 can include portions having differing curvature and/or can have structure thereon (e.g., structural features that scatter or diffract light). In certain implementations, a light scattering material can be disposed on surfaces 5846 and 5848 of optical extractor 5840.

In some implementations, optical extractor 5840 is structured so that a negligible amount (e.g., less than 1%) of the light propagating within at least one plane (e.g., the x-z cross-sectional plane) that is reflected by surface 5842 or 5844 experiences TIR at light-exit surface 5846 or 5848. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on the surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n2)(-\frac{1}{2})$, which is smaller than R/n, will be subject to small Fresnel reflection at the surface of radius R when exiting the circular structure. This condition may be referred to as Brewster geometry. Implementations may be configured accordingly.

Referring again to FIG. 58A, in some implementations, all or part of surfaces 5842 and 5844 may be located within a notional Weierstrass surface defined by surfaces 5846 and 5848. For example, the portions of surfaces 5842 and 5844 that receive light exiting light guide 5830 through end 5832 can reside within this surface so that light within the x-z plane reflected from surfaces 5842 and 5844 exits through surfaces 5846 and 5848, respectively, without experiencing TIR.

Figure 58B:
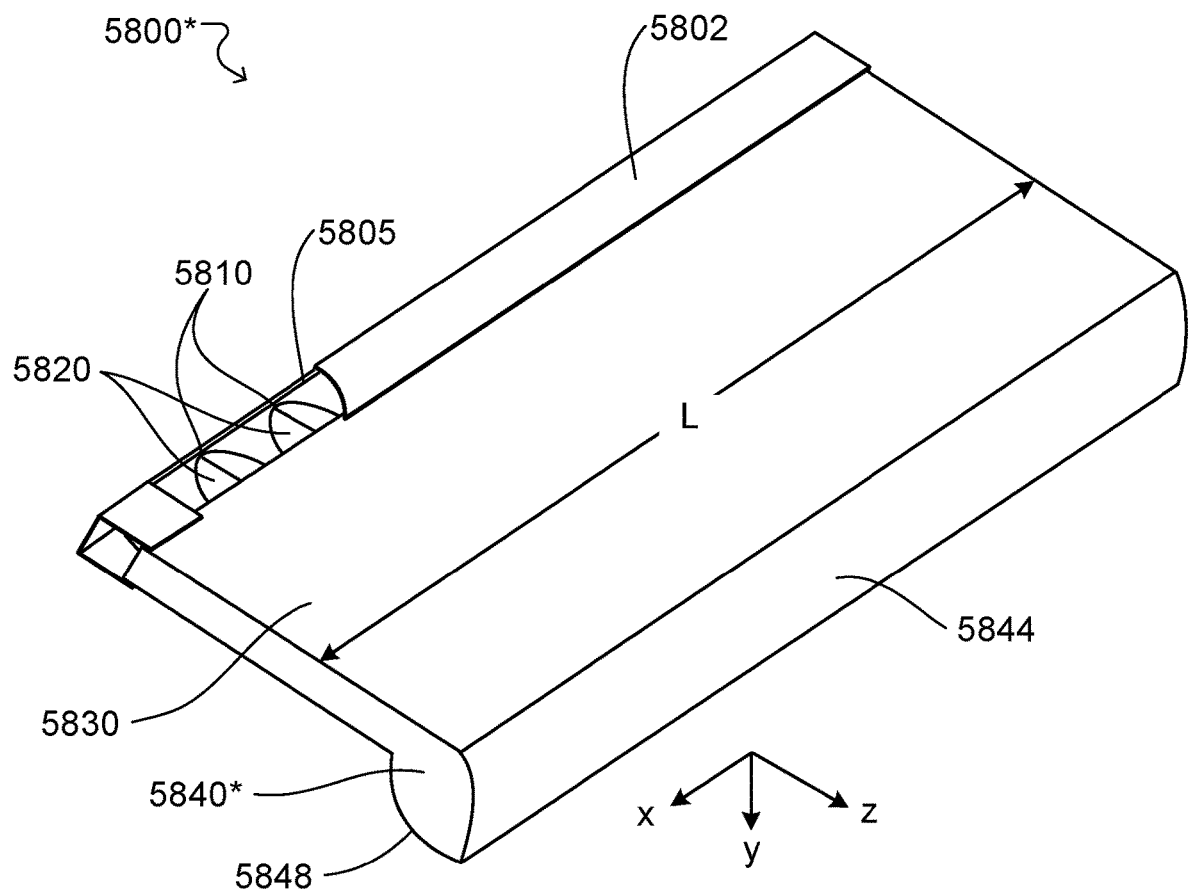
FIG. 58B shows a perspective view of another example of a light guide module having components similar to the components used in the light engines and the optical systems of the luminaires described herein.

In the example implementations described above in connection with FIG. 58A, the light guide module 5800 is configured to output light into first and second backward angular ranges 145' and 145" and in third forward angular range 145'". In other implementations, the light guide-based light guide module 5800 is modified to output light into a single backward angular range 145'. FIG. 58B shows such light guide-based light guide module 5800* configured to output light on a single side of the light guide is referred to as a single-sided light guide module. The single-sided light guide module 5800* is elongated along the x-axis like the light guide module 5800 shown in FIG. 58A. Also like the light guide module 5800, the single-sided light guide module 5800* includes a substrate 5805 and LEEs 5810 disposed on a surface of the substrate 5805 along the x-axis to emit light in a first angular range. The single-sided light guide module 5800* further includes optical couplers 5820 arranged and configured to redirect the light emitted by the LEEs 5810 in the first angular range into a second angular range 125 that has a divergence smaller than the divergence of the first angular range at least in the x-z cross-section. Also, the single-sided light guide module 5800* includes a light guide 5830 to guide the light redirected by the optical couplers 5820 in the second angular range 125 from a first end 5831 of the light guide to a second end 5832 of the light guide. Additionally, the single-sided light guide module 5800* includes a single-sided extractor (denoted 5840*) to receive the light guided by the light guide 5830. The single-sided extractor 5840* includes a redirecting surface 5844 to redirect some of the light received from the light guide 5830 into a third angular range 138', like described for light guide module 5800 with reference to FIG. 58A, and an output surface 5848 to output the light redirected by the redirecting surface 5844 in the third angular range 138' into a first backward angular range 145'. Also as described in FIG. 58A, the redirecting surface 5844 is configured to leak some the light received from the light guide 5830 into a third forward angular range 145'".

Figure 58C:
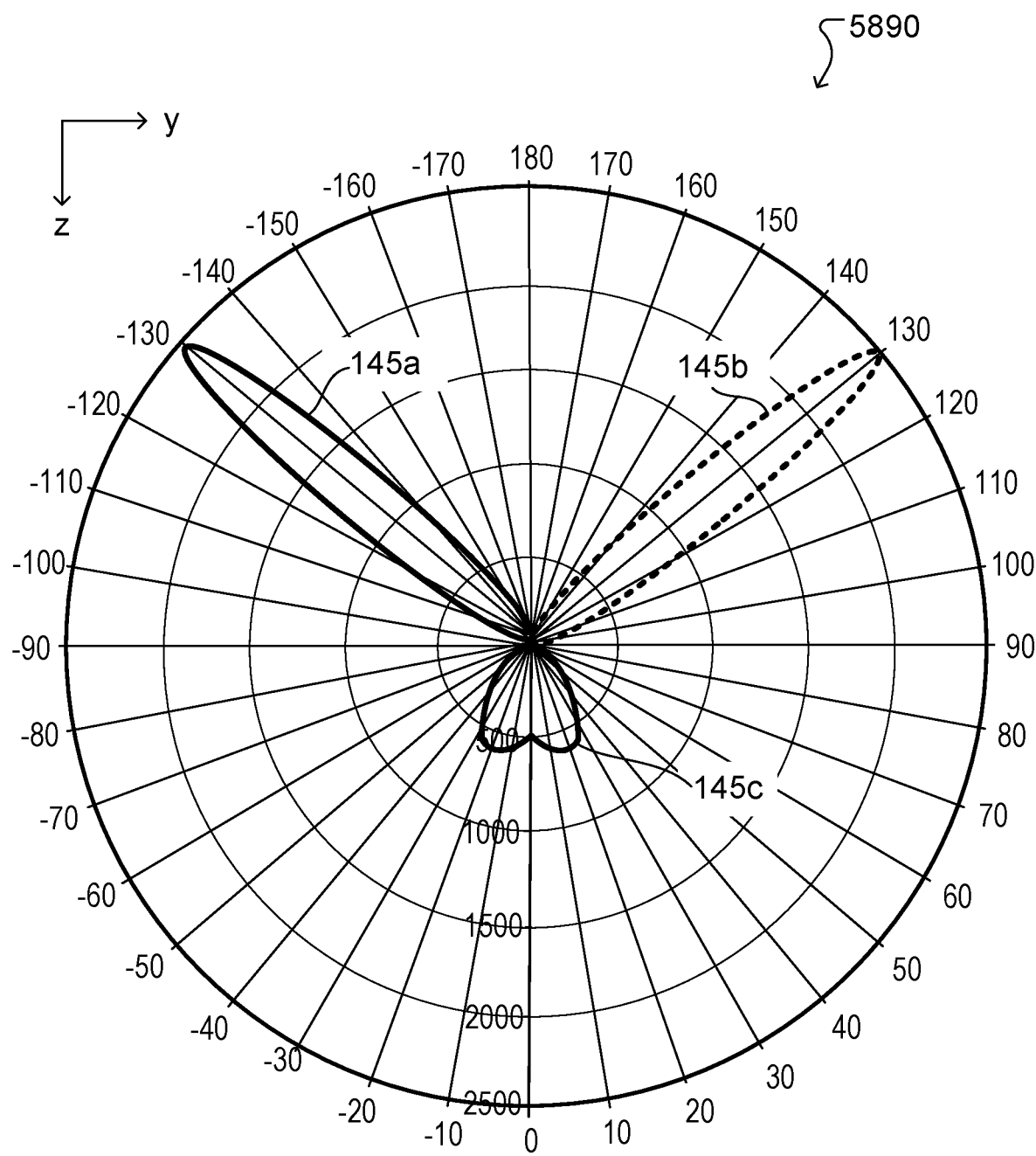
FIGS. 58C-58E show aspects of the light guide modules of FIGS. 58A-58B.

A light intensity profile of the single-sided light guide module 5800* is represented in FIG. 58C as the first output lobe 145a and the third output lobe 145c. The output lobe 145a corresponds to light output by the single-sided light guide module 5800* in the first backward angular range 145' and the output lobe 145c corresponds to light output by the single-sided light guide module 5800* in the third forward angular range 145".

Figure 58D:
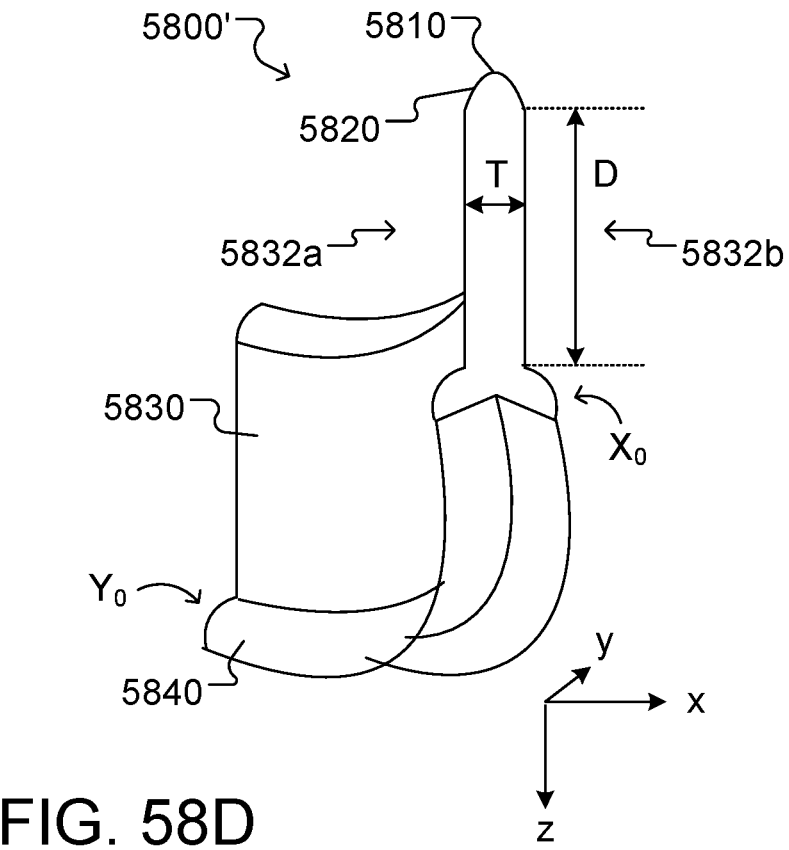
Figure 58E:
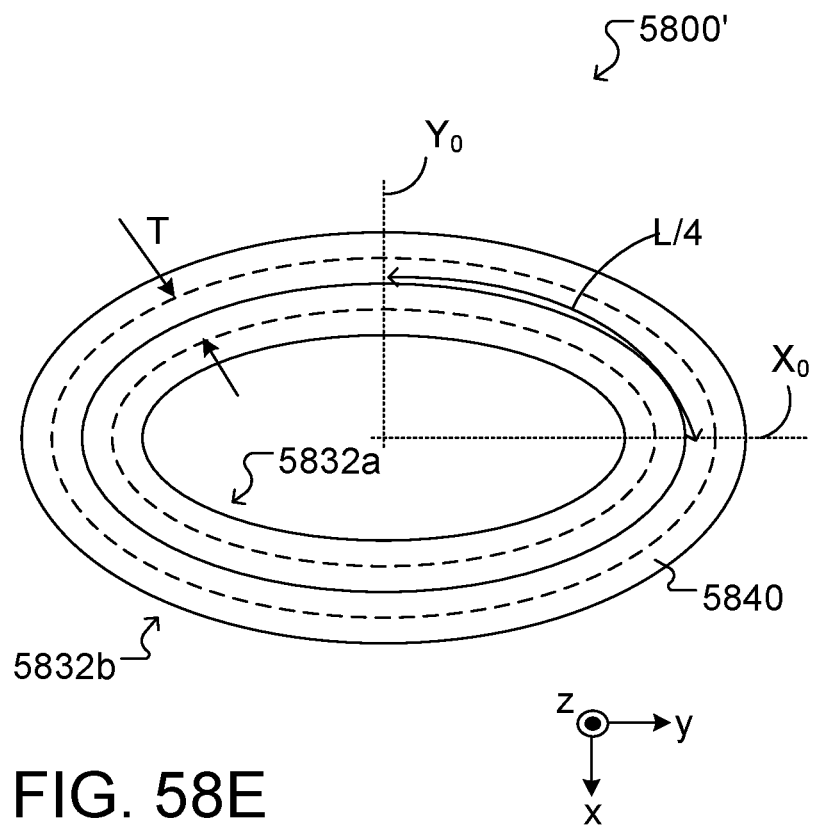

Other open and closed shapes of the light guide module 5800 are possible. FIGS. 58D and 58E show a perspective view and a bottom view, respectively, of a light guide module 5800' for which the light guide 5830 has two opposing side surfaces 5832a, 5832b that form a closed cylinder shell of thickness T. In the example illustrated in FIGS. 58D and 58E, the x-y cross-section of the cylinder shell formed by the opposing side surfaces 5832a, 5832b is oval. In other cases, the x-y cross-section of the cylinder shell can be circular or can have other shapes. Some implementations of the example light guide module 5800' may include a specular reflective coating on the side surface 5832a of the light guide 5830. For T=0.05 D, 0.1 D or 0.2 D, for instance, light from multiple, point-like LEEs 5810—distributed along an elliptical path of length L—that is edge-coupled into the light guide 5830 at the receiving end can efficiently mix and become uniform (quasi-continuous) along such an elliptical path by the time it propagates to the opposing end.

Light guide modules like the ones described above—which have a light guide 5830 that guides light from its input end 5831 to its output end 5832 without leaking light through its side surfaces 5832a and 5832b—can be used to obtain light guide modules with leaky side surfaces, as described below.

Figure 59A:
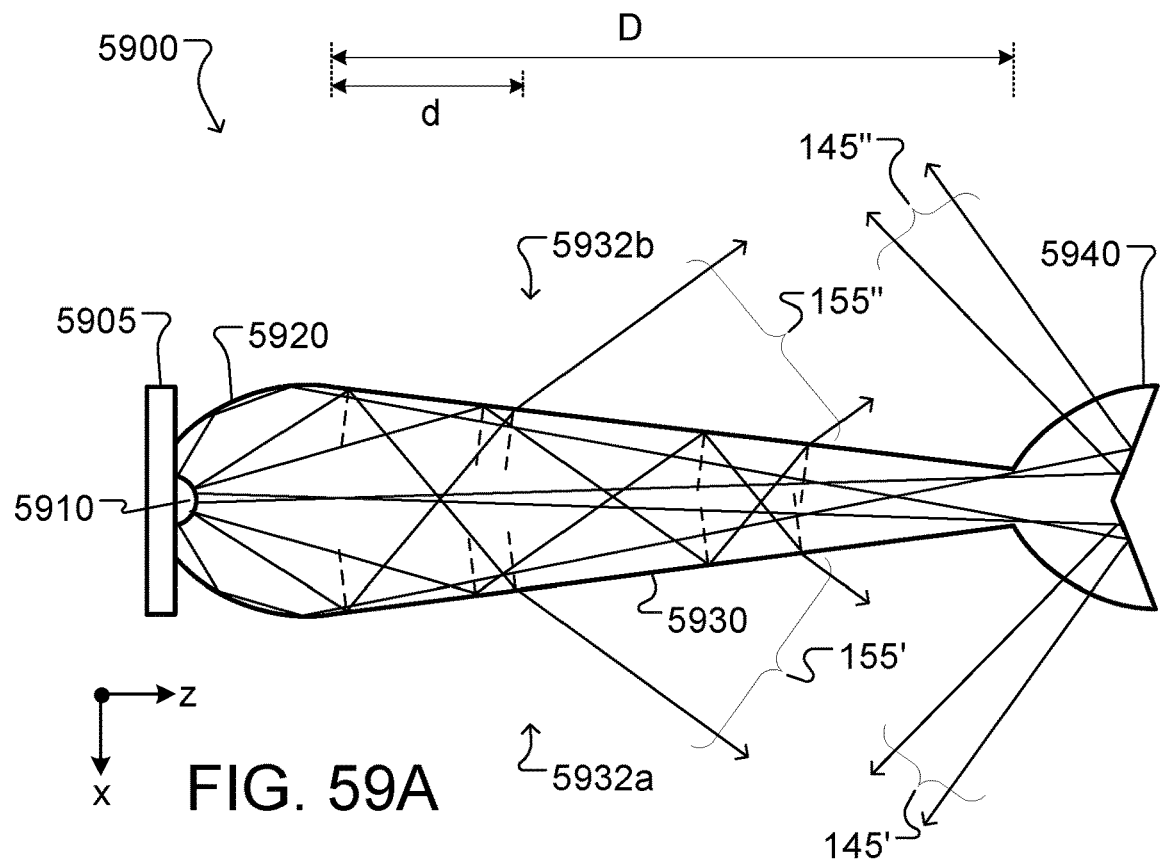
FIGS. 59A-59D show aspects of another example of a light guide module having components similar to the components used in the light engines and the optical systems of the luminaires described herein.
Figure 59B:
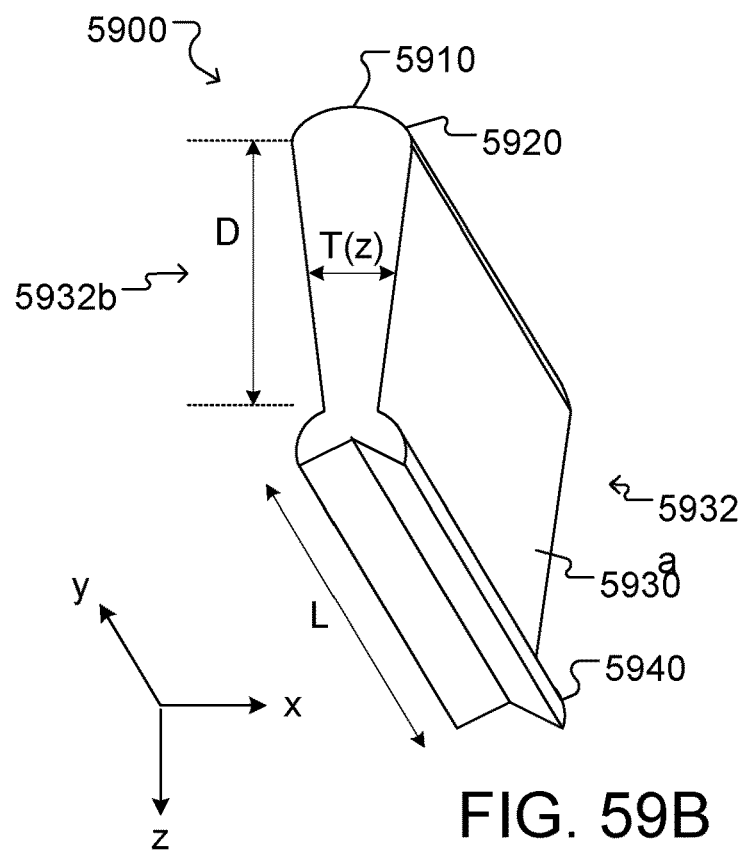

FIGS. 59A-59B show aspects of a light guide module 5900 that includes a tapered light guide 5930. Here, the tapered light guide 5930 is configured to leak a desired amount of light through its side surfaces 5932a and 5932b. In this example, the light guide module 5900 also includes LEEs 5910, one or more corresponding couplers 5920 and an optical extractor 5940. In the example illustrated in FIG. 59B, the light guide module 5900 has an elongated configuration, e.g., with a longitudinal dimension L along the y-axis, perpendicular to the page. In this case, L can be 1', 2' or 4', for instance. In other implementations, the light guide module 5900 can have another elongated configuration, as illustrated in FIGS. 2E-2F. In some other implementations, the light guide module 5900 can have a non-elongated configuration, e.g., with rotational symmetry around the z-axis, as illustrated in FIG. 2D.

The tapered light guide 5930 can be obtained by shaping the side surfaces 5932a and 5932b of the light guide 5930 described above in connection with FIG. 58A and arranging them with respect to each other as shown in FIG. 59A. Here, the light guide 5930 has a length D along the z-axis, e.g., D=10, 20, 50 cm, from a receiving end to an opposing end.

A thickness T(z) of the light guide 5930 along the x-axis is a function of distance from the receiving end, such that the thickness T(z=0) of the light guide at the receiving end, at z=0, is larger than the thickness T(z=D) of the light guide at the opposing end, z=D: T(D)>T(0). For example, T(0) 10% D or 20% D, and T(D) 5% D. Here, the light guide 5930 is made from a solid, transparent material. Additionally, the side surfaces 5932a, 5932b are optically smooth to allow for the guided light to propagate inside the light guide 5930 through TIR, at least for a distance d<D—from the receiving end, along the z-axis—over which the guided light impinges on the side surfaces 5932a, 5932b at incidence angles that exceed a critical angle $\theta_C$.

In the example implementation shown in FIGS. 59A-59B, a profile of the side surfaces 5932a and 5932b includes respective straight lines. In other implementations, a profile of the side surfaces 5932a and 5932b includes respective parabolic or hyperbolic curves, or other shapes.

Moreover, the optical extractor 5940 has a structure similar to a structure of the extractor 5840 of the light guide module 5800 described above in connection with FIG. 58A.

During operation, the LEEs 5910 emit light within a first angular range relative to the z-axis. The one or more couplers 5920 are configured to receive the light from the LEEs 5910 within the first angular range and provide light within a second angular range to the light guide 5930. The one or more couplers 5920 can be configured to transform the first angular range into the second angular range via total internal reflection, specular reflection or both. Here, the divergence of the second angular range is smaller than the divergence of the first angular range, such that the combination (i) of the second angular range and (ii) a numerical aperture of the light guide 5930 is chosen to allow for the light received from the one or more couplers 5920 at the receiving end of the light guide 5930 to propagate at least over a distance d<D of the light guide 5930, for example, via TIR.

Figure 59C:
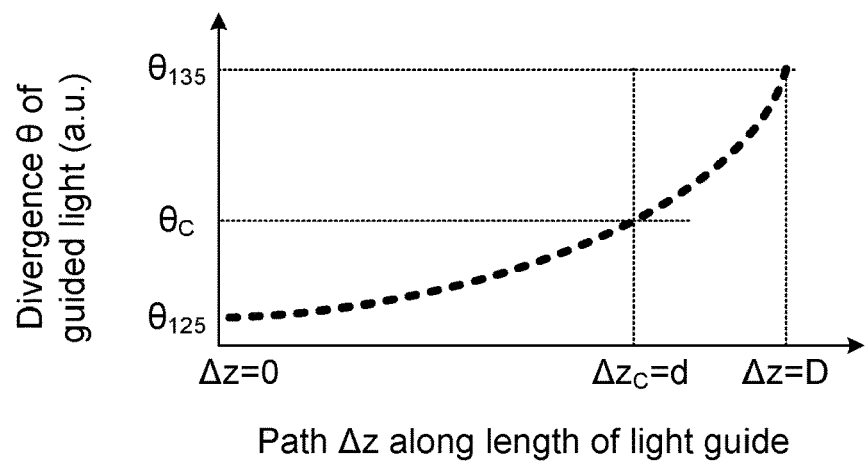

As the thickness T(z) of the light guide 5930 along the x-axis decreases as a function of distance from the receiving end, the guided light impinges on the side surfaces 5932a, 5932b of the light guide 5930 at successively larger incident angles for successive bounces off the side surfaces 5932a, 5932b, or equivalently, divergence of an angular range of the guided light increases along the length D of the light guide 5930 as shown in FIG. 59C. Here, the divergence of the guided light increases from a divergence of the second angular range of light received from the one or more couplers 5920 at the receiving end to a divergence of a third angular range provided by the light guide 5930 at the opposing end. When, at z=d, a divergence of the angular range of the guided light exceeds a critical value $\theta_C$, a fraction of the guided light is transmitted (leaks) through the side surfaces 5932a and 5932b as sideways leaked light in leaked angular ranges 155' and 155", respectively. Referring to FIG. 59A, a direction of propagation of light in the first leaked angular range 155' has a component in the forward direction (parallel with the z-axis) and another component parallel with the x-axis. Further, a direction of propagation of light in the second leaked angular range 155" has a component in the forward direction (parallel with the z-axis) and another component antiparallel with the x-axis.

Moreover, the remaining guided light is provided at the opposing end of the light guide 5930 in the angular range to the optical extractor 5940. Here, the optical extractor 5940 is arranged and configured to output light in first and second output angular ranges 145' and 145". In this example, a direction of propagation of light in the first output angular range 145' has a component in the backward direction (antiparallel with the z-axis) and another component to the left of the light guide 5930 (parallel with the x-axis). Referring to FIG. 59A, a direction of propagation of light in the second output angular range 145" has a component in the backward direction (antiparallel with the z-axis) and another component antiparallel with the x-axis.

Figure 59D:
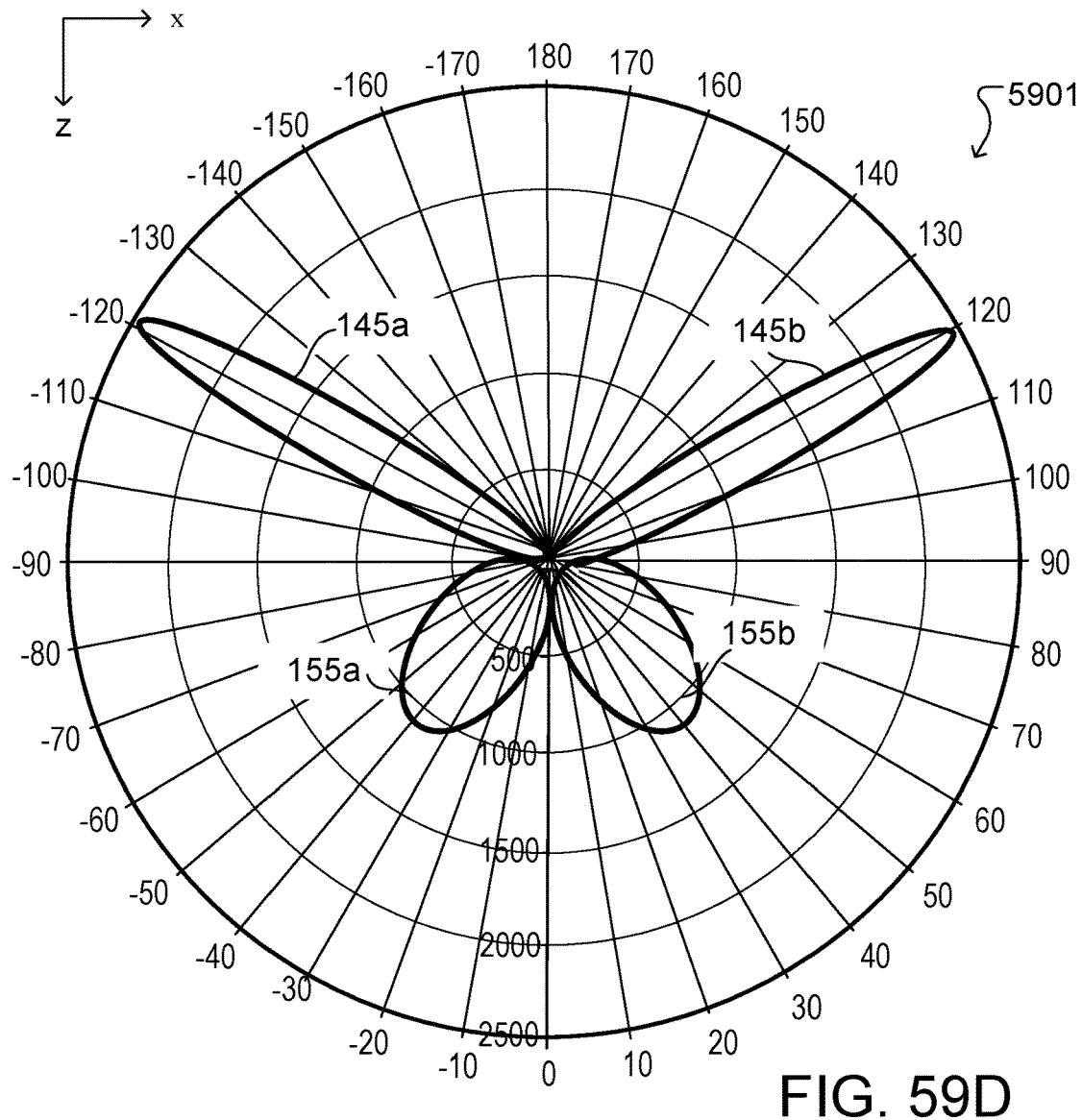

FIG. 59D shows a far-field intensity distribution 5901 of light output by the light guide module 5900 in the x-z cross-section. Here, the light guide module 5900 is equipped with the tapered light guide 5930. Output lobe 145a corresponds to light output by the optical extractor 5940 in the first output angular range 145', and output lobe 145b corresponds to light output by the optical extractor 5940 in the second output angular range 145". Leaked lobe 155a corresponds to light leaked by the light guide 5930 through a first side surface 5932a in the first leaked angular range 155', and leaked lobe 155b corresponds to light leaked by the light guide 5930 through a second, opposing side surface 5932b in the second leaked angular range 155".

The orientation of the output lobes 145a and 145b (e.g., with respect to the z-axis) and a shape of thereof (e.g., aspect ratios of the output lobes 145a and 145b) depends on (i) geometry of redirecting surfaces and output surfaces of the optical extractor 5940 and (ii) a divergence of the third angular range of the light provided by the light guide 5930 to the optical extractor 5940. In turn, the divergence of the third angular range depends on (i) collimating characteristics of the one or more optical couplers 5920, (ii) shape and relative arrangement of the side surfaces 5932a, 5932b of the light guide 5930, and (iii) length along the z-axis of the light guide 5930.

Additionally, a ratio of an amount of light in the combination of first 145a and second 145b output lobes and in the combination of first 155a and second 155b leaked lobes is controlled by a ratio d/D of (i) a distance "d" from the receiving end of the light guide 5930 starting where a divergence of the guided light exceeds the critical angle $\theta_C$ and (ii) the length D of the light guide 5930. For example, for a ratio d/D 80%, 40% of light received by the extractor 5940 can be output in the output angular range 145' corresponding to the first output lobe 145a and 40% of light received by the extractor 5940 can be output in the output angular range 145" corresponding to the second output lobe 145b. Additionally, 10% of guided light can be output in the first leaked angular range 155' corresponding to the first leaked lobe 155a, and 10% of guided light can be output in the first leaked angular range 155' corresponding to the first leaked lobe 155a.

In summary, the light guide module 5900 utilizes at least a portion of the light guide 5930 (e.g., the length D-d of the light guide) that feeds the optical extractor 5940 for part of the light guide module 5900's light emission properties. As is shown in FIGS. 59A-59B a coupler 5920 and LEEs 5910 are in optical communication with a light guide 5930 that is tapered over at least a portion of its elongated extent (along the z-axis.) The second angular range of light introduced into the light guide 5930 may be fairly narrow and well within the requirements for substantially all light to be totally internally reflected within the light guide 5930 if the side walls were parallel (as described above in connection with FIG. 58A.) However, as the walls of the light guide 5930 are tapered down in the dominant direction of the introduced light (e.g., along the z-axis), each subsequent reflection on the side surfaces 5932a, 5932b will be gradually turned closer and closer to the critical angle such that light will eventually be allowed to escape the side surfaces 5932a, 5932b of the solid light guide 5930. Such tapering of the light guide 5930 could be useful for applications where it may be desirable to create an element of luminance from the side of the light guide 5930. Furthermore, the use of holographic films or other prescribed optical sheet materials may provide additional steering or beam shaping of the light leaked through the sides 5932a, 5932b of light guide 5930.

Based on a dependence (shown in FIG. 59C) of the divergence of the guided light as a function of distance travelled in the light guide 5930 from the receiving end, at a certain length d it is possible to see a useful amount of light exiting (leaking) through the side walls 5932a, 5932b of the light guide 5930. The amount of sideways leaked light, relative to the incident amount of guided light, gradually increases the further through the light guide 5930 the light has traveled. This may provide a subtly changing emission from the light guide 5930 that satisfies certain valuable lighting functions such as fill light near the ceiling or wall, or satisfies certain aesthetic requirements for some degree of "glow" emanating from the light guide module 5900 to balance light intensity in the field of view. As the guided light reaches the end of the light guide 5930 and enters the optical extractor 5940, it will also enter at a wider angular range relative to the entry angular range, such that emission from the optical extractor 5940 may be more dispersed than if the side walls of the light guide 5930 were parallel (like in the light guide module 5800 described above in connection with FIG. 58A.) This wider angular range may also be desirable for certain lighting applications where surface luminance requirements are not as problematic such as in non-direct view lighting applications, e.g., architectural coves.

Above, the light guide module 5800 was modified to obtain the light guide module 5900 that leaks light through side surfaces 5932a, 5932b of its light guide 5930. Here, the modification represents tapering the light guide 5830 of the light guide module 5800 to obtain a tapered light guide 5930. In embodiments described below, other modifications of the light guide module 5800 are described to obtain light guide modules that leak light through side surfaces of their light guide.

Figure 60A:
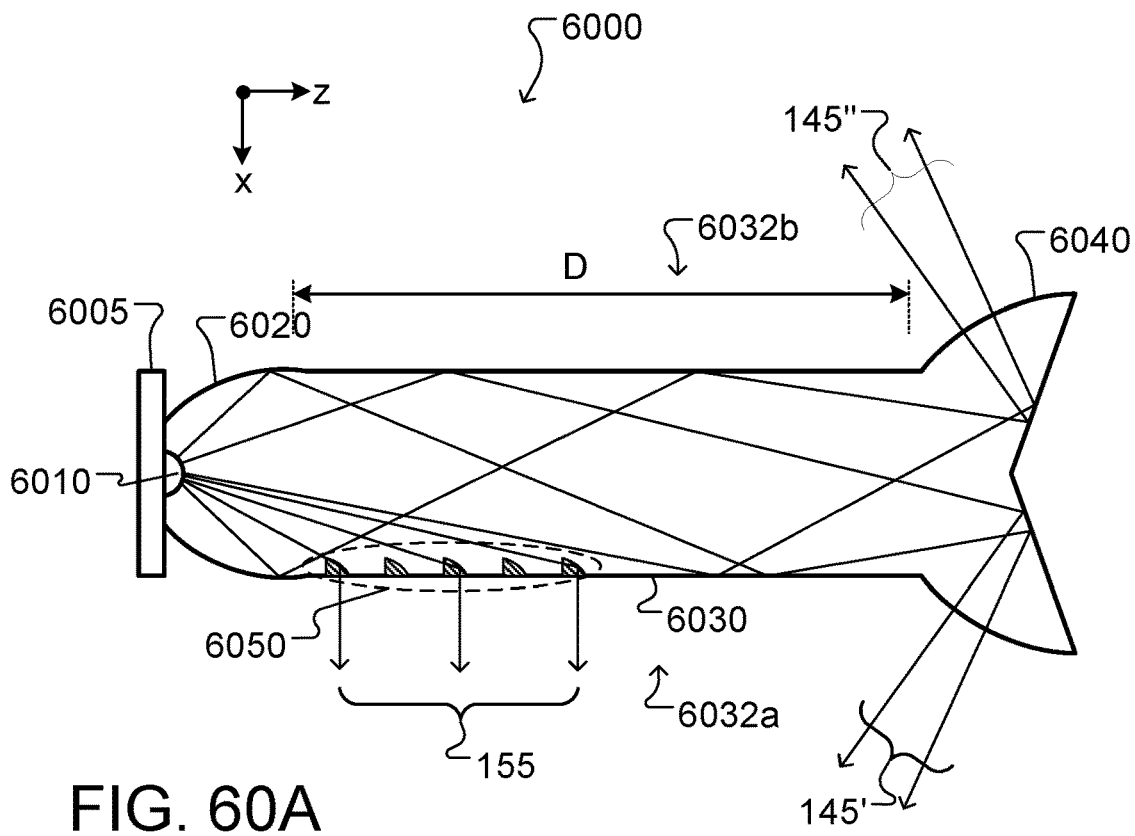
FIGS. 60A-60C show aspects of another example of a light guide module having components similar to the components used in the light engines and the optical systems of the luminaires described herein.
Figure 60B:
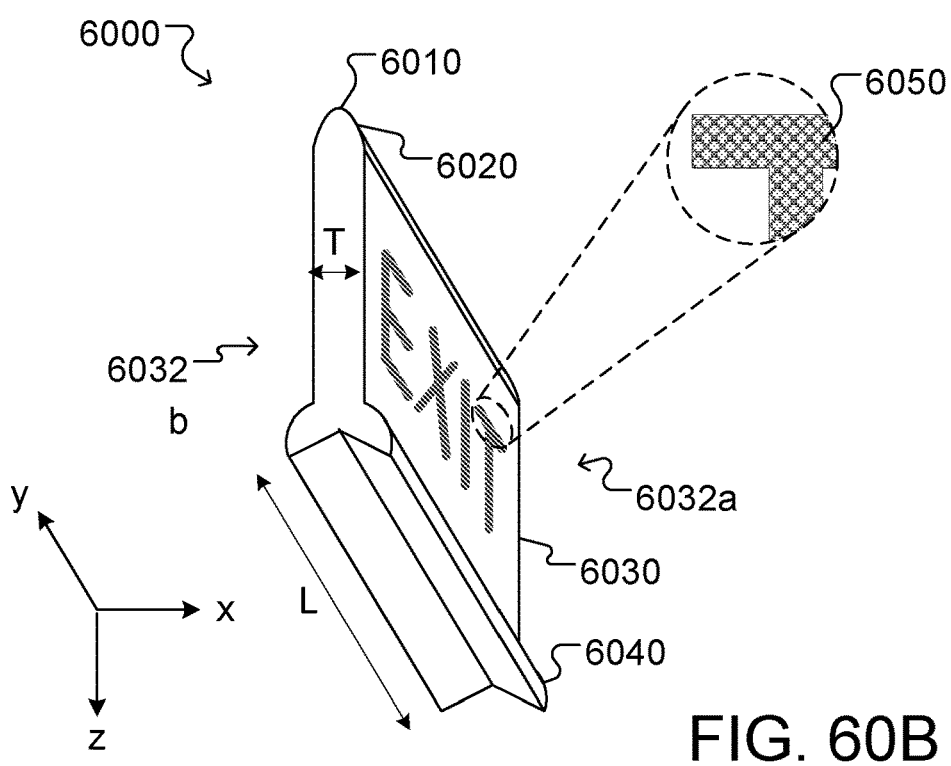
Figure 60C:
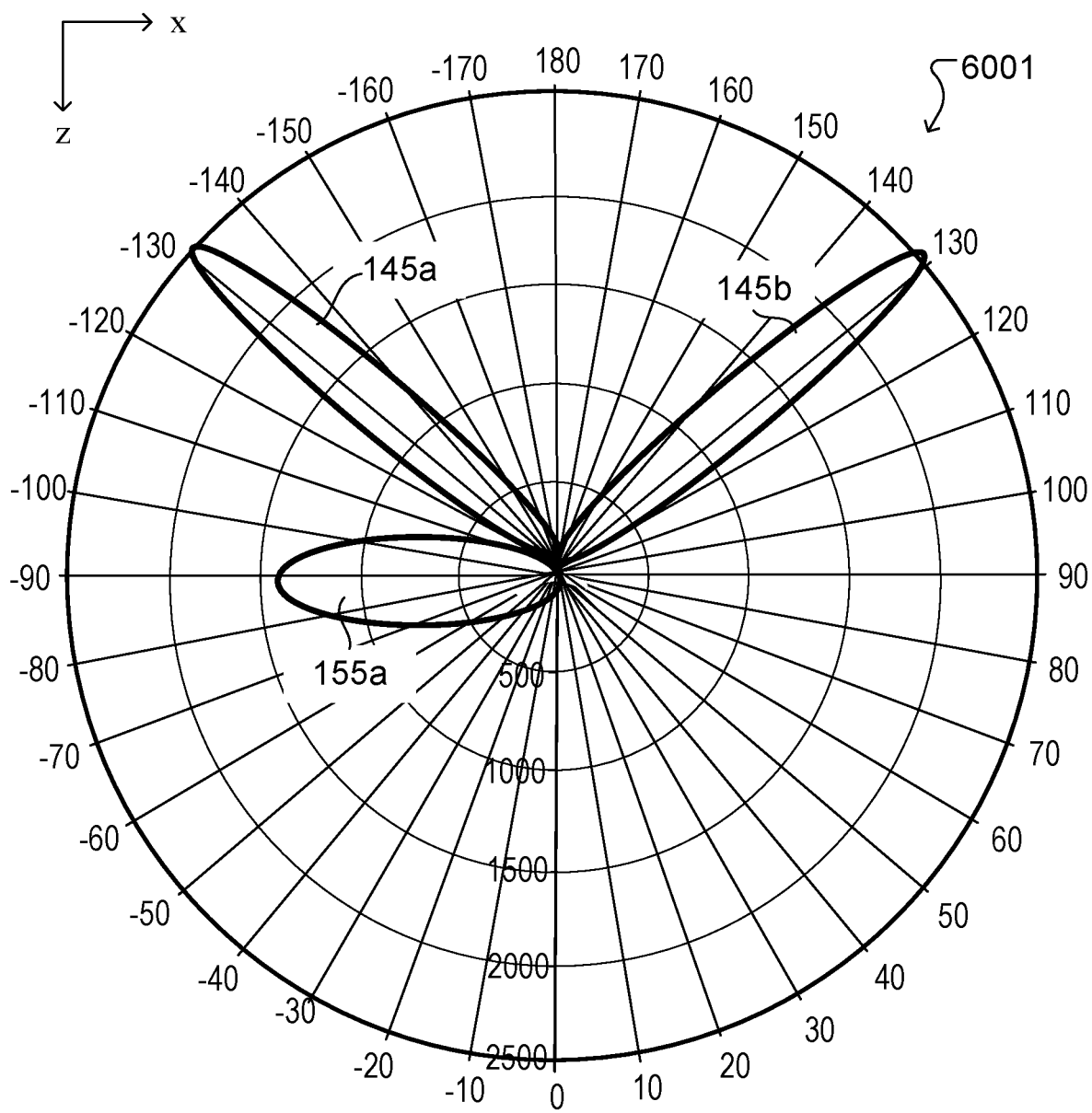

FIGS. 60A-60C show aspects of a light guide module 6000 that includes a light guide 6030 with surface treatment 6050 that covers a portion of a first side surface 6032a of the light guide 6030, a portion of an opposing, second side surface 6032b of the light guide 6030, or portions of both side surfaces 6032a, 6032b. In this example, the light guide module 6000 also includes LEEs 6010, one or more corresponding couplers 6020 and an optical extractor 6040. In the example illustrated in FIG. 60B, the light guide module 6000 has an elongated configuration, e.g., with a longitudinal dimension L along the y-axis, perpendicular to the page. In this case, L can be 1', 2' or 4', for instance. In other implementations, the light guide module 6000 can have other elongated configuration, as illustrated in FIGS. 58D-58E. In some other implementations, the light guide module 6000 can have a non-elongated configuration, e.g., with rotational symmetry around the z-axis, as illustrated in FIG. 58E.

In some implementations, different types of surface treatment 6050 including embossed, cast and molded inclusions or facets can be integrated over regions of the side(s) 5832a (5832b) of the light guide 5830 described above in connection with FIGS. 58A-58E to obtain the light guide 6030 with partial surface treatment 6050. In some implementations, frustrated total internal reflection coatings and other types of holographically reproduced surfaces with details down to the micron level can be overlaid over regions of the side(s) 5832a (5832b) of the light guide 5830 described above in connection with FIGS. 58A-58E to obtain the light guide 6030 with partial surface treatment 6050. In either case, features of the surface treatment 6050 are configured to create prescribed side emission patterns. The region(s) of the side surface 6032a (or 6032b) configured with the surface treatment 6050 cover a fraction, e.g., 5%, 10%, 20% or 50%, of an area of the side surface 6032a (or 6032b). Further, the region(s) of the side surface 6032a (or 6032b) configured with the surface treatment 6050 is located at a desired location on the side surface 6032a (or 6032b) with respect to the receiving end or the opposing end. Furthermore, the region(s) of the side surface 6032a (or 6032b) configured with the surface treatment 6050 can be contiguous or discontinuous, and can have a shape that is polygonal, oval, etc. In the example illustrated in FIG. 60B, the region(s) of the side surface 6032a (or 6032b) configured with the surface treatment 6050 represent signage on the side surface 6032a (or 6032b) of the light guide 6030 of the light guide module 6000.

The light guide 6030 has a length D>0 along the z-axis, e.g., D=10, 20, 50 cm, from a receiving end to an opposing end. A thickness T of the light guide 6030 along the x-axis can be much smaller than the length D along the z-axis, e.g., T 5% D, 10% D or 20% D. The light guide 6030 is made from a solid, transparent material. Here, the side surfaces 6032a, 6032b are optically smooth (outside of the region(s) configured with the surface treatment 6050) to allow for the guided light to propagate inside the light guide 6030 through TIR.

Moreover, the optical extractor 6040 has a structure similar to a structure of the extractor 5840 of the light guide module 5800 described above in connection with FIG. 58A.

During operation, the LEEs 6010 emit light within a first angular range relative to the z-axis. The one or more couplers 6020 are configured to receive the light from the LEEs 6010 within the first angular range and provide light within a second angular range to the light guide 6030. The one or more couplers 6020 can be configured to transform the first angular range into the second angular range via total internal reflection, specular reflection or both. Here, the divergence of the second angular range is smaller than the divergence of the first angular range, such that the combination (i) of the second angular range and (ii) a numerical aperture of the light guide 6030 is chosen to allow for the light received from the one or more couplers 6020 at the receiving end of the light guide 6030 to propagate to the opposing end of the light guide 6030, for example, via TIR.

A fraction of the guided light that impinges on the region(s) of the side surface 6032a of the light guide 6030 configured with the surface treatment 6050 is transmitted (leaks) through the region of the side surface 6032a as sideways leaked light in a leaked angular range 6055. In this example, a direction of propagation of light in the leaked angular range 6055 is to the left of the light guide 6030 (parallel with the x-axis). In another example (not illustrated in FIG. 60A), the direction of propagation of light in the leaked angular range 6055 has a component in the forward direction (parallel with the z-axis). In yet another example (not illustrated in FIG. 60A), the direction of propagation of light in the leaked angular range 6055 has a component in the backward direction (antiparallel with the z-axis).

Moreover, the remaining light received by the light guide 6030 at the receiving end from the one or more couplers 6020 in the second angular range is guided forward (along the z-axis) by the light guide 6030 from its receiving end to its opposing end. At the opposing end, the forward guided light has a third angular range. In some implementations, the third angular range is substantially the same as the second angular range. At the opposing end, the optical extractor 6040 is arranged and configured to output light in first and second output angular ranges 145' and 145". In this example, a direction of propagation of light in the first output angular range 145' has a component in the backward direction (antiparallel with the z-axis) and another component to the left of the light guide 6030 (parallel with the x-axis). Further, a direction of propagation of light in the second output angular range 145" has a component in the backward direction (antiparallel with the z-axis) and another component to the right of the light guide 6030 (antiparallel with the x-axis).

FIG. 60C shows a far-field intensity distribution 6001 of light output by the light guide module 6000 in the x-z cross-section. Here, the light guide module 6000 is equipped with the light guide 6030 having one or more regions of the side surface 6032a configured with the surface treatment 6050. Output lobe 145a corresponds to light output by the optical extractor 6040 in the first output angular range 145', and output lobe 145b corresponds to light output by the optical extractor 6040 in the second output angular range 145". Leaked lobe 155a corresponds to light leaked by the light guide 6030 through a first side surface 6032a in the leaked angular range 155.

Orientation of the output lobes 145a and 145b (e.g., with respect to the z-axis) and a shape of thereof (e.g., aspect ratios of the output lobes 145a and 145b) depends on (i) geometry of redirecting surfaces and output surfaces of the optical extractor 6040 and (ii) a divergence of the third angular range of the light provided by the light guide 6030 to the optical extractor 6040. In turn, the divergence of the third angular range depends on (i) collimating characteristics of the one or more optical couplers 6020.

Additionally, a ratio of an amount of light in the combination of first 145a and second 145b output lobes relative to leaked lobe 155a can be controlled by a ratio a/A of (i) an area "a" of the region(s) of the side surface 6032a configured with the surface treatment 6050 and (ii) an area "A" of the side surface 6032a. For example, for a ratio a/A≈20%, 40% of light received by the extractor 6040 can be output in the output angular range 145' corresponding to the first output lobe 145a and 40% of light received by the extractor 6040 can be output in the output angular range 145" corresponding to the second output lobe 145b. Additionally, 20% of guided light can be output in the leaked angular range 155 corresponding to the leaked lobe 155a.

In summary, the light guide module 6000 utilizes surface treatment 6050—which includes optical inclusions or patterns that are molded into the light guide 6030—to create specific side emission profiles from one, or both, sides 6032a, 6032b of the light guide 6030. This approach provides a directly controllable emission pattern from a side surface 6032a (or 6032b) of the light guide 6030 that can be combined with the primary lighting functionality provided by the optical extractor 6040 located at a distal end of the light guide 6030. Emission patterns caused by the surface treatment 6050 can then be combined with other functional patterns caused by the optical extractor 6040 to create a highly structured surface luminance profile for the light guide module 6000. These luminance mappings of the surfaces of the light guide module 6000 are important since it is possible to create highly structured luminous bodies unlike any other light source technology currently in existence.

The light engines and optical systems used in the luminaires described in this application can be implemented in manners similar to the other light engines and other optical systems of the following light guide modules.

Figure 61A:
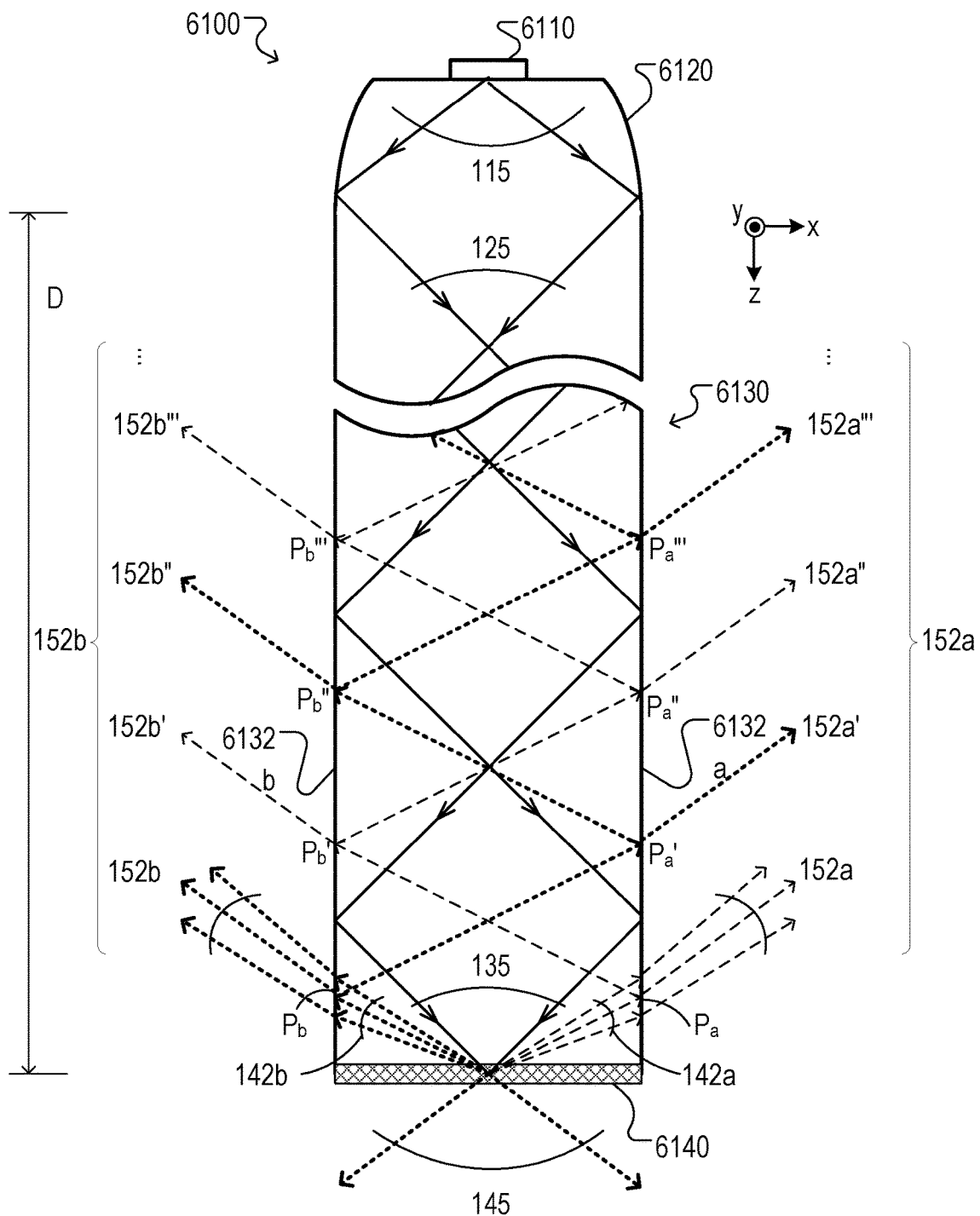
FIGS. 61A-61C show aspects of another example of a light guide module having components similar to the components used in the light engines and the optical systems of the luminaires described herein.
Figure 61B:
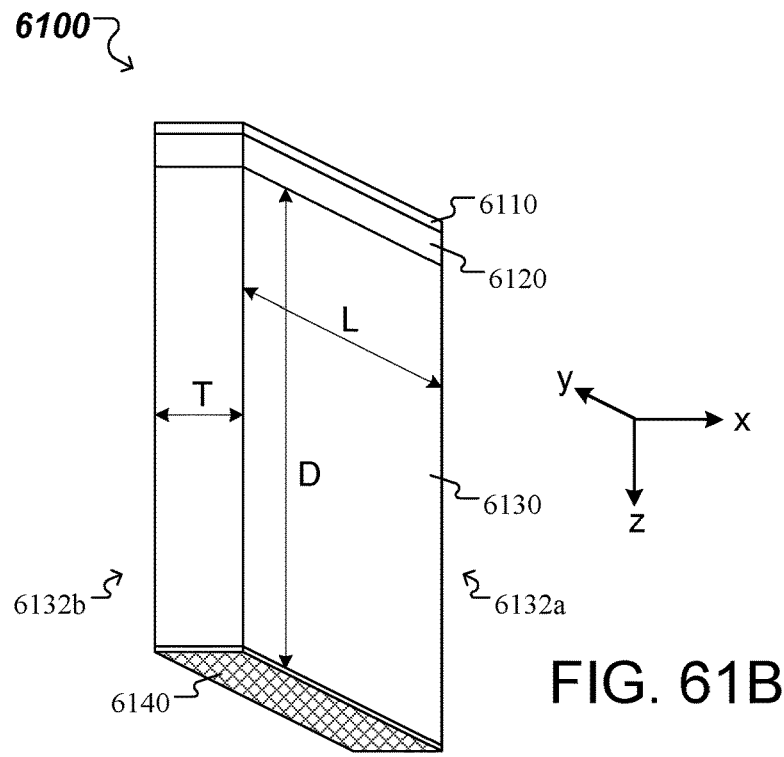

FIG. 61A illustrates a schematic x-z sectional view of a solid-state light guide module 6100 that includes a light guide 6130 with a redirecting end-face 6140. In this example, the light guide module 6100 also includes one or more LEEs 6110 and corresponding one or more couplers 6120. In some implementations, the light guide module 6100 has an elongated configuration, e.g., with a longitudinal dimension L along the y-axis, perpendicular to the page, as illustrated in FIG. 61B. In this case, L can be 1', 2' or 4', for instance. In other implementations, the light guide module 6100 has another elongated configuration, e.g., light guide module 6100' illustrated in FIG. 63.

The light guide 6130 has a finite length, D>0 along the z-axis, e.g., D=10, 20, 50 cm, from a receiving end to an opposing end. A thickness "T" of the light guide 6130 along the x-axis can be much smaller than the length D along the z-axis, e.g., T 5% D, 10% D or 20% D. The light guide 6130 is made from a solid, transparent material. Here, light guide side surfaces 6132a, 6132b are optically smooth to allow for the guided light to propagate inside the light guide 6130 through TIR.

Moreover, the light guide 6130 has a redirecting end-face 6140 at the opposing end. The redirecting end-face 6140 of the light guide reflects at least some of the guided light—that reaches the opposite end—back into the light guide 6130 as return light. The redirecting end-face 6140 is configured to generate return light that can transmit at least in part through the light guide side surfaces 6132a and/or 6132b. Furthermore, the light guide 6130 is configured to allow multiple bounces of return light off of the light guide side surfaces 6132a, 6132b, with at least some transmission at one or more bounces. In some implementations, the guided light that reaches the opposite end of the light guide and is not reflected back into the light guide 6130 as return light is transmitted through the redirecting end-face 6140 in the forward direction (e.g., along the z-axis.) For example, reflectivity of a coating applied on the redirecting end-face 6140 determines relative intensities of return light and the light transmitted through the redirecting end-face 6140 in the forward direction. As another example, a density of apertures in the redirecting end-face 6140 determines relative intensities of the return light and the light transmitted through the redirecting end-face 6140 in the forward direction.

The redirecting end-face 6140 has a macro-, meso- and/or microscopic surface structure configured such that the return light propagates backwards through the light guide 6130 only along rays that impinge on the light guide side surfaces 6132a, 6132b at angles smaller than a critical incident angle. In this manner, TIR is avoided for the return light at the light guide side surfaces 6132a, 6132b. As such, the return light can transmit through the light guide side surfaces 6132a, 6132b at each of the multiple bounces thereof, except for about 4% Fresnel reflection at each of the bounces. Moreover, although light received by the light guide 6130 from the one or more couplers 6120 is guided forward to the opposing end within a TIR solid angle, the light guide 6130 is configured to output as much of the return light through light guide side surfaces 6132a and/or 6132b. Little or none of the return light is guided by the light guide 6130 from the opposing end back to the receiving end. Examples of surface structures of the redirecting end-face 6140 that cause the return light to propagate through the light guide 6130 and transmit through the side surfaces 6132a and/or 6132b are described in U.S. Patent Application Publications No. 2017/0010401, which is incorporated by reference in its entirety. In some implementations, an asymmetry of the output light in angular ranges 152a and 152b may be the result of asymmetric shapes of the surfaces 132a and 132b, asymmetry in the end face 6140 and/or a reflective coating (not illustrated) on one of the surfaces 132a and 132b, for example.

During operation, the LEEs 6110 provide light within a first angular range 115 relative to the z-axis. The one or more couplers 6120 are configured to receive the light from the LEEs 6110 within the first angular range 115 and provide light within a second angular range 125 to the light guide 6130. The one or more couplers 6120 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 6130 is chosen to allow for the light received from the one or more couplers 6120 at the receiving end of the light guide 6130 to propagate to the opposing end of the light guide 6130, for example, via TIR.

In this manner, light received by the light guide 6130 at the receiving end from the one or more couplers 6120 in the second angular range 125 is guided forward (along the z-axis) by the light guide 6130 from its receiving end to its opposing end. At the opposing end, the forward guided light has a third angular range 135. In some implementations, the third angular range 135 is substantially the same as the second angular range 125. Further at the opposing end, the forward guided light impinges on the redirecting end-face 6140 where at least a portion of it is reflected back into the light guide 6130 as return light.

The surface structure of the redirecting end-face 6140 is configured to cause the return light to propagate only in return angular range 142a or 142b, or both. Here, substantially all return light within each of the return angular ranges 142a and 142b propagates only along rays that impinge on the respective light guide side surfaces 6132a and 6132b at angles smaller than a critical incident angle. In this manner, the return light in return angular ranges 142a, 142b can transmit through the light guide side surfaces 6132a and 6132b as output light of the light guide module 6100 in first and second output angular ranges 152a, 152b. Notably, the surface structure of the redirecting end-face 6140 may need to be configured such that no return light propagates within an angular range that is an inverse of the third angular range 135, because such return light may be guided back towards the receiving end via TIR, and then not contribute to the output light of the light guide module 6100 and cause other effects.

Moreover, a fraction of the forward guided light that impinges on the redirecting end-face 6140 and is not reflected back into the light guide 6130 as return light is transmitted through the redirecting end-face 6140 in the forward direction (e.g., along the z-axis) as output light in a third output angular range 145. In some implementations, e.g., in cases when the redirecting end-face 6140 includes apertures or transparent portions of coating, the third output angular range 145 is substantially the same as the third angular range 135 of the guided light that reaches the opposing end of the light guide 6130.

In embodiments of the redirecting end-face 6140 with surface structure that causes the return light to propagate in both return angular ranges 142a and 142b, the surface structure includes one or more symmetric v-grooves or a symmetric sawtooth pattern. Here, walls of the symmetric sawtooth pattern can be planar or curved.

Referring now to FIG. 61A, return light generated by reflection off such a redirecting end-face 6140 in the first return angular range 142a impinges on the light guide side surface 6132a at point Pa and (most of it, e.g., about 96%) transmits through the light guide side surface 6132a as output light in a first instance of first side angular range 152a. A prevalent propagation direction within the first instance of the first side angular range 152a can be (i) orthogonal to the light guide side surface 6132a when a prevalent propagation direction within the first return angular range 142*a* is normal to the light guide side surface 6132*a*; (ii) along the light guide side surface 6132*a* (antiparallel to the z-axis) when the prevalent propagation direction within the first return angular range 142*a* is along a ray that impinges on the light guide side surface 6132*a* at critical angle incidence; and (iii) anywhere in-between normal on the light guide side surface 6132*a* (perpendicular to the z-axis) and parallel to the light guide side surface 6132*a* (antiparallel to the z-axis) when the prevalent propagation direction within the first return angular range 142*a* is along a ray that impinges on the light guide side surface 6132*a* between normal and critical angle incidence.

Return light generated by reflection off the redirecting end-face 6140 in the second return angular range 142*b* impinges on the light guide side surface 6132*b* at point Pb and (most of it, e.g., about 96%) transmits through the light guide side surface 6132*b* as output light in a first instance of second side angular range 152*b*. A prevalent propagation direction within the first instance of the second side angular range 152*b* can be (i) orthogonal to the light guide side surface 6132*b* when a prevalent propagation direction within the second return angular range 142*b* is normal to the light guide side surface 6132*b*; (ii) along the light guide side surface 6132*b* (antiparallel to the z-axis) when the prevalent propagation direction within the second return angular range 142*b* is along a ray that impinges on the light guide side surface 6132*b* at critical angle incidence; and (iii) anywhere in-between normal on the light guide side surface 6132*b* (perpendicular to the z-axis) and parallel to the light guide side surface 6132*b* (antiparallel to the z-axis) when the prevalent propagation direction within the second return angular range 142*b* is along a ray that impinges on the light guide side surface 6132*b* between normal and critical angle incidence.

Further, a fraction (e.g., about 4%) of the return light in the first return angular range 142*a* that impinges on the light guide side surface 6132*a* at point Pa reflects (e.g., through Fresnel reflection) off of it and propagates towards the opposing light guide side surface 6132*b*. Here, most of the return light (e.g., about 96%) impinging on the light guide side surface 6132*b* at point Pb' transmits through it as output light in a second instance of the second side angular range 152*b*'. A prevalent propagation direction within the second instance of the second side angular range 152*b*' has mirror symmetry relative the z-axis to the prevalent propagation direction within the first instance of the first side angular range 152*a* and a divergence of the second instance of the second side angular range 152*b*' is about the same as the divergence of the first instance of the first side angular range 152*a*. A fraction (e.g., about 4%) of the return light in the second return angular range 142*b* that impinges on the light guide side surface 6132*b* at point Pb reflects (e.g., through Fresnel reflection) off of it and propagates towards the opposing light guide side surface 6132*a*. Here, most of the return light (e.g., about 96%) impinging on the light guide side surface 6132*a* at point Pa' transmits through it as output light in a second instance of the first side angular range 152*a*'. A prevalent propagation direction within the second instance of the first side angular range 152*a*' has mirror symmetry relative the z-axis to the prevalent propagation direction within the first instance of the second side angular range 152*b*. And a divergence of the second instance of the first side angular range 152*a*' is about the same as the divergence of the first instance of the second side angular range 152*b*.

Furthermore, a fraction (e.g., about 4%) of the return light that impinges on the light guide side surface 6132*a* at point Pa' reflects (e.g., through Fresnel reflection) off of it and propagates towards the opposing light guide side surface 6132*b*. Here, most of the return light (e.g., about 96%) impinging on the light guide side surface 6132*b* at point Pb'' transmits through it as output light in a third instance of the second side angular range 152*b*''. A prevalent propagation direction within the third instance of the second side angular range 152*b*'' is parallel to the prevalent propagation direction within the first instance of the second side angular range 152*b*. And a divergence of the third instance of the second side angular range 152*b*'' is about the same as the divergence of the first instance of the second side angular range 152*b*. A fraction (e.g., about 4%) of the return light that impinges on the light guide side surface 6132*b* at point Pb' reflects (e.g., through Fresnel reflection) off of it and propagates towards the opposing light guide side surface 6132*a*. Here, most of the return light (e.g., about 96%) impinging on the light guide side surface 6132*a* at point Pa'' transmits through it as output light in a third instance of the first side angular range 152*a*''. A prevalent propagation direction within the third instance of the first side angular range 152*a*'' is parallel to the prevalent propagation direction within the first instance of the first side angular range 152*a*. And a divergence of the third instance of the first side angular range 152*a*'' is about the same as the divergence of the first instance of the first side angular range 152*a*.

In addition, a fraction (e.g., about 4%) of the return light that impinges on the light guide side surface 6132*a* at point Pa'' reflects (e.g., through Fresnel reflection) off of it and propagates towards the opposing light guide side surface 6132*b*. Here, most of the return light (e.g., about 96%) impinging on the light guide side surface 6132*b* at point Pb''' transmits through it as output light in a fourth instance of the second side angular range 152*b*'''. A prevalent propagation direction within the fourth instance of the second side angular range 152*r* has mirror symmetry relative the z-axis to the prevalent propagation direction within the first instance of the first side angular range 152*a*. And a divergence of the fourth instance of the second side angular range 152*b*''' is about the same as the divergence of the first instance of the first side angular range 152*a*. A fraction (e.g., about 4%) of the return light that impinges on the light guide side surface 6132*b* at point Pb'' reflects (e.g., through Fresnel reflection) off of it and propagates towards the opposing light guide side surface 6132*a*. Here, most of the return light (e.g., about 96%) impinging on the light guide side surface 6132*a* at point Pa'' transmits through it as output light in a fourth instance of the first side angular range 152*e*. A prevalent propagation direction within the fourth instance of the first side angular range 152*a*''' has mirror symmetry relative the z-axis to the prevalent propagation direction within the first instance of the second side angular range 152*b* and a divergence of the fourth instance of the first side angular range 152*a*''' is about the same as the divergence of the first instance of the second side angular range 152*b*.

Accordingly, additional bounces of the return light off the light guide side surfaces 6132*a* and 6132*b* are progressively weaker in intensity.

In this manner, light output by the light guide module 6100—equipped with anyone a redirecting end-face 6140— through the light guide side surface 6132*a* in a resultant first output angular range 152*a* is a combination of light transmitted through the light guide side surface 6132*a* in the first, second, third, fourth, etc., instances of the first side angular range 152*a*, 152*a*', 152*a*'', 152*a*''', etc. Similarly, light output by this implementation of the light guide module 6100 through the light guide side surface 6132*b* in a resultant second output angular range 152b is a combination of light transmitted through the light guide side surface 6132b in the first, second, third, fourth, etc., instances of the second side angular range 152b, 152b', 152b", 152b"', etc.

Figure 61C:
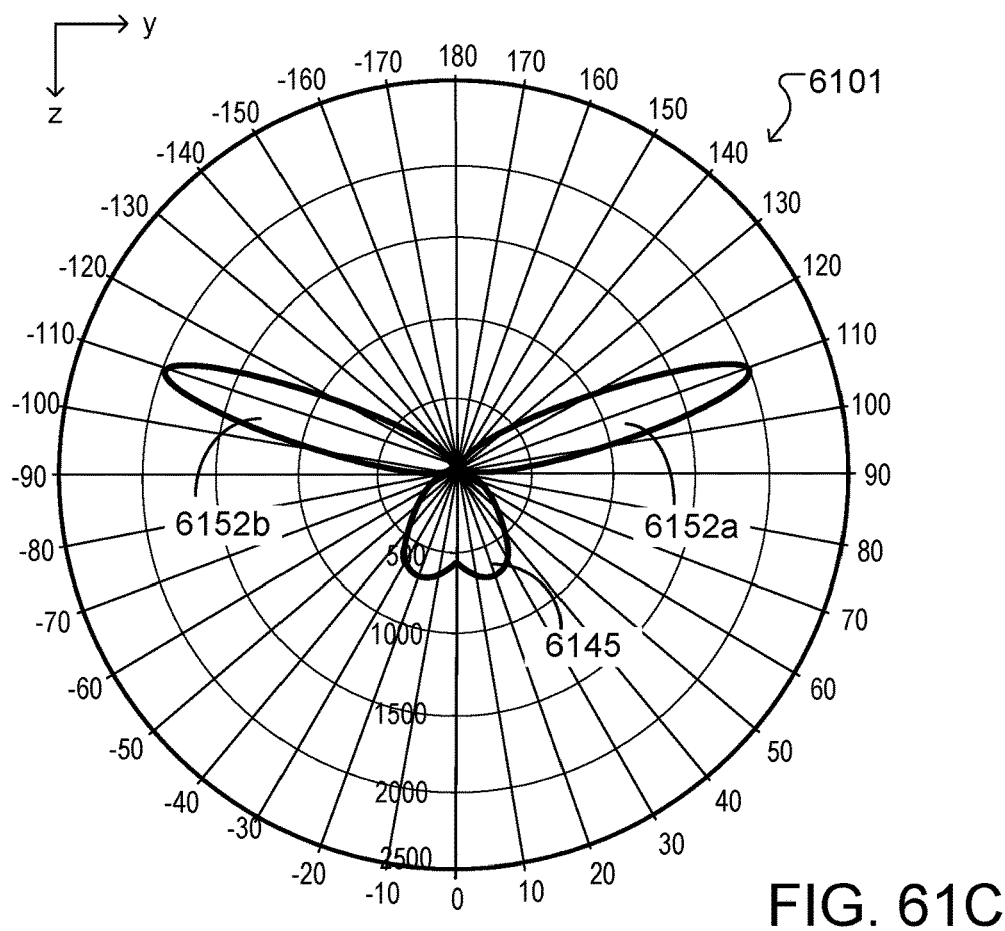

FIG. 61C shows a far-field intensity distribution 6101 of light output by the light guide module 6100 in the x-z cross-section. Here, the light guide module 6100 is equipped with the redirecting end-face 6140, and the redirecting end-face has a coating of semitransparent material or a reflecting coating that has apertures (or semitransparent) portions. Lobe 6152a corresponds to output light transmitted through the light guide side surface 6132a in the first output angular range 152a. Lobe 6152b corresponds to output light transmitted through the light guide side surface 6132b in the second output angular range 152b. Lobe 6145 corresponds to output light transmitted through the redirecting end-face 6140 in the third output angular range 145.

An orientation of the lobe 6152a (e.g., with respect to the z-axis) and a shape of thereof (e.g., aspect ratio of the lobe 6152a) depends mostly (e.g., more than 96%) on respective propagation direction and divergence of the return light in the first return angular range 142a (due to transmissions at points Pa, Pa", etc.), and marginally (e.g., less than 4%) on respective propagation direction and divergence of the return light in the second return angular range 142b (due to transmissions at points Pa', Pa'", etc.) Similarly, an orientation of the lobe 6152b (e.g., with respect to the z-axis) and a shape of thereof (e.g., aspect ratio of the lobe 6152b) depends mostly (e.g., more than 96%) on respective propagation direction and divergence of the return light in the second return angular range 142b (due to transmissions at points Pb, Pb", etc.), and marginally (e.g., less than 4%) on respective propagation direction and divergence of the return light in the first return angular range 142b (due to transmissions at points Pb', Pb'", etc.) As described above, the propagation directions and divergences of the return light in the first and second return angular ranges 142a, 142b depend on the surface structure of various embodiments of the redirecting end-face 6140. An orientation of the lobe 6145 (e.g., with respect to the z-axis) and a shape of thereof (e.g., batwing) depend on (i) collimating characteristics of the one or more couplers 6120, and (ii) guiding characteristics of the light guide 6130. Relative sizes of the lobes 6152a, 6152b and 6145 depend on a combination of (i) reflectance of a coating of the redirecting end-face, and (ii) surface structure of various embodiments of the redirecting end-face 6140.

The light engines and optical systems used in the luminaires described in this application can be implemented in manners similar to the yet other light engines and yet other optical systems of the following light guide modules.

Figure 62A:
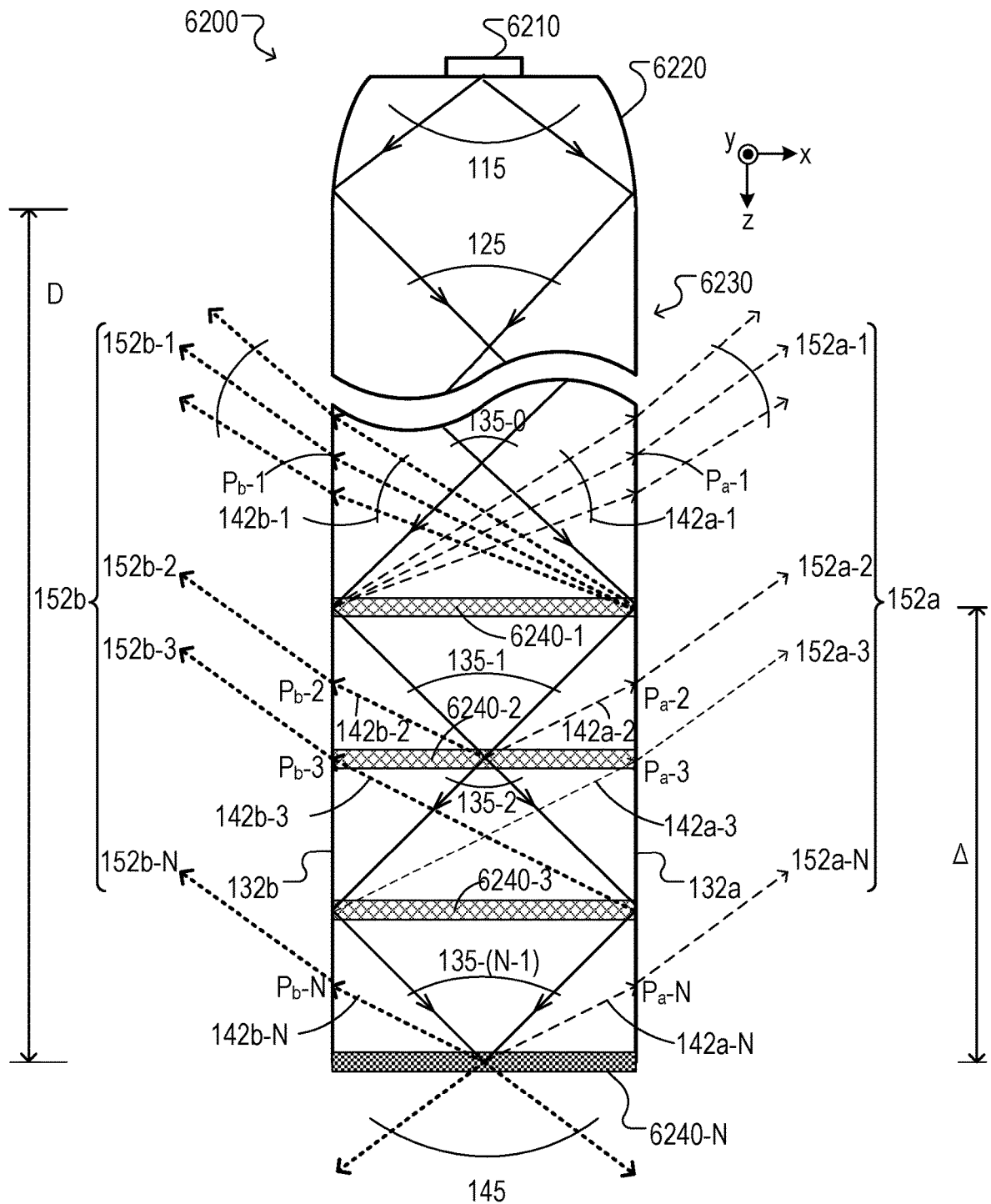
FIGS. 62A-62C show aspects of another example of a light guide module having components similar to the components used in the light engines and the optical systems of the luminaires described herein.

FIG. 62A illustrates a schematic x-z sectional view of a solid-state light guide module 6200 that includes a light guide 6230 with redirecting interfaces 6240-$i$, where i=1 to N, and N≥2. In the example illustrated in FIG. 62A, in addition to the light guide 6230, the light guide module 6200 includes one or more light emitting elements (LEEs) 6210 and one or more couplers 6220. In other cases, the couplers 6220 are excluded and light emitted by the LEEs 6210 is injected directly into the light guide 6230.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example.

A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 6210 provide light within a first angular range 115. Such light can have a Lambertian distribution relative to the optical axes of the one or more LEEs 6210 (e.g., the z-axis of the Cartesian reference system shown in FIG. 62A.)

In the example illustrated in FIG. 62A, the light guide module 6200 includes one or more couplers 6220 to receive the light from the LEEs 6210 within the first angular range 115 and provide light within a second angular range 125 to the receiving end of the light guide 6230. The one or more couplers 6220 are shaped to transform the first angular range 115 into the second angular range 125 via total internal reflection, specular reflection or both. As such, the one or more couplers 6220 can include a solid transparent material for propagating light from an input end to an output end of each of the one or more couplers 6220. Here, the divergence of the second angular range 125 is smaller than the divergence of the first angular range 115, such that all light provided by the couplers 6220 in the angular range 125 can be injected into the light guide 6230 at its receiving end. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 62C.) Also in this context, the term "divergence" refers to a solid angle outside of which the intensity distribution of the propagating light drops below a predefined fraction of a maximum of the intensity distribution.

For example, the divergence associated with the angular range can be the width of the lobe of the intensity distribution. The predefined fraction can be 10%, 5%, 1%, or other values, depending on the lighting application.

The light guide 6230 is made from a solid, transparent material. The light guide 6230 is arranged to receive the light provided by the one or more couplers 6220 at one end of the light guide 6230 and to guide the received light in a forward direction, e.g., along the z-axis, from the receiving end to an opposing end of the light guide 6230. Here, a distance D between the receiving end of the light guide 6230 and its opposing end can be 5, 10, 20, 50 or 100 cm, for instance. A combination of (i) an angular range in which the light is received by the light guide 6230 at the receiving end and (ii) a numerical aperture of the light guide 6230 is configured such that the received light is guided from the receiving end to the opposing end through reflection off of light guide side surfaces 6232a, 6232b of the light guide 6230. Depending on the implementation, at least some, if not all, of this reflection is via total internal reflection (TIR). In some implementations, the numerical aperture of the light guide 6230 is such that all light provided by the LEEs 6210 in the angular range 115 can be injected directly into the light guide 6230 at its receiving end, without the use of the couplers 6220.

One or more of the light guide side surfaces 6232a, 6232b can be planar, curved or otherwise shaped. The light guide side surfaces 6232a, 6232b can be parallel or non-parallel. In embodiments with non-parallel light guide side surfaces 6232a, 6232b, an angular range 135-(N−1) of the guided light at the opposing end of the light guide 6230 is different than the angular range 115 (when the light guide 6230 receives the light directly from the LEEs 6210) or 125 (when the light guide 6230 receives the light from the couplers 6220) of the light received at the receiving end. In embodiments with parallel light guide side surfaces 6232a, 6232b, the angular range 135-(N−1) of the guided light at the opposing end of the light guide 6230 has at least substantially the same divergence as the angular range 115 (when the light guide 6230 receives the light directly from the LEEs 6210) or 125 (when the light guide 6230 receives the light directly from the couplers 6220) of the light received at the receiving end. Here, the light guide side surfaces 6232a, 6232b are optically smooth to allow for the guided light to propagate inside the light guide 6230 through TIR.

Moreover, the light guide 6230 has a plurality of redirecting interfaces 6240-i, where i=1 to N, and N≥2. The last redirecting interface, 6240-N, represents a redirecting end-face 6240-N at the opposing end of the light guide 6230. The redirecting interfaces 6240-i of the light guide 6230 are spaced-apart from each other and distributed along the z-axis over a distance A of the light guide 6230. In some implementations, the distance A over which the redirecting interfaces 6240-i are distributed is a fraction of up to 10% of the distance D from the input end to the opposing end of the light guide 6230. In other implementations, the distance A over which the redirecting interfaces 6240-i are distributed is a fraction of up to 50% of the distance D from the input end to the opposing end of the light guide 6230. In some other implementations, the distance A over which the redirecting interfaces 6240-i are distributed is a fraction of up to 90% of the distance D from the input end to the opposing end of the light guide 6230.

Figure 62B:
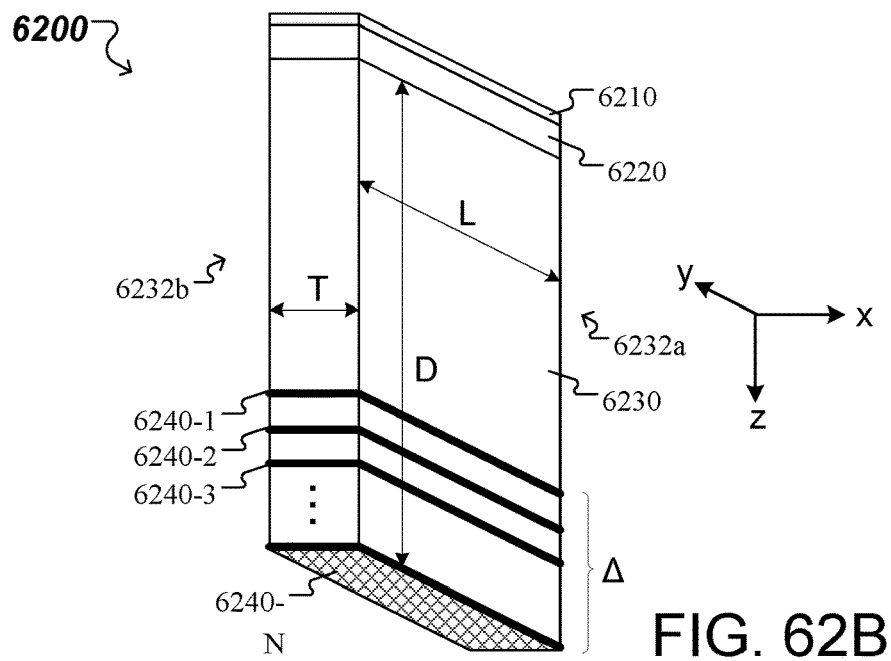

FIG. 62B shows a perspective view of the light guide module 6200—that includes a light guide 6230 with redirecting interfaces 6240-i, i=1 to N—that is elongated along an axis (e.g., y-axis) perpendicular to the forward direction (e.g., along the z-axis.) In this case, a length L of the light guide 6230 along the elongate dimension of the light guide module 6200 can be 2', 4' or 8', for instance. A thickness T of the light guide 6230 orthogonal to the elongated dimension L (e.g., along the x-axis) is chosen to be a fraction of the distance D traveled by the guided light from the receiving end to the opposing end of the light guide 6230. For T=0.05 D, 0.1 D or 0.2 D, for instance, light from multiple, point-like LEEs 6210—distributed along the elongated dimension L—that is edge-coupled into the light guide 6230 at the receiving end can efficiently mix by the time it propagates to the opposing end. In some implementations surfaces 6232a/b of the light guide may have a non-planar shape and/or a non-parallel arrangement to support mixing of light from multiple point-like LEEs 6210.

Figure 63:
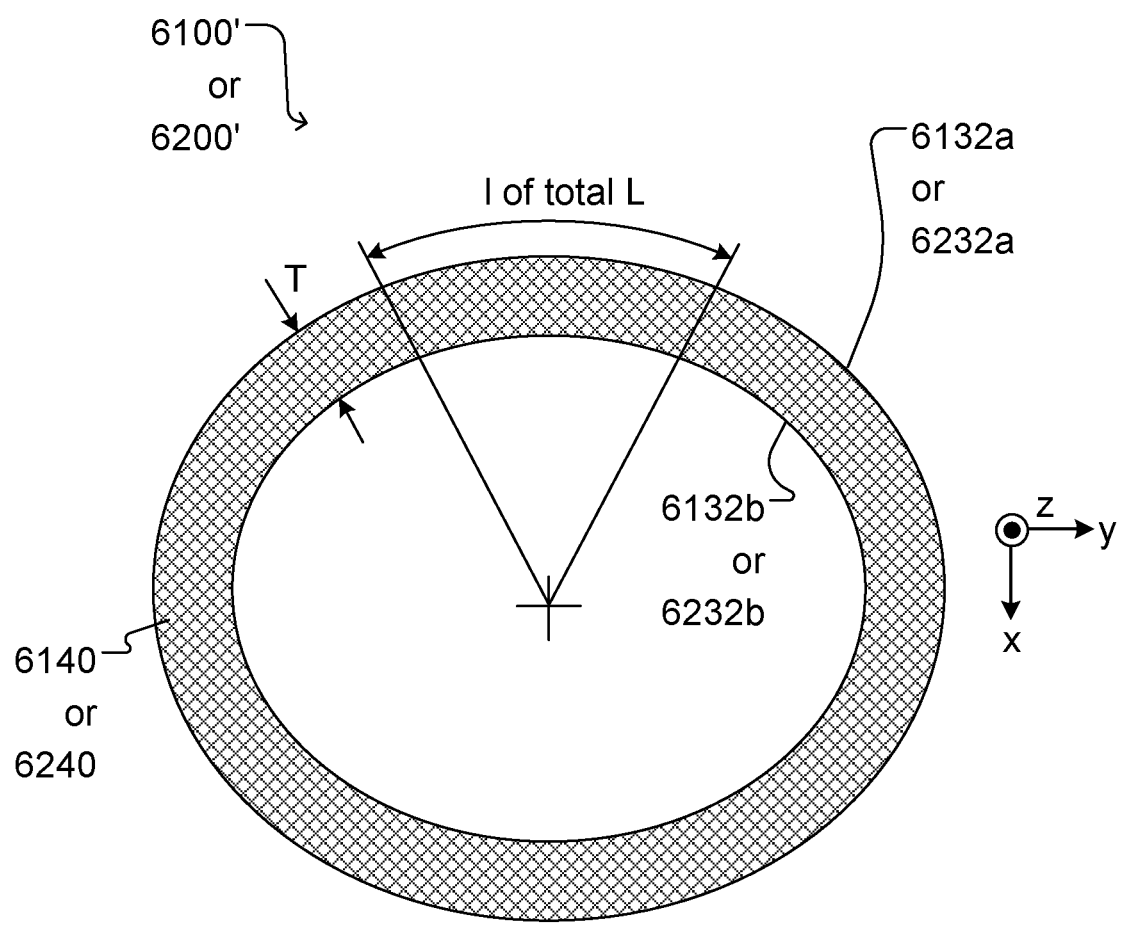
FIG. 63 shows a bottom view of the light guide module of FIGS. 61A-61B and of the light guide module of FIGS. 62A-62B.

FIG. 63 shows an embodiment 6200' of the light guide module—that includes a light guide 6230 with redirecting interfaces 6240-i, i=1 to N—for which the light guide 6230 has two opposing side surfaces 6232a, 6232b that form a cylinder shell of thickness T. In the example illustrated in FIG. 63, the x-y cross-section of the cylinder shell formed by the opposing side surfaces 6232a, 6232b is oval. In other cases, the x-y cross-section of the cylinder shell can be circular or can have other shapes. Some implementations of the example light guide module 6200' may include a specular reflective coating on the side surface 6232b.

In light guide modules 6200, 6200' that include a light guide 6230 with redirecting interfaces 6240-i, where i=1 to N, and multiple point-like LEEs 6210, the distance D through which edge-coupled light propagates through the light guide 6230 in the forward direction (e.g., along the z-axis) may be based on the amount of mixing required to provide desired uniformity of certain aspects of the light output (e.g., in one or more output angular ranges 152a, 152b, 145) by the light guide modules.

Referring again to FIG. 62A, each redirecting interface 6240-i, i=1 to (N−1) of the light guide 6230, except for the redirecting end-face 6240-N, reflects a fraction $R_i$ of the guided light—incident on the redirecting interface 6240-i—backward (along the −z axis) into the light guide, and transmits the remaining fraction $T_i$ of the guided light—incident on the redirecting interface 6240-i—forward (along the +z axis) into the light guide. Here, $R_i+T_i \approx 1$, i=1 to (N−1). Similarly, the redirecting end-face 6240-N reflects a fraction $R_N$ of the guided light—that reaches the opposite end of the light guide—back into the light guide, and transmits the remaining fraction $T_N$ of the guided light—that reaches the opposite end—forward (in the +z direction) outside of the light guide. Here, $R_N+T_N \approx 1$. In some implementations, no light is transmitted through redirecting end-face 6240-N.

The light reflected in the backward direction by each redirecting interface 6240-i, i=1 to N, is referred to as return light. Each redirecting interface 6240-i is configured to generate return light in a first return angular range 142a-i (and optionally a second return angular range 142b-i), i=1 to N, such that, the return light can transmit through the light guide side surfaces 6232a, 6232b. Here, a portion (e.g., more than 95% for a glass/plastic-to-air index mismatch of a light guide side surface interface) of the return light—within the first return angular range 142a-i—will have a first output angular range 152a-i after transmission through the light guide side surface 6232a, and another portion (e.g., more than 95% for the glass/plastic-to-air index mismatch of the light guide side surface interface) of the return light—within the second return angular range 142b-i—will have a second output angular range 152b-i after transmission through the opposing light guide side surface 6232b, where i=1 to N. As prevalent propagation direction of light in each of the first and second output angular ranges 152a-i, 152b-i has a component anti-parallel to the z-axis, the light guide module 6200 outputs light in the backward direction.

Each redirecting interface including the end-face 6240-i, where i=1 to N, can have macro-, meso- and/or microscopic interface/surface structures. Depending on the implementation, one or more redirecting interfaces can be redirecting across portions of their width or across their full width. As such the redirecting interfaces can be contiguous or interrupted by gaps. Gaps may allow light to pass freely without obstruction. The width of gaps can be regular or irregular for different redirecting interfaces or within the same redirecting interface. Gaps in one redirecting interface can be offset, for example in x-direction and/or y-direction, by a portion or all of the corresponding width of gaps in an adjacent redirecting interface. Examples of surface structures of the redirecting interfaces 6240-i that cause the return light to propagate through the light guide 6230 and transmit through the side surfaces 6232a and/or 6232b are described in U.S. Pat. No. 9,658,382, which is incorporated by reference in its entirety.

Reflection at the redirecting interface 6240-i—e.g., the divergence of and the prevalent propagation direction within each of the first 142a-i and second 142b-i return angular ranges of the return light—depends on shape and arrangement of the structure of the redirecting interface 6240-i, where i=1 to N. Typically, the redirecting interface 6240-i, i=1 to N, is coated with a reflective material and has a corresponding reflectivity $R_i$. In some implementations, the reflectivity $R_i$ of the redirecting interface 6240-i, i=1 to N, including a uniformly formed reflective coating is determined by reflectivity of constitutive materials and forming process of the coated layer. For example, the redirecting interface 6240-i coated with Ag can have a reflectivity between 40%-75%. Here, about 40%-75% of the light impinging on the redirecting interface 6240-i within an angular range 135-(i–1) is returned into first and second return angular ranges 142a-i, 142b-i, while between 60%-25% of the light impinging on the redirecting interface 6240-i within an angular range 135-(i–1) is transmitted through the redirecting interface 6240-i within an angular range 135-i to be guided forward by the light guide 6230. In other implementations, when the redirecting interface 6240-i, i=1 to N, is formed as a coating that contains a plurality of apertures, the reflectivity $R_i$ of the redirecting interface 6240-i is determined not only by the reflectivity of the constitutive materials and the forming process of the coated layer, but also by a ratio of cumulative area of the apertures to the area of the redirecting interface 6240-i. For example, an Ag coating of the redirecting interface 6240-i can have a reflectance of 99% or larger. However, this Ag coating is formed to contain apertures that can cover 70% of an area of the redirecting interface 6240-i. Here, about 30% of the light impinging on the redirecting interface 6240-i within an angular range 135-(i–1) is returned into first and second return angular ranges 142a-i, 142b-i, while about 70% of the light impinging on the redirecting interface 6240-i within an angular range 135-(i–1) is transmitted through the redirecting interface 6240-i within an angular range 135-i to be guided forward by the light guide 6230.

In some implementations, the redirecting end-face 6240-N of the light guide can have reflectivity >99% such that substantially all light impinging on the redirecting end-face 6240-N is reflected back into the light guide 6230 as return light. In other implementations, the redirecting end-face 6240-N reflects a fraction $R_N$ of the guided light—that reaches the opposite end of the light guide within the angular range 135-(N–1)—back into the light guide within first and second return angular ranges 142a-N, 142b-N, and transmits the remaining fraction $T_N$ of the guided light—that reaches the opposite end within the angular range 135-(N–1)—forward (in the +z direction) outside of the light guide as forward output light in the third output angular range 145.

During operation, the LEEs 6210 provide light within a first angular range 115 relative to the z-axis. The one or more couplers 6220 are configured to receive the light from the LEEs 6210 within the first angular range 115 and provide light within a second angular range 125 to the light guide 6230. The one or more couplers 6220 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 6230 is chosen to allow for the light received from the one or more couplers 6220 at the receiving end of the light guide 6230 to propagate to the opposing end of the light guide 6230, for example, via TIR.

In this manner, light received by the light guide 6230 at the receiving end from the one or more couplers 6220 in the second angular range 125 is guided forward (along the z-axis) by the light guide 6230 from its receiving end to its opposing end. As it propagates through the light guide 6230, the guided light successively interacts with the redirecting interfaces 6240-i, i=1 to N. Forward guided light impinging at a redirecting interface 6240-i has an angular range 135-(i–1). In some implementations, the angular range 135-(i–1) is substantially the same as the second angular range 125. Further at the redirecting interface 6240-i, the forward guided light impinges on the redirecting interface 6240-i where at least a portion of it is reflected back into the light guide 6230 as return light.

The structure of the redirecting interface 6240-i is configured to cause the return light to propagate only in corresponding return angular range 142a-i or 142b-i, or both. Here, substantially all return light within each of the return angular ranges 142a-i and 142b-i propagates only along rays that impinge on the respective light guide side surfaces 6232a and 6232b at angles smaller than a critical incident angle. In this manner, the return light in return angular ranges 142a-i, 142b-i can transmit through the light guide side surfaces 6232a and 6232b as output light of the light guide module 6200 in corresponding first and second output angular ranges 152a-i, 152b-i. Notably, the structure of the redirecting interface 6240-i may need to be configured such that no return light propagates within an angular range that is an inverse of the angular range 135-(i–1), because such return light could be guided back towards the receiving end or a previously traversed redirecting interface 6240-(i–1) via TIR, and hence, would not contribute to the output light of the light guide module 6200.

Additionally, a fraction of the forward guided light having the angular range 135-(i–1) that impinges on the redirecting interface 6240-i and is not reflected back into the light guide 6230 as return light is transmitted through the redirecting interface 6240-i in the forward direction (e.g., along the z-axis) in an angular range 135-i. In some implementations, e.g., in cases when the redirecting interface 6240-i includes apertures or transparent portions of coating, the angular range 135-i of the transmitted light is substantially the same as the angular range 135-(i–1) of the guided light that impinges on the redirecting interface 6240-i. Moreover, a fraction of the forward guided light that impinges on the redirecting end-face 6240-N and is not reflected back into the light guide 6230 as return light is transmitted through the redirecting end-face 6240-N in the forward direction (e.g., along the z-axis) in a third output angular range 145. In some implementations, e.g., in cases when the redirecting end-face 6240-N includes apertures or transparent portions of coating, the third output angular range 145 is substantially the same as the angular range 135-(N–1) of the guided light that reaches the opposing end of the light guide 6230.

Various embodiments of the redirecting interfaces 6240-i, are now described along with corresponding intensity distributions of the light output by the light guide module 6200 when equipped with the described redirecting interfaces 6240-i, where i=1 to N.

For embodiments of the redirecting interfaces 6240-i, i=1 to N, with interface structure that causes the return light to propagate in both return angular ranges 142a and 142b, the interface surface structure includes one or more symmetric v-grooves or a symmetric sawtooth pattern. Here, walls of the symmetric sawtooth pattern can be planar or curved.

A ray-based description of the interaction between light guided through the light guide 6230 and the redirecting interfaces 6240-i, i=1 to N, of the light guide is presented next. For the purposes of this description, each of the redirecting interfaces 6240-i, i=1 to N, illustrated in FIG. 62A has the same configuration. In other implementations (not illustrated in FIG. 62A), at least some of the redirecting interfaces 6240-i, i=1 to N, have different configurations.

Light propagating through the light guide 6230 in the forward direction from the input end has an angular range 135-0 when it impinges on the first redirecting interface 6240-1. In some implementations, the angular range 135-0 can be substantially equal to the second angular range 125.

Return light generated by reflection off of the first redirecting interface 6240-1 in a first instance of the first return angular range 142a-1 impinges on the light guide side surface 6232a at point Pa-1 and most of it transmits through the light guide side surface 6232a as output light in a first instance of first side angular range 152a-1. A prevalent propagation direction within the first instance of the first side angular range 152a-1 can be (i) orthogonal to the light guide side surface 6232a when a prevalent propagation direction within the first instance of the first return angular range 142a-1 is normal to the light guide side surface 6232a; (ii) along the light guide side surface 6232a (antiparallel to the z-axis) when the prevalent propagation direction within the first instance of the first return angular range 142a-1 is along a ray that impinges on the light guide side surface 6232a at critical angle incidence; and (iii) anywhere in-between normal on the light guide side surface 6232a (perpendicular to the z-axis) and parallel to the light guide side surface 6232a (antiparallel to the z-axis) when the prevalent propagation direction within the first instance of the first return angular range 142a-1 is along a ray that impinges on the light guide side surface 6232a between normal and critical angle incidence.

Return light generated by reflection off of the first redirecting interface 6240-1 in a first instance of the second return angular range 142b-1 impinges on the light guide side surface 6232b at point Pb-1 and most of it transmits through the light guide side surface 6232b as output light in a first instance of second side angular range 152b-1. A prevalent propagation direction within the first instance of the second side angular range 152b-1 can be (i) orthogonal to the light guide side surface 6232b when a prevalent propagation direction within the first instance of the second return angular range 142b-1 is normal to the light guide side surface 6232b; (ii) along the light guide side surface 6232b (antiparallel to the z-axis) when the prevalent propagation direction within the first instance of the second return angular range 142b-1 is along a ray that impinges on the light guide side surface 6232b at critical angle incidence; and (iii) anywhere in-between normal on the light guide side surface 6232b (perpendicular to the z-axis) and parallel to the light guide side surface 6232b (antiparallel to the z-axis) when the prevalent propagation direction within the first instance of the second return angular range 142b-1 is along a ray that impinges on the light guide side surface 6232b between normal and critical angle incidence.

Light transmitted through the first redirecting interface 6240-1 into an angular range 135-1 is guided by the light guide 6230 in the forward direction. In some implementations of the first redirecting interface 6240-1, the angular range 135-1 of the transmitted light can be substantially equal to the angular range 135-0 of the incident light. Moreover, the guided light has the angular range 135-1 when it impinges on the second redirecting interface 6240-2.

Return light generated by reflection off of the second redirecting interface 6240-2 in a second instance of the first return angular range 142a-2 impinges on the light guide side surface 6232a at point Pa-2 and most of it transmits through the light guide side surface 6232a as output light in a second instance of first side angular range 152a-2. In this example, a prevalent direction of propagation direction within and a divergence of the second instance of the first return angular range 142a-2 are equal to the corresponding ones of the first instance of the first return angular range 142a-1. Hence, a prevalent propagation direction within and a divergence of the second instance of the first side angular range 6252a-2 are equal to the corresponding ones of the first instance of the first side angular range 152a-1.

Return light generated by reflection off of the second redirecting interface 6240-2 in a second instance of the second return angular range 142b-2 impinges on the light guide side surface 6232b at point Pb-2 and most of it transmits through the light guide side surface 6232b as output light in a second instance of second side angular range 152b-2. In this example, a prevalent direction of propagation direction within and a divergence of the second instance of the second return angular range 142b-2 are equal to the corresponding ones of the first instance of the second return angular range 142b-1. Hence, a prevalent propagation direction within and a divergence of the second instance of the second side angular range 152b-2 are equal to the corresponding ones of the first instance of the second side angular range 152b-1.

Light transmitted through the second redirecting interface 6240-2 into an angular range 135-2 is guided by the light guide 6230 in the forward direction. In this example, the angular range 135-2 of the transmitted light is substantially equal to the angular range 135-1 of the incident light. Moreover, the guided light has the angular range 135-2 when it impinges on the third redirecting interface 6240-3.

Return light generated by reflection off of the third redirecting interface 6240-3 in a third instance of the first return angular range 142a-3 impinges on the light guide side surface 6232a at point Pa-3 and most of it transmits through the light guide side surface 6232a as output light in a third instance of first side angular range 152a-3. In this example, a prevalent direction of propagation direction within and a divergence of the third instance of the first return angular range 142a-3 are equal to the corresponding ones of the second instance of the first return angular range 142a-2. Hence, a prevalent propagation direction within and a divergence of the third instance of the first side angular range 152a-3 are equal to the corresponding ones of the second instance of the first side angular range 152a-2.

Return light generated by reflection off of the third redirecting interface 6240-3 in a third instance of the second return angular range 142b-3 impinges on the light guide side surface 6232b at point Pb-3 and most of it transmits through the light guide side surface 6232b as output light in a third instance of second side angular range 152b-3. In this example, a prevalent direction of propagation direction within and a divergence of the third instance of the second return angular range 142b-3 are equal to the corresponding ones of the second instance of the second return angular range 142b-2. Hence, a prevalent propagation direction within and a divergence of the third instance of the second side angular range 152b-3 are equal to the corresponding ones of the second instance of the second side angular range 152b-2.

Light transmitted through the third redirecting interface 6240-3 into an angular range 135-3 (not shown in FIG. 62A) is guided by the light guide 6230 in the forward direction. In this example, the angular range 135-3 of the transmitted light is substantially equal to the angular range 135-2 of the incident light. The light propagating through the light guide further interacts with the remaining redirecting surfaces in a similar manner to the ones described above. Hence, the guided light has an angular range 135-(N−1) when it impinges on the redirecting end-face 6240-N.

Return light generated by reflection off of the redirecting end-face 6240-N in a $N^{th}$ instance of the first return angular range 142a-N impinges on the light guide side surface 6232a at point Pa-N and most of it transmits through the light guide side surface 6232a as output light in a $N^{th}$ instance of first side angular range 152a-N. In this example, a prevalent direction of propagation direction within and a divergence of the $N^{th}$ instance of the first return angular range 142a-N are equal to the corresponding ones of the $(N-1)^{th}$ instance of the first return angular range 142a-(N−1). Hence, a prevalent propagation direction within and a divergence of the $N^{th}$ instance of the first side angular range 152a-N are equal to the corresponding ones of the $(N-1)^{t}$ instance of the first side angular range 152a-(N−1).

Return light generated by reflection off of the redirecting end-face 6240-N in a $N^{th}$ instance of the second return angular range 142b-N impinges on the light guide side surface 6232b at point Pb-N and most of it transmits through the light guide side surface 6232b as output light in a $N^{th}$ instance of second side angular range 152b-N. In this example, a prevalent direction of propagation direction within and a divergence of the $N^{th}$ instance of the second return angular range 142b-N are equal to the corresponding ones of the $(N-1)^{th}$ instance of the second return angular range 142b-(N−1). Hence, a prevalent propagation direction within and a divergence of the $N^{th}$ instance of the second side angular range 152b-N are equal to the corresponding ones of the $(N-1)^{th}$ instance of the second side angular range 152b-(N−1).

Light transmitted through the redirecting end-face 6240-N outside of the light guide 6230 in the forward direction (along the +z axis) represents output light provided by the light guide module 6200 in the third output angular range 145. In some implementations, the third output angular range 145 of the output light is different from the angular range 135-(N−1) of the incident light.

In this manner, light output by the light guide module 6200—equipped with a light guide 6230 having a set of redirecting interfaces 6240-i, where i=1 to N—through the light guide side surface 6232a in a resultant first output angular range 152a is a combination of light transmitted through the light guide side surface 6232a in the first, second, third, . . . , $N^{th}$ instances of the first side angular range 152a-1, 152a-2, 152a-3, . . . , 152a-N. Similarly, light output by this implementation of the light guide module 6200 through the light guide side surface 6232b in a resultant second output angular range 152b is a combination of light transmitted through the light guide side surface 6232b in the first, second, third, . . . , $N^{th}$ instances of the second side angular range 152b-1, 152b-2, 152b-3, 152b-N.

Figure 62C:
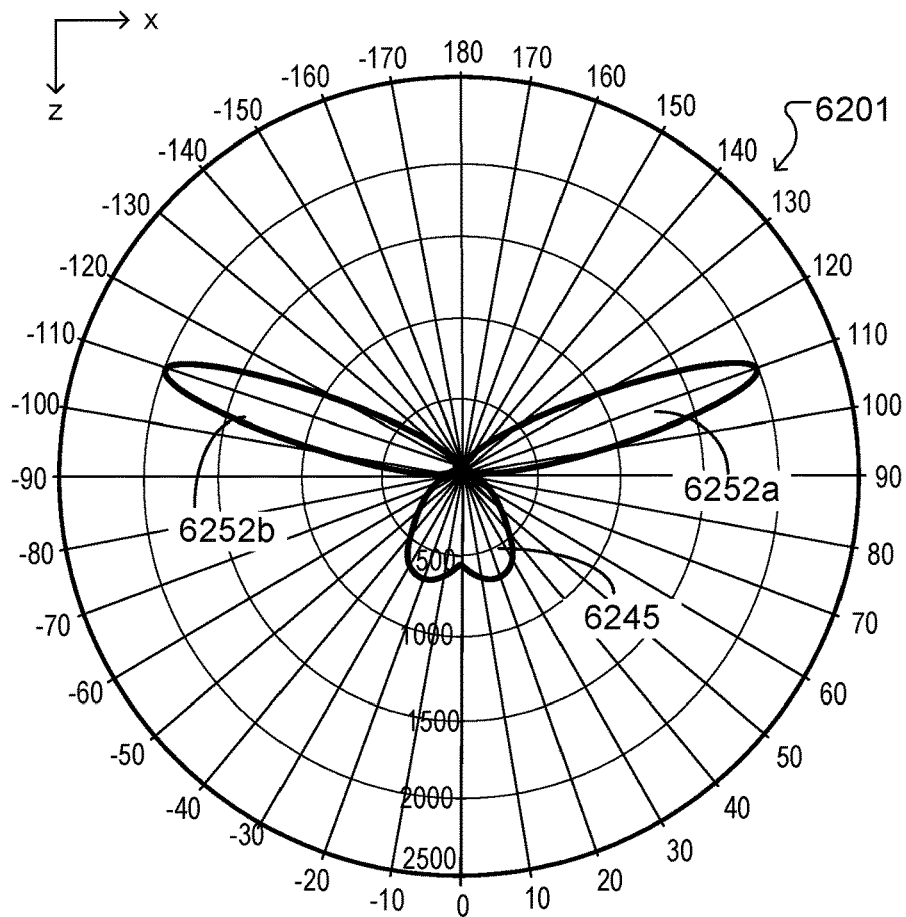

FIG. 62C shows a far-field intensity distribution 6201 of light output by the light guide module 6200 in the x-z cross-section. Here, the light guide module 6200 is a set of redirecting interfaces 6240-i, where i=1 to N, and the redirecting end-face 6240-N has a coating of semitransparent material or a reflecting coating that has apertures (or semitransparent) portions. Lobe 6252a corresponds to output light transmitted through the light guide side surface 6232a in the first output angular range 152a. Lobe 6252b corresponds to output light transmitted through the light guide side surface 6232b in the second output angular range 152b. Lobe 6245 corresponds to output light transmitted through the redirecting end-face 6240-N in the third output angular range 145.

An orientation of the lobe 6252a (e.g., with respect to the z-axis) and a shape of thereof (e.g., aspect ratio of the lobe 6252a) depends mostly on respective propagation direction and divergence of the return light in instances of the first return angular range 142a-i, i=1 to N, (due to transmissions at points Pa-1, Pa-2, . . . , Pa-N.) Similarly, an orientation of the lobe 6252b (e.g., with respect to the z-axis) and a shape of thereof (e.g., aspect ratio of the lobe 6252b) depends mostly on respective propagation direction and divergence of the return light in instances of the second return angular range 142b-i, i=1 to N, (due to transmissions at points Pb-1, Pb-2, . . . , Pb-N.) As described above, the propagation directions and divergences of the return light in the instances of the first and second return angular ranges 142a-i, 142b-i depend on the structure of various embodiments of the redirecting interfaces 6240-i, i=1 to N. An orientation of the lobe 6245 (e.g., with respect to the z-axis) and a shape of thereof (e.g., batwing) depend on (i) collimating characteristics of the one or more couplers 6220, and (ii) guiding characteristics of the light guide 6230. Relative sizes of the lobes 6252a, 6252b and 6245 depend on a combination of (i) reflectance of coatings of the redirecting interfaces 6240-i, and (ii) structure of the various embodiments of the redirecting interfaces 6240-i, i=1 to N.

In general, light guide modules 5800, 5800*, 5900, 6000, 6100, 6200 can be combined with tertiary reflectors to provide (i) indirect illumination to a first portion of a target surface from light output by the light guide module in backward angular ranges and redirected by the tertiary reflector to forward angular ranges, and (ii) direct illumination to a second, different portion of the target surface from light output by the light guide module in the third forward angular range. In some embodiments, multiple light guide modules (e.g., 5800, 5800*, 5900, 6000, 6100, 6200) can be arranged into a luminaire system that provides a desired intensity profile. For example, referring to FIGS. 64A-64C, an indirect direct troffer luminaire 6400 includes four light guide modules 6410, 6411, 6412, and 6413, arranged in a square formation. Each of the light guide modules has an asymmetric cross-sectional profile of the type shown in FIG. 13E. An intensity distribution provided by each of the four light guide modules 6410, 6411, 6412, and 6413 corresponds to the intensity distribution 1390 associated with a light guide module in conjunction with a tertiary reflector 6910. The light guide modules 6410, 6411, 6412, and 6413 are oriented so that the larger lobe of the optical extractor faces away from the square, and the reflector 610 points inward of the square. Only the reflector 610 of the tertiary optic of light guide module 6411 is labeled in FIG. 64B.

Figure 64A:
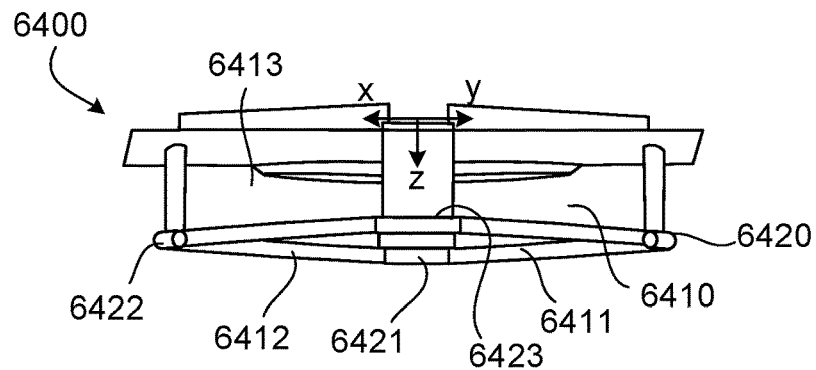
FIGS. 64A-64D show aspects of a troffer luminaire which includes four light guide modules like the ones in FIG. 58A, 58B, 59A-59B, 60A-60B, 61A-61B, or 62A-62B.
Figure 64B:
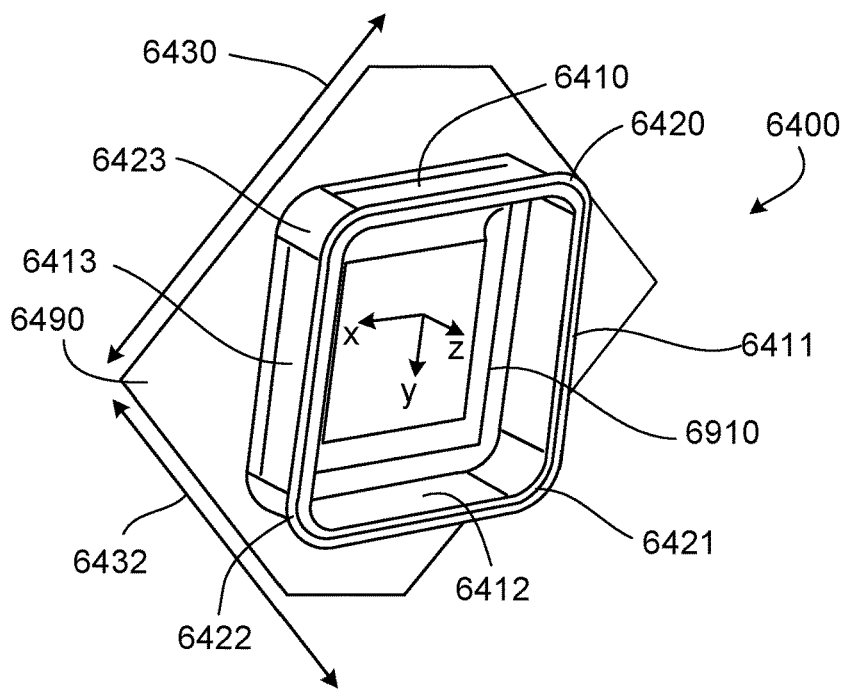
Figure 64C:
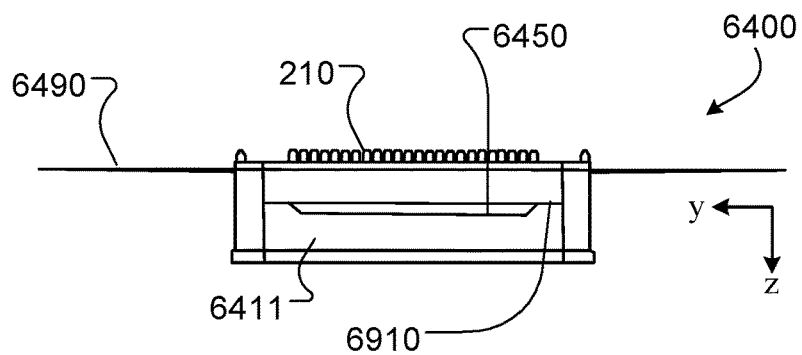

In the example implementation shown in FIGS. 64A-64C, each pair of adjacent light guide modules is connected by one of connector elements 6420, 6421, 6422, and 6423. In this implementation, each connector element has a cross-sectional profile that matches (other embodiments may be different) the light guide modules, and bends through 90° in the x-y plane, forming the corners of the square. In general, connector elements 6420, 6421, 6422, and 6423 can be formed from a variety of materials, such as a plastic or a metal. The connector elements can be transparent or opaque. The connector elements can also be attached to the light guide modules in a variety of ways. For example, the connector elements can be bonded to the light guide modules using an adhesive, fused to the light guide modules, or attached via another device, such as a clamp. Depending on the embodiment, one or more connector elements 6420, 6421, 6422, and 6423 may be integrally formed with one or more light guide modules 6410, 6411, 6412, and 6413. Such integral formations may be configured in one or more shapes that can be used to assemble luminaires of certain shapes and forms in a modular fashion. Light guide modules with or without connector elements can have suitably configured ends opposite of their elongate extensions such that they can be assembled into regular or irregular, open or closed polygonal structures when adjacent ends abut each other. Regular or irregular, open or closed polygonal structures can be outlined from light guide modules irrespective of whether their ends are suitably shaped to allow abutment, in case their ends are suitably shaped, they actually are arranged to abut each other.

In some implementations, the outer circumference of the indirect direct troffer luminaire 6400 may be diffuse reflective and fabricated similarly to the inner coversheet 6450 out of powder coated steel. In some implementations, an optical diffuser may be added to the reflector 610 of each of the light guide modules 6410, 6411, 6412, and 6413, or as an independent component that may cover the interior region of the square circumscribed by the light guide modules 6420, 6421, 6422, and 6423.

Depending on the embodiment, the connector elements 6420, 6421, 6422, and 6423 can be active or passive. Active connector elements can be configured to operate like light guide module **5800, 5800\*, 5900, 6000, 6100, 6200, for example, and can include one or more LEEs. Passive connector elements substantially provide other than optical functions. Depending on the embodiment, the connector elements 6420, 6421, 6422, and 6423 may be formed to optically connect the light guide modules 6410, 6411, 6412, and 6413 to allow light to pass between them. In some embodiments, the connector elements 6420, 6421, 6422, and 6423** can include a reflective layer (e.g., a mirror layer or reflective coating) on the inside surface(s) of the connector elements, such that the connector elements only emit light in an outward direction of the luminaire system.

The square shaped by the light guide modules 6410, 6411, 6412, and 6413 inscribes the housing of the indirect direct troffer luminaire 6400 that can fit into a standard T-bar ceiling grid. For example, indirect direct troffer luminaire 6400 can have a maximum dimension in the x-y plane that allows it to be accommodated in a panel 6490 having 2'×2' footprint (i.e., in the x-y plane), corresponding to the size of conventional troffers that support fluorescent lights. FIG. 64B, for example, shows an example of a luminaire mounted within a square panel 6490 with dimensions shown by arrows 6430 and 6432. In some embodiments, indirect direct troffer luminaire 6400 is designed to be installed in or on a ceiling with ceiling panels 6490. FIG. 64C shows that such a troffer system, which may be about 5" deep (in the z-axis), can reach about 1" into the ceiling 6490. In this manner, the indirect direct troffer luminaire 6400 protrudes about 4" into the room. In other implementations, the indirect direct troffer luminaire 6400 can be directly ceiling mounted. The direct component of the intensity distribution associated with the indirect direct troffer luminaire 6400 is formed entirely in the inside of the square. The reflector 610 of the tertiary optic may be manufactured of non-diffuse reflective material such as Alanod Miro Ag 4420, and a center coversheet 6450 may be fabricated from diffuse reflective material such as powder coated steel or aluminum. The reflector 610 and coversheet 6450 can create a cavity of depth of about 2", sufficient to place drive electronics and power conversion electronics, which control the LEEs of light guide module 6411 and of the other three modules, into the cavity.

Figure 64D:
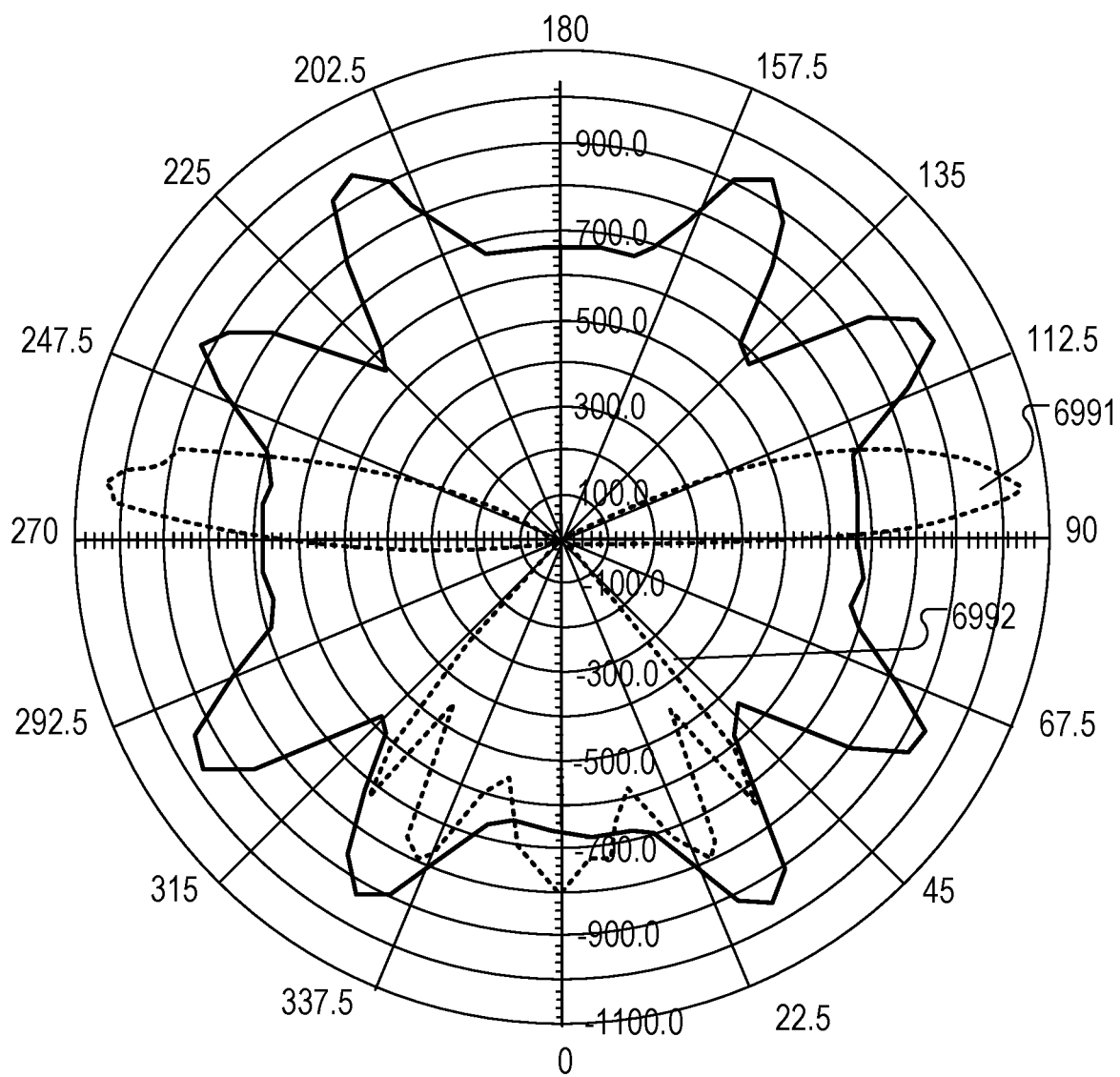

As the light guide modules 6410, 6411, 6412, and 6413 on opposite sides of the indirect direct troffer luminaire 6400 are positioned antiparallel, a symmetric intensity distribution can be obtained. The indirect direct troffer luminaire 6400 can produce max to min uniformity ratios of better than 2:1 on the work surface and better than 10:1 on the ceiling. Referring to FIG. 64D, indirect direct troffer luminaire 6400 can provide symmetric direct and indirect illumination in both of two orthogonal planes. Trace 6991 shows an exemplary simulated intensity profile in the x-z plane of an embodiment of indirect direct troffer luminaire 6400, while trace 6992 shows the simulated intensity profile in the y-z plane. Here, 0° corresponds to the z-direction. In both planes, the luminaire provides direct illumination of similar flux corresponding to the lobes between −45° and 45°. Furthermore, in both planes, the luminaire provides indirect illumination of similar flux. The indirect illumination corresponds to lobes between 90° and 112.5° and between −90° and −112.5°. Luminaire 6400 emits negligible amounts of light into polar angles between 45° and 90°, between −45° and −90°, and between 112.5° and −112.5°.

Figure 65A:
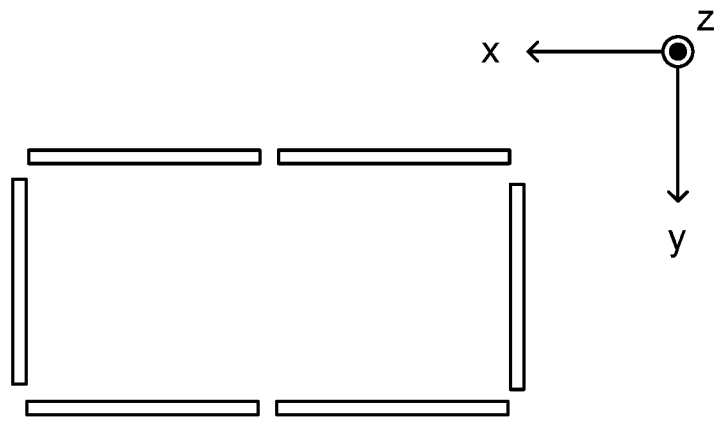
FIGS. 65A-65C show example of arrangements of like light guide modules like the ones in FIG. 58A, 58B, 59A-59B, 60A-60B, 61A-61B, or 62A-62B.
Figure 65B:
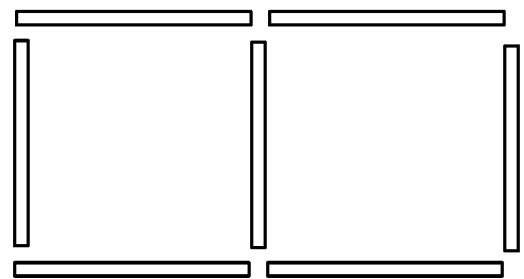
Figure 65C:
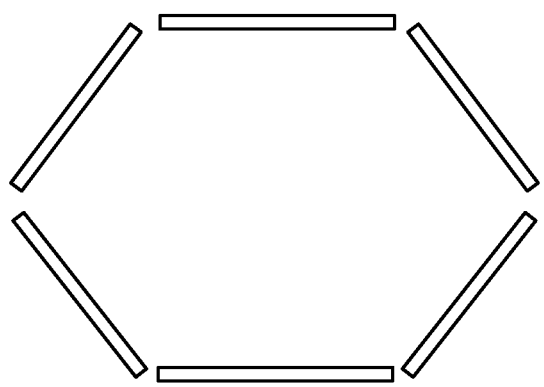

While indirect direct troffer luminaire 6400 includes four light guide modules arranged as a square, other arrangements are possible. For example, light guide modules **5800, 5800\*, 5900, 6000, 6100, 6200 can be arranged into different polygonal shapes, e.g., triangles, rectangles (see FIG. 65A), combinations of rectangles or other quadrilaterals (see FIG. 65B), hexagons (see FIG. 65C), octagons (see FIG. 3), etc. As another example, the light guide modules 5800, 5800\*, 5900, 6000, 6100, 6200** can be arranged on a circular or elliptical contour, corresponding to the contour of a polygon with a very large number of sides (N co). Generally, the shape of the light guide modules can be selected to fit a desired installation. For example, rectangular arrangements of light guide modules can be used to fit with rectangular ceiling panels. As another example, light guide modules can be arranged and configured in curved shapes or any other desired shape.

Structure of LEE Strips

Figure 66A:
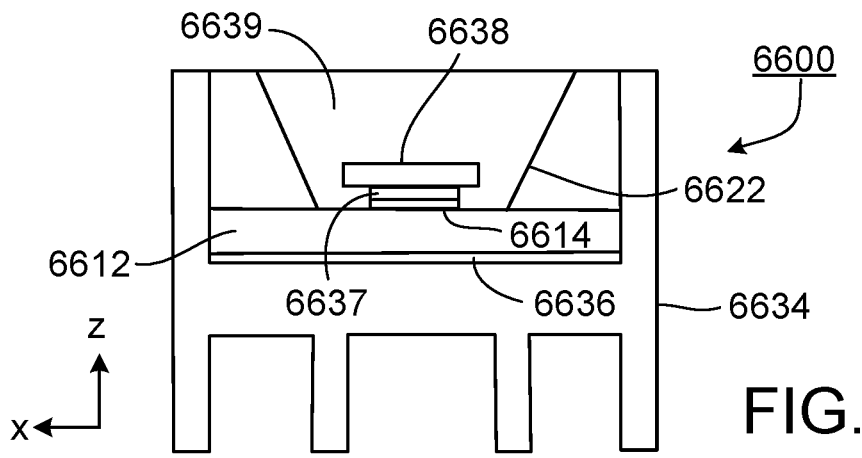
FIGS. 66A-66C show respective examples of strips of light emitting elements which can be included in the light engines of the luminaires described herein.
Figure 66B:
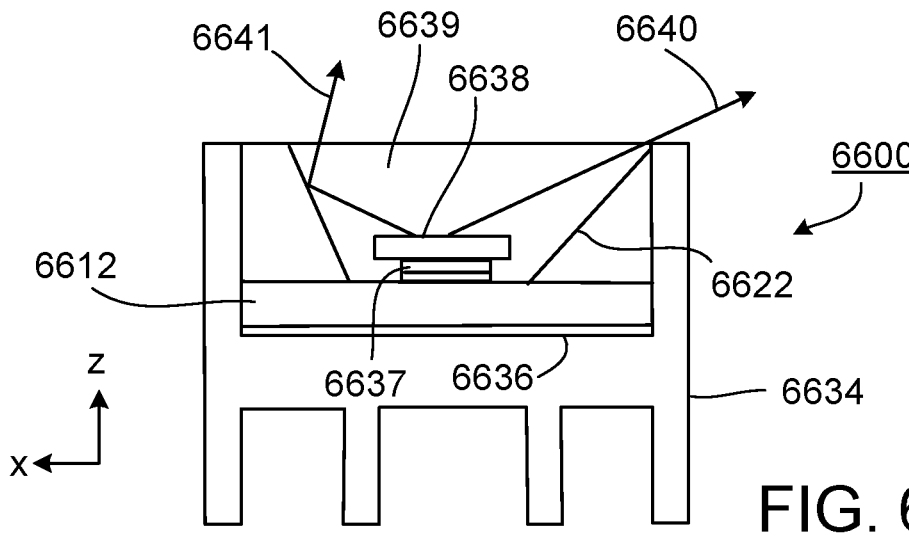
Figure 66C:
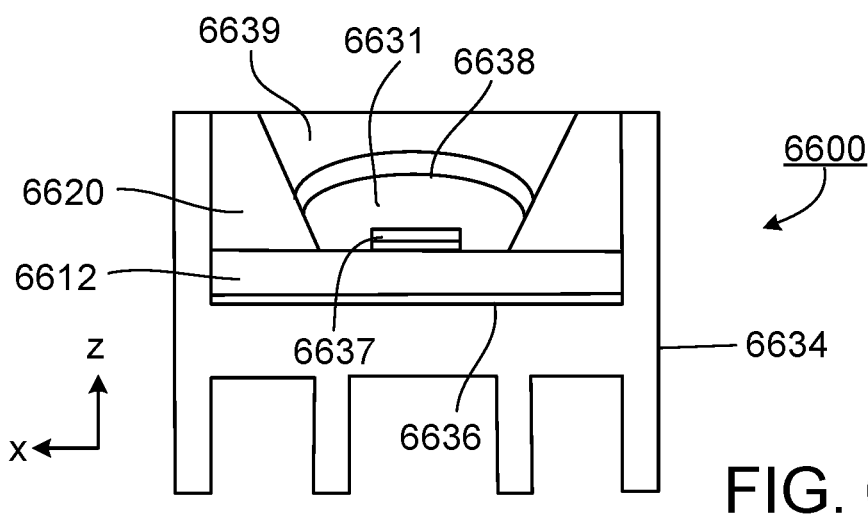

Embodiments of the light engines described herein can include a strip of LEEs. FIGS. 66A, 66B and 66C illustrate in cross section examples of LEE strips 6600 that include an extruded aluminum carrier 6634, having extended cooling surfaces, which forms a support structure for the LEE strip 6600. A thermal adhesive layer 6636 is applied to the carrier 6634, and the substrate 6612 (having the LEE chips 6637 mounted thereon) is adhered to the layer 6636. The phosphor layer 6638 may be disposed in form of plates, sheets, from a slurry or otherwise, which may be flat or curved, are affixed over the top surfaces of the LEE chips 6637 by an adhesive, such as silicone. A strip of the optical coupler sheet 6620 is then affixed over the LEE chips 6637. Spaces such as 6639 and/or 6631 may be filled with one or more materials of a suitable refractive index, for example a high or low index silicone or other encapsulant, for example. The phosphor layer 6638 can be formed from a variety of phosphor sheets and can have varying characteristics along its length to achieve a desired uniform chromaticity and color-rendering index (CRI) along the strip 6632. As such the local characteristics of a phosphor layer 6638 proximate each LEE chip 6637 can be matched to the characteristics of each LEE chip 6637.

As discussed previously, a light conversion material can be incorporated into a luminaire. In some embodiments, a light conversion material, in the form of a phosphor layer, is incorporated into the LEE strip. For example, in FIG. 66C, a flat (not illustrated) or curved phosphor layer 6638 is separated from the LEE chip 6637 by a space 6631. The spaced apart disposition can reduce the thermal load on the phosphor layer 6638. The space 6631 may be partially (not illustrated) or fully filled with an encapsulant, for example, silicone may be disposed in the space 6631 proximate the LEE chip 6637 leaving a gap (not illustrated) between the silicone and the phosphor layer 6638. The gap can be filled with air or other low refractive-index medium to control back reflection of light from the phosphor layer. The phosphor layer 6638 may be formed by depositing a preformed layer or by curing one or more predisposed precursor substances from which the phosphor layer 6638 is then cured. As such phosphor may be uniformly or non-uniformly deposited along the length of the LEE strip 6632. Furthermore, the phosphor layer 6638 and the previously noted encapsulant may be integrally formed. The phosphor may include Ce:YAG, TAG, nitride-based phosphors or other substances as noted herein to achieve predetermined CCTs from 2800K-5000K, for example.

In some embodiments, the space 6631 can have an index of refraction that is less than the index of refraction of the phosphor layer 6638 and the phosphor layer 6638 can have an index of refraction that is less than or equal to an index of refraction of the material in the space 6639. In some embodiments, a medium filling the space 6631 can be air, and inert or other gas, or vacuum, for example.

In some embodiments, the optical couplers 6622 are dielectric compound parabolic concentrators. Each optical coupler 6622 is disposed and configured to collect substantially all of the light from one or more of the LEEs in the LEE strip 6632 and narrows the solid angle of the propagation directions of light as it passes there through. As such light exiting the exit aperture of an optical coupler diverges into a smaller solid angle than light received at an entrance aperture of the optical coupler. The opening angle of the exit beams produced by the optical couplers 6622 may be as narrow as +/−30 degrees or less, for example. Sufficient collimation is desired to reduce non-absorptive losses of light in the light guide. It is noted that these and other considerations can further depend on the wavelengths of the light provided at the entrance aperture of the optical coupler as noted herein. Depending on the embodiment, an optical coupler may be about 2 mm wide and 3 mm tall if used with a 500 µm LED die, approximately 6 mm wide and 8 mm tall if used with small LED packages, or have other dimensions, for example.

In some embodiments, the optical couplers 6622 are configured to narrow a broad, for example, Lambertian light emission from the phosphor layer 6638.

FIG. 66B illustrates an optical coupler with an asymmetrical configuration that can redirect more light into one portion of space than in another with respect to corresponding optical axes and thereby provide light from the optical coupler having an asymmetrical intensity pattern. Depending on the configuration of other components of the luminaire, for example the length and cross sections of the light guide, an asymmetrical intensity pattern from an optical coupler may be partially or fully preserved, and may aid in providing a luminaire with predetermined photometric properties that may suit predetermined illumination applications. Asymmetric optical couplers may provide for tailoring of photometric output profiles for certain applications. It is noted that such asymmetry may be achieved via suitable asymmetric configuration of other components of the luminaire including the light pipe and/or the optical extractor, for example.

Figure 67:
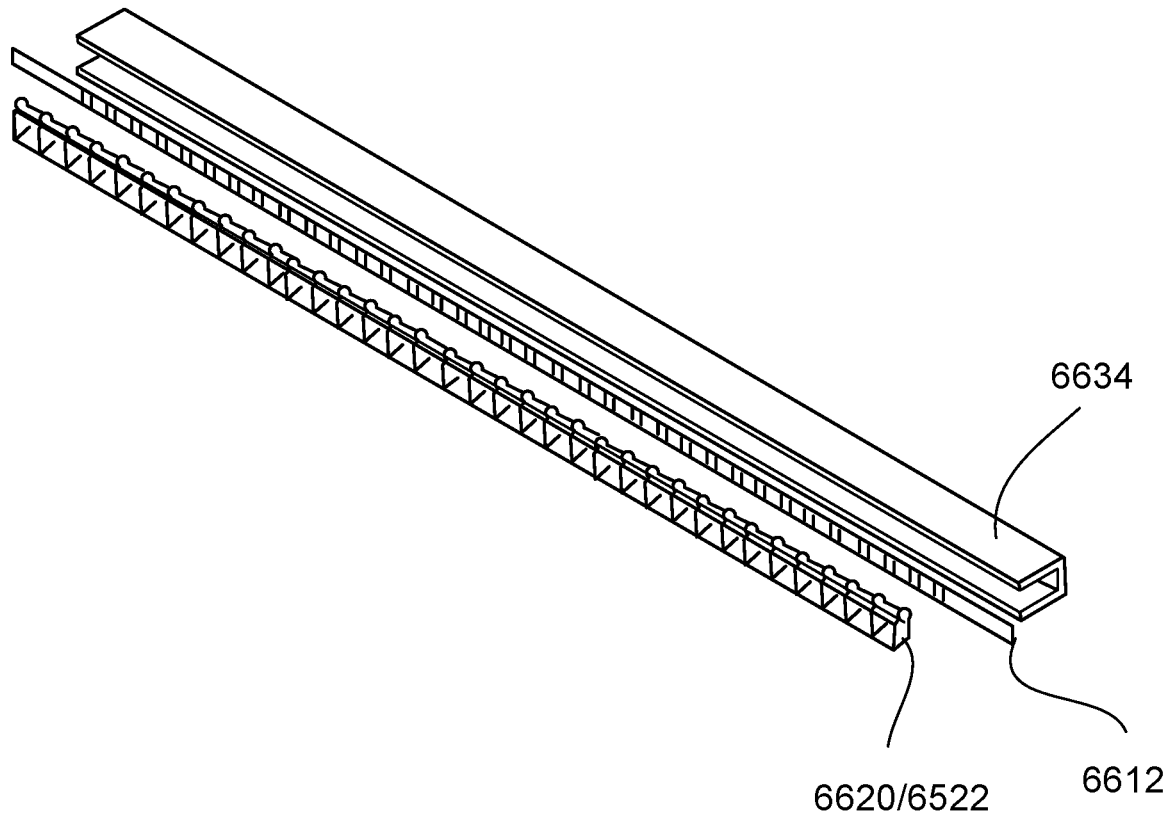
FIG. 67 shows an exploded view of an example of a strip of light emitting elements which can be included in the light engines of the luminaires described herein.

FIG. 67 shows an exploded view of the aluminum heat sink 6634, the substrate 6612 having a plurality of LEEs thereon, and a plurality of optical couplers 6622 which may be integrally formed as an optical coupler sheet or row 6620.

Figure 68A:
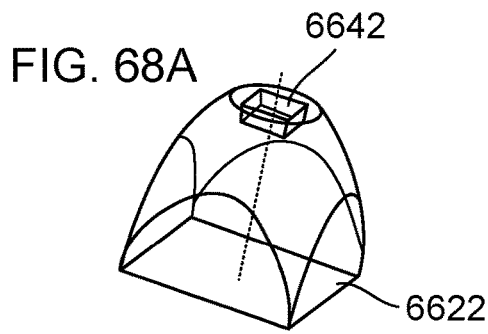
FIGS. 68A-68H show aspects of strips of light emitting elements which can be included in the light engines of the luminaires described herein.
Figure 68B:
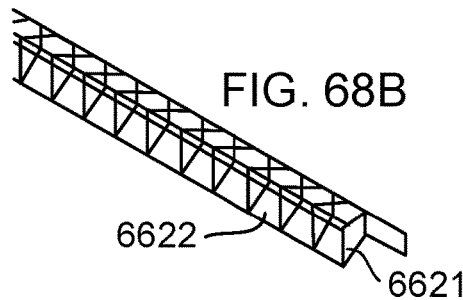
Figure 68C:
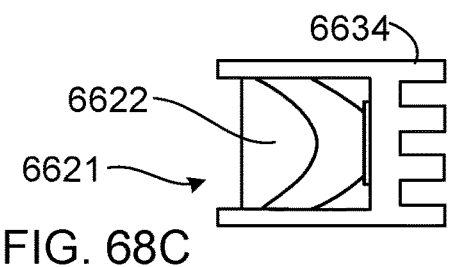
Figure 68D:
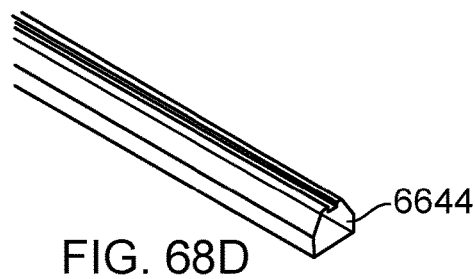

FIGS. 68A, 68B and 68D illustrate perspective views of example optical couplers. FIG. 68C illustrates a sectional view of an LEE strip 6612 including optical couplers 6622 of FIGS. 68A and 68B. In general, optical couplers may have other configurations, for example, an optical coupler may be configured as a truncated cone or pyramid. Example truncated pyramid optical couplers may have a square or other cross section perpendicular to an optical axis. An optical coupler may have a circular, quadratic or other cross section at a receiving end and transition into a rectangular, circular or other cross section at an opposite end. Depending on the embodiment, such or other variations in profile may occur more than once along the length of an optical coupler. As illustrated in FIG. 68A, the example optical couplers 6622 have a receiving opening 6642 within which the LEE chip 6637 or LEE package can be disposed. The receiving opening 6642 may be designed to maximize extraction efficiency out of the LEE chip 6637 or LEE package. The void between the LEE chip 6637 and the collimating optic may be filled with optical encapsulation material such as silicone to maximize light extraction efficiency.

FIG. 68B shows an example string 6621 of optical couplers 6622, also referred to as an elongate configuration of optical couplers 6622, for use in an LEE strip 6632. The string may be configured to provide collimation power in the direction of the LEE strip 6632 and perpendicular to it. Each of the optical couplers 6622 may have equal or different collimation and/or other optical properties in such directions. An optical coupler may have continuous or discrete rotational symmetry perpendicular to its optical axis, or it may have no rotational symmetry with respect to the optical axis. For example, different collimation properties in different directions can be result of at least portions of the optical coupler having a rectilinear non-quadratic cross section perpendicular to the optical axis. The optical couplers 6622 may have interlocking mechanisms (not illustrated) configured to attach adjacent optical couplers 6622 into the string 6621. Such mechanisms may be resiliently releasable, allow interconnection into one or more rows of parallel strings (not illustrated) or otherwise configured, for example. Optical couplers 6622 and/or a string thereof may be formed through injection molding as separate optical couplers or in groups of connected optical couplers (up to the length of the luminaire). Depending on the embodiment, adjacent optical couplers in a string of optical couplers 6622 may be optically coupled with, or decoupled from one another to maintain transmission of light at the abutting interfaces between them below, at or above a predetermined level. Such configuration may depend on whether the optical couplers have a cavity or solid bulk configuration and whether they rely on total internal reflection and/or mirrored surfaces. It is noted that an optical coupler as illustrated in FIG. 68A may also be used individually in a rotationally symmetrical luminaire, for example, examples of which are discussed below.

As discussed previously, the optical couplers in an LEE string may be optically isolated or coupled to provide predetermined collimation of light within one or more planes parallel to the optical axes of the optical couplers. In some embodiments, adjacent optical couplers are optically coupled via suitable configuration of abutting interfaces, disposition of suitable material between adjacent optical couplers, integral formation or otherwise optically coupled. Optical decoupling may be achieved via disposition with formation of suitably sized gaps between individual optical couplers, or disposition of suitable reflective material such as films, layers, coatings or interjecting substances between or on abutting interfaces of adjacent optical couplers. Optical couplers may be integrally formed into lines or other groups (not illustrated) of adjacent optical couplers. Depending on the embodiment, a luminaire may include equal or different numbers of optical couplers within different groups of optical couplers.

FIG. 68D shows a linear optical coupler 6644 configured to collimate substantially only in the direction perpendicular to the length of the LEE strip 6632. The optical coupler 6644 may be formed through extrusion to predetermined lengths.

Figure 68E:
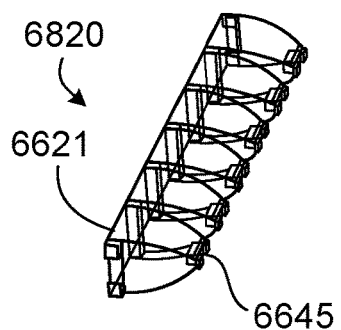

FIG. 68E shows an exemplary embodiment of an optical coupler 6820 that includes multiple primary optics 6621. The optical coupler 6820 can be used to achieve high collimation angles in a direction perpendicular to the elongation of the system of FWHM 20 deg or better in the solid material, while it may be advantageous to keep a design wider beam angle of over 20 deg in the opposing direction. In some implementations, a configuration of the primary optic 6820 can be tailored to provide batwing distribution in the direction of elongation of the system. In order to increase collimation in the direction perpendicular to the elongation of the system (e.g., to reduce divergence of the second angular range), a cylindrical lens 6645 can be included as part of the primary optics 6621 to add optical power at the entrance surface of primary optics 6621. In some embodiments, primary optics can be variable. For example, primary optics can be tunable lenses (e.g., available through variable electro-wetting or other means), which can change the second angular range to create a desired angular range of the light output as described herein. The tunable lenses can be used with high output LEEs and/or for a portion of the LEEs in the array.

Figure 68F:
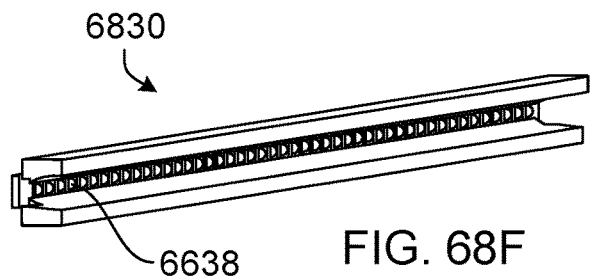

FIG. 68F shows a hollow embodiment of a primary optic 6830 (corresponding e.g. to primary optics 1520 2120, 2920) configured to collect the light emitted by the LEEs 6638 and provide collimation and beam shaping to illuminate a secondary reflector. In this embodiment, the primary optic 6830 has optical power perpendicular to the direction of a linear LED array 6638 only and provides beam shaping only in this direction.

Figure 68G:
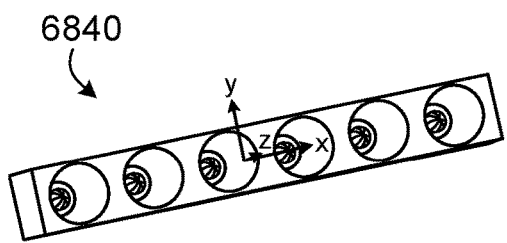
Figure 68H:
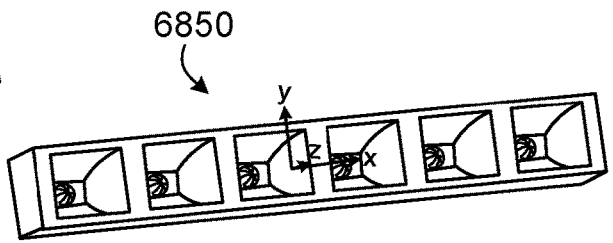

FIGS. 68G and 68H show other hollow embodiments of primary optics 6840 and 6850 (each of which can be used corresponding e.g. to primary optics 1520 2120, 2920) configured to have identical or different optical powers in the direction of the linear LEE array and perpendicular to it. In some implementations, the primary optic 6850 may have a rectangular cross section with dissimilar profile in the direction perpendicular and along the elongation of the hollow flux manifold. In one embodiment collimation of better than FWHM of 25 deg perpendicular to the elongation of the flux manifold may be desired while collimation in elongation of the hollow flux manifold on the order of FWHM 40 deg may be desired.

The hollow primary optics may optically communicate with each LEE individually (as in FIGS. 68G and 68H), or may optically communicate with all LEDs (as in FIG. 68F) or a group of LEEs.

The profile of the hollow primary optic 6830 perpendicular to the beam direction may be linear (as in FIG. 68F), a linear array of rotational symmetric profiles (as in FIG. 68G), a linear array of rectangular profiles (as in FIG. 68H) or an array of other suitable profile.

The hollow primary optic may be reflectively coated with the coating applied to the side facing the source or to the side facing away from the source. The surface shape in direction of the emission may be linear, segmented linear, parabolic, hyperbolic, or any freeform shape suitable to the application.

A perpendicular profile of a solid or hollow primary optic may be a two dimensional array of rectangular, triangular, rotational symmetric or other shape including individual rotational symmetric, rectangular, triangular or other profiles. The primary optic may be formed individually, in groups of six elements, for example, or may be formed integrally for the entire hollow flux manifold.

Other embodiments are in the following claims.

What is claimed is:

1. A luminaire comprising:
    a. a first light source and a second light source, the first and second light sources being operatively configured to provide amounts of light independently controllable during operation; and
    b. an optical system having an input aperture system and an output aperture system, the output aperture system displaced by a predetermined distance along a forward direction from the input aperture system, the optical system operatively coupled with the first and second light sources and configured to direct light received simultaneously at the input aperture system from the first and second light sources to the output aperture system, the output aperture system configured to output the light from the first light source into a first output light distribution and to output the light from the second light source into a second output light distribution at least in part different from the first output light distributions,
    wherein the optical system comprises a light guide extending along the forward direction and configured to guide the light received at the input aperture system along the forward direction by total internal reflection of the light at surfaces of the light guide, wherein for a cross-section through the light guide in a first plane parallel to the forward direction, the light guide has opposing sides that are linear and define a tapered thickness along the forward direction and, for a cross-section through a second plane perpendicular to the forward direction and perpendicular to the first plane, the light guide has a curved shape.

2. The luminaire according to claim 1, wherein different portions of the output aperture system receive and output different amounts of the light from the first and second light sources.

3. The luminaire according to claim 1, wherein the light guide includes multiple light guide segments.

4. The luminaire according to claim 3, wherein the light guide segments have spiral shapes relative to the forward direction.

5. The luminaire according to claim 1, wherein the light guide has a coil shape.

6. The luminaire according to claim 1, wherein the curved shape of the light guide forms a closed loop.

7. The luminaire according to claim 6, wherein the closed loop is a circle.

8. The luminaire according to claim 1, wherein the optical system is formed as one or more solid transparent bodies.

9. The luminaire according to claim 1, wherein the output light propagates only in a backward direction with the first and second output light distributions including obtuse angles relative to the forward direction.

10. The luminaire according to claim 1, wherein the first and second light sources include solid state light-emitting elements.

11. The luminaire according to claim 1, further comprising optical fibers configured to couple the first and second light sources with the input aperture system.

12. The luminaire according to claim 1, wherein one or more portions of the light guide form part of the output aperture system and are configured to output the light.

13. The luminaire according to claim 3, wherein the light guide segments are formed from a transparent material.

14. The luminaire according to claim 1, wherein an outer wall of the light guide has a conical shape.

15. The luminaire according to claim 1, wherein the output aperture system outputs the light into the first and second output light distributions through one or more refractive optical interfaces.

16. The luminaire according to claim 1, wherein the tapered thickness of the light guide decreases along the forward direction.

17. The luminaire according to claim 1, wherein the tapered thickness of the light guide increases along the forward direction.

18. The luminaire according to claim 14, wherein the conical shape flares outward in the forward direction.

19. The luminaire according to claim 3, wherein the light guide comprises seams corresponding to edges of adjacent segments, wherein the seams are parallel to each other.

20. The luminaire according to claim 19, wherein the seams are non-parallel to the forward direction.

* * * * *